(12) United States Patent (10) Patent No.: US 11,475,367 B2
Lazovich et al. (45) Date of Patent: *Oct. 18, 2022

(54) SYSTEMS AND METHODS FOR TRAINING MATRIX-BASED DIFFERENTIABLE PROGRAMS

(71) Applicant: Lightmatter, Inc., Boston, MA (US)

(72) Inventors: Tomo Lazovich, Cambridge, MA (US);
Darius Bunandar, Boston, MA (US);
Nicholas C. Harris, Boston, MA (US);
Martin B. Z. Forsythe, Jamaica Plain, MA (US)

(73) Assignee: Lightmatter, Inc., Boston, MA (US)

( * ) Notice: Subject to any disclaimer, the term of this patent is extended or adjusted under 35 U.S.C. 154(b) by 216 days.

This patent is subject to a terminal disclaimer.

(21) Appl. No.: 16/915,023

(22) Filed: Jun. 29, 2020

(65) Prior Publication Data
US 2020/0334576 A1 Oct. 22, 2020

Related U.S. Application Data

(63) Continuation of application No. 16/412,159, filed on May 14, 2019, now Pat. No. 10,740,693.
(Continued)

(51) Int. Cl.
*B82Y 20/00* (2011.01)
*G01N 33/86* (2006.01)
(Continued)

(52) U.S. Cl.
CPC .............. *G06N 20/00* (2019.01); *G06E 1/00* (2013.01)

(58) Field of Classification Search
CPC .................. G06N 20/00; G06E 1/00
(Continued)

(56) References Cited

U.S. PATENT DOCUMENTS 4,567,569 A 1/1986 Caulfield et al.
4,633,428 A 12/1986 Byron
(Continued)

FOREIGN PATENT DOCUMENTS

CN 101630178 A 1/2010
CN 103903016 A 7/2014
(Continued)

OTHER PUBLICATIONS

U.S. Appl. No. 16/412,159, filed May 14, 2019, Lazovich et al.
(Continued)

*Primary Examiner* — Brandon S Cole
(74) *Attorney, Agent, or Firm* — Wolf, Greenfield & Sacks, P.C.

(57) ABSTRACT

Methods and apparatus for training a matrix-based differentiable program using a photonics-based processor. The matrix-based differentiable program includes at least one matrix-valued variable associated with a matrix of values in a Euclidean vector space. The method comprises configuring components of the photonics-based processor to represent the matrix of values as an angular representation, processing, using the components of the photonics-based processor, training data to compute an error vector, determining in parallel, at least some gradients of parameters of the angular representation, wherein the determining is based on the error vector and a current input training vector, and updating the matrix of values by updating the angular representation based on the determined gradients.

27 Claims, 25 Drawing Sheets

Related U.S. Application Data

(60) Provisional application No. 62/680,557, filed on Jun. 4, 2018, provisional application No. 62/671,793, filed on May 15, 2018.

(51) Int. Cl.
*G06N 3/063* (2006.01)
*G06N 20/00* (2019.01)
*G06E 1/00* (2006.01)

(58) Field of Classification Search
USPC .......................................................... 706/1–62
See application file for complete search history.

(56) References Cited

U.S. PATENT DOCUMENTS

| | | | |
|---|---|---|---|
| 5,004,309 | A | 4/1991 | Caulfield et al. |
| 5,077,619 | A | 12/1991 | Toms |
| 5,095,459 | A | 3/1992 | Ohta et al. |
| 5,428,711 | A | 6/1995 | Akiyama et al. |
| 5,699,449 | A | 12/1997 | Javidi |
| 6,005,998 | A | 12/1999 | Lee |
| 7,173,272 | B2 | 2/2007 | Ralph |
| 7,660,533 | B1 | 2/2010 | Meyers et al. |
| 7,876,248 | B2 | 1/2011 | Berkley et al. |
| 7,985,965 | B2 | 7/2011 | Barker et al. |
| 8,018,244 | B2 | 9/2011 | Berkley |
| 8,023,828 | B2 | 9/2011 | Beausoleil et al. |
| 8,027,587 | B1 | 9/2011 | Watts |
| 8,035,540 | B2 | 10/2011 | Berkley et al. |
| 8,190,553 | B2 | 5/2012 | Routt |
| 8,223,414 | B2 | 7/2012 | Goto |
| 8,386,899 | B2 | 2/2013 | Goto et al. |
| 8,560,282 | B2 | 10/2013 | Macready et al. |
| 8,604,944 | B2 | 12/2013 | Berkley et al. |
| 8,620,855 | B2 | 12/2013 | Bonderson |
| 8,837,544 | B2 | 9/2014 | Tori |
| 9,250,391 | B2 | 2/2016 | McLaughlin et al. |
| 9,354,039 | B2 | 5/2016 | Mower et al. |
| 9,791,258 | B2 | 10/2017 | Mower |
| 10,359,272 | B2 | 7/2019 | Mower et al. |
| 10,740,693 | B2 | 8/2020 | Lazovich et al. |
| 2003/0086138 | A1 | 5/2003 | Pittman et al. |
| 2003/0235363 | A1 | 12/2003 | Pfeiffer |
| 2004/0243657 | A1 | 12/2004 | Goren et al. |
| 2007/0180586 | A1 | 8/2007 | Amin |
| 2008/0031566 | A1 | 2/2008 | Matsubara et al. |
| 2008/0212186 | A1 | 9/2008 | Zoller et al. |
| 2008/0273835 | A1 | 11/2008 | Popovic |
| 2009/0028554 | A1 | 1/2009 | Anderson et al. |
| 2012/0078436 | A1* | 3/2012 | Patel ................ G06N 3/08 700/298 |
| 2013/0011093 | A1 | 1/2013 | Goh et al. |
| 2014/0241657 | A1 | 8/2014 | Manouvrier |
| 2014/0299743 | A1 | 10/2014 | Miller |
| 2015/0354938 | A1 | 12/2015 | Mower et al. |
| 2015/0382089 | A1 | 12/2015 | Mazed |
| 2016/0103281 | A1 | 4/2016 | Matsumoto |
| 2016/0118106 | A1 | 4/2016 | Yoshimura et al. |
| 2016/0162781 | A1* | 6/2016 | Lillicrap .............. G06N 3/0454 706/25 |
| 2016/0162798 | A1 | 6/2016 | Marandi et al. |
| 2017/0031101 | A1 | 2/2017 | Miller |
| 2017/0285373 | A1 | 10/2017 | Zhang et al. |
| 2017/0351293 | A1* | 12/2017 | Carolan ............... G02F 3/024 |
| 2018/0001184 | A1 | 1/2018 | Tran et al. |
| 2018/0274900 | A1 | 9/2018 | Mower et al. |
| 2018/0335574 | A1 | 11/2018 | Steinbrecher et al. |
| 2019/0354894 | A1 | 11/2019 | Lazovich et al. |

FOREIGN PATENT DOCUMENTS

| | | | |
|---|---|---|---|
| WO | WO 2005/029404 | A2 | 3/2005 |
| WO | WO 2006/023067 | A2 | 3/2006 |
| WO | WO 2008/069490 | A1 | 6/2008 |
| WO | WO 2017/210550 | A1 | 12/2017 |
| WO | WO 2018/098230 | A1 | 5/2018 |
| WO | WO 2019/217835 | A1 | 11/2019 |

OTHER PUBLICATIONS

PCT/US2015/034500, Mar. 15, 2016, International Search Report and Written Opinion.
PCT/US2019/032122, Jul. 23, 2019, International Search Report and Written Opinion.
International Search Report and Written Opinion for International Application No. PCT/US19/32122 dated Jul. 23, 2019.
International Search Report and Written Opinion from International Application No. PCT/US2015/034500, dated Mar. 15, 2016, 7 pages.
Aaronson et al., Computational complexity of linear optics. Proceedings of the 43rd Annual ACM Symposium on Theory of Computing. 2011. 101 pages. ISBN 978-1-4503-0691-1.
Abu-Mostafa et al., Optical neural computers. Scientific American. 1987:88-95.
Albert et al., Statistical mechanics of com-plex networks. Reviews of Modern Physics. 2002;(74):47-97.
Almeida et al., All-optical control of light on a silicon chip. Nature. 2004;431:1081-1084.
Amir et al., Classical diffusion of a quantum particle in a noisy environment. Physical Review E. 2009;79. 5 pages. DOI: 10.1103/PhysRevE.79.050105.
Amit et al., Spin-glass models of neural networks. Physical Review A. 1985;32(2):1007-1018.
Anitha et al., Comparative Study of High performance Braun's multiplier using FPGAs. IOSR Journal of Electronics and Communication Engineering (IOSRJECE). 2012;1:33-37.
Appeltant et al., Information processing using a single dynamical node as complex system. Nature Communications. 2011. 6 pages. DOI: 10.1038/ncomms1476.
Arjovsky et al., Unitary Evolution Recurrent Neural Networks. arXiv:1511.06464. 2016. 9 pages.
Aspuru-Guzik et al., Photonic quantum simulators. Nature Physics. 2012;8:285-291. DOI: 10.1038/NPHYS2253.
Aspuru-Guzik et al., Simulated Quantum Computation of Molecular Energies. Science. 2005;309:1704-7.
Atabaki et al., Integrating photonics with silicon nanoelectronics for the next generation of systems on a chip. Nature. 2018;556(7701):349-354. 10 pages. DOI: 10.1038/s41586-018-0028-z.
Baehr-Jones et al., A 25 GB/s Silicon Photonics Platform. arXiv:1203.0767. 2012. 11 pages.
Bao et al., Atomic-Layer Graphene as a Saturable Absorber for Ultrafast Pulsed Lasers. 24 pages. 2009.
Bao et al., Monolayer graphene as a saturable absorber in a mode-locked laser. Nano Research. 2011;4:297-307. DOI: 10.1007/s12274-010-0082-9.
Barahona, On the computational complexity of Ising spin glass models. Journal of Physics A: Mathematical and General. 1982;15:3241-3253.
Bertsimas et al., Robust optimization with simulated annealing. Journal of Global Optimization. 2010;48:323-334. DOI 10.1007/s10898-009-9496-x.
Bewick, Fast multiplication: algorithms and implementation. Ph.D. thesis, Stanford University (1994). 170 pages.
Bonneau et al., Quantum interference and manipulation of entanglement in silicon wire waveguide quantum circuits. New Journal of Physics. 2012;14:045003. 13 pages. DOI: 10.1088/1367-2630/14/4/045003.
Brilliantov, Effective magnetic Hamiltonian and Ginzburg criterion for fluids. Physical Review E. 1998;58:2628-2631.
Bromberg et al., Bloch oscillations of path-entangled photons. Physical Review Letters. 2010;105:263604-1-2633604-4. 4 pages. DOI: 10.1103/PhysRevLett.105.263604.
Bromberg et al., Quantum and Classical Correlations in Waveguide Lattices. Physical Review Letters. 2009;102:253904-1-253904-4. 4 pages. DOI: 10.1103/PhysRevLett.102.253904.

(56) References Cited

OTHER PUBLICATIONS

Broome et al., Photonic Boson Sampling in a Tunable Circuit. Science. 2012;339:794-8.
Bruck et al., On the power of neural networks for solving hard problems. American Institute of Physics. 1988. pp. 137-143. 7 pages.
Canziani et al., Evaluation of neural network architectures for embedded systems. Circuits and Systems (ISCAS). 2017 IEEE International Symposium. 4 pages.
Cardenas et al., Low loss etchless silicon photonic waveguides. Optics Express. 2009;17(6):4752-4757.
Carolan et al., Universal linear optics. Science. 2015;349:711-716.
Caves, Quantum-mechanic al noise in an interferometer. Physical Review D. 1981;23(8):1693-1708. 16 pages.
Centeno et al., Optical bistability in finite-size nonlinear bidimensional photonic crystals doped by a microcavity. Physical Review B. 2000;62(12):R7683-R7686.
Chan, Optical flow switching networks. Proceedings of the IEEE. 2012;100(5):1079-1091.
Chen et al., Compact, low-loss and low-power 8x8 broadband silicon optical switch. Optics Express. 2012;20(17):18977-18985.
Chen et al., DianNao: A small-footprint high-throughput accelerator for ubiquitous machine-learning. ACM Sigplan Notices. 2014;49:269-283.
Chen et al., Efficient photon pair sources based on silicon-on-insulator microresonators. Proc. of SPIE. 2010;7815. 10 pages.
Chen et al., Frequency-bin entangled comb of photon pairs from a Silicon-on-Insulator micro-resonator. Optics Express. 2011;19(2):1470-1483.
Chen et al., Universal method for constructing N-port nonblocking optical router based on 2x2 optical switch for photonic networks-on-chip. Optics Express. 2014;22(10);12614-12627. DOI: 10.1364/OE.22.012614.
Cheng et al., In-Plane Optical Absorption and Free Carrier Absorption in Graphene-on-Silicon Waveguides. IEEE Journal of Selected Topics in Quantum Electronics. 2014;20(1). 6 pages.
Chetlur et al., cuDNN: Efficient primitives for deep learning. arXiv preprint arXiv:1410.0759. 2014. 9 pages.
Childs et al., Spatial search by quantum walk. Physical Review A. 2004;70(2):022314. 11 pages.
Chung et al., A monolithically integrated large-scale optical phased array in silicon-on-insulator cmos. IEEE Journal of Solid-State Circuits. 2018;53:275-296.
Cincotti, Prospects on planar quantum computing. Journal of Lightwave Technology. 2009;27(24):5755-5766.
Clements et al., Optimal design for universal multiport interferometers. Optica. 2016;3(12):1460-1465.
Crespi et al., Integrated multimode interferometers with arbitrary designs for photonic boson sampling. Nature Photonics. 2013;7:545-549. DOI: 10.1038/NPHOTON.2013.112.
Crespi, et al., Anderson localization of entangled photons in an integrated quantum walk. Nature Photonics. 2013;7:322-328. DOI: 10.1038/NPHOTON.2013.26.
Dai et al., Novel concept for ultracompact polarization splitter-rotator based on silicon nanowires. Optics Express. 2011;19(11):10940-9.
Di Giuseppe et al., Einstein-Podolsky-Rosen Spatial Entanglement in Ordered and Anderson Photonic Lattices. Physical Review Letters. 2013;110:150503-1-150503-5. DOI: 10.1103/PhysRevLett.110.150503.
Dunningham et al., Efficient comparison of path-lengths using Fourier multiport devices. Journal of Physics B: Atomic, Molecular and Optical Physics. 2006;39:1579-1586. DOI:10.1088/0953-4075/39/7/002.
Esser et al., Convolutional networks for fast, energy-efficient neuromorphic computing. Proceedings of the National Academy of Sciences. 2016;113(41):11441-11446.
Farhat et al., Optical implementation of the Hopfield model. Applied Optics. 1985;24(10):1469-1475.

Feinberg et al., Making memristive neural network accelerators reliable. IEEE International Symposium on High Performance Computer Architecture (HPCA). 2018. pp. 52-65. DOI 10.1109/HPCA.2018.00015.
Fushman et al., Controlled Phase Shifts with a Single Quantum Dot. Science. 2008;320:769-772. DOI: 10.1126/science.1154643.
George et al., A programmable and configurable mixed-mode FPAA SoC. IEEE Transactions on Very Large Scale Integration (VLSI) Systems. 2016;24:2253-2261.
Gilmer et al., Neural message passing for quantum chemistry. arXiv preprint arXiv:1704.01212. Jun. 2017. 14 pages.
Golub et al., Calculating the singular values and pseudo-inverse of a matrix. Journal of the Society for Industrial and Applied Mathematics Series B Numerical Analysis. 1965;2(2):205-224.
Graves et al., Hybrid computing using a neural network with dynamic external memory. Nature. 2016;538. 21 pages. DOI:10.1038/nature20101.
Grote et al., First long-term application of squeezed states of light in a gravitational-wave observatory. Physical Review Letter. 2013;110:181101. 5 pages. DOI: 10.1103/PhysRevLett.110.181101.
Gruber et al., Planar-integrated optical vector-matrix multiplier. Applied Optics. 2000;39(29):5367-5373.
Gullans et al., Single-Photon Nonlinear Optics with Graphene Plasmons. Physical Review Letter. 2013;111:247401-1-247401-5. DOI: 10.1103/PhysRevLett.111.247401.
Gunn, CMOS photonics for high-speed interconnects. IEEE Micro. 2006;26:58-66.
Haffner et al., Low-loss plasmon-assisted electro-optic modulator. Nature. 2018;556:483-486. 17 pages. DOI: 10.1038/s41586-018-0031-4.
Halasz et al., Phase diagram of QCD. Physical Review D. 1998;58:096007. 11 pages.
Hamerly et al., Scaling advantages of all-to-all connectivity in physical annealers: the Coherent Ising Machine vs. D-Wave 2000Q. arXiv preprints, May 2018. 17 pages.
Harris et al. Efficient, Compact and Low Loss Thermo-Optic Phase Shifter in Silicon. Optics Express. 2014;22(9);10487-93. DOI:10.1364/OE.22.010487.
Harris et al., Bosonic transport simulations in a large-scale programmable nanophotonic processor. arXiv:1507.03406. 2015. 8 pages.
Harris et al., Integrated source of spectrally filtered correlated photons for large-scale quantum photonic systems. Physical Review X. 2014;4:041047. 10 pages. DOI: 10.1103/PhysRevX.4.041047.
Harris et al., Quantum transport simulations in a programmable nanophotonic processor. Nature Photonics. 2017;11:447-452. DOI: 10.1038/NPHOTON.2017.95.
Hinton et al., Reducing the dimensionality of data with neural networks. Science. 2006;313:504-507.
Hochberg et al., Silicon Photonics: The Next Fabless Semiconductor Industry. IEEE Solid-State Circuits Magazine. 2013. pp. 48-58. DOI: 10.1109/MSSC.2012.2232791.
Honerkamp-Smith et al., An introduction to critical points for biophysicists; observations of compositional heterogeneity in lipid membranes. Biochimica et Biophysica Acta (BBA). 2009;1788:53-63. DOI: 10.1016/j.bbamem.2008.09.010.
Hong et al., Measurement of subpicosecond time intervals between two photons by interference. Physical Review Letters. 1987;59(18):2044-2046.
Hopfield et al., Neural computation of decisions in optimization problems. Biological Cybernetics. 1985;52;141-152.
Hopfield, Neural networks and physical systems with emergent collective computational abilities. PNAS. 1982;79:2554-2558. DOI: 10.1073/pnas.79.8.2554.
Horowitz, Computing's energy problem (and what we can do about it). Solid-State Circuits Conference Digest of Technical Papers (ISSCC), 2014 IEEE International. 5 pages.
Horst et al., Cascaded Mach-Zehnder wavelength filters in silicon photonics for low loss and flat pass-band WDM (de-)multiplexing. Optics Express. 2013;21(10):11652-8. DOI:10.1364/OE.21.011652.

(56) References Cited

OTHER PUBLICATIONS

Humphreys et al., Linear Optical Quantum Computing in a Single Spatial Mode. Physical Review Letters. 2013;111:150501. 5 pages. DOI: 10.1103/PhysRevLett.111.150501.

Inagaki et al., Large-scale ising spin network based on degenerate optical parametric oscillators. Nature Photonics. 2016;10:415-419. 6 pages. DOI: 10.1038/NPHOTON.2016.68.

Isichenko, Percolation, statistical topography, and trans-port in random media. Reviews of Modern Physics. 1992;64(4):961-1043.

Jaekel et al., Quantum limits in interferometric measurements. Europhysics Letters. 1990;13(4):301-306.

Jalali et al., Silicon Photonics. Journal of Lightwave Technology. 2006;24(12):4600-15. DOI: 10.1109/JLT.2006.885782.

Jia et al., Caffe: Convolutional architecture for fast feature embedding. Proceedings of the 22nd ACM International Conference on Multimedia. Nov. 2014. 4 pages. URL:http://doi.acm.org/10.1145/2647868.2654889.

Jiang et al., A planar ion trapping microdevice with integrated waveguides for optical detection. Optics Express. 2011;19(4):3037-43.

Jonsson, An empirical approach to finding energy efficient ADC architectures. 2011 International Workshop on ADC Modelling, Testing and Data Converter Analysis and Design and IEEE 2011 ADC Forum. 6 pages.

Jouppi et al., In-datacenter performance analysis of a tensor processing unit. Proceeding of Computer Architecture (ISCA). Jun. 2017. 12 pages. URL:https://doi.org/10.1145/3079856.3080246.

Kahn et al., Communications expands its space. Nature Photonics. 2017;11:5-8.

Kardar et al., Dynamic Scaling of Growing Interfaces. Physical Review Letters. 1986;56(9):889-892.

Karpathy, CS231n Convolutional Neural Networks for Visual Recognition. Class notes. 2019. URL:http://cs231n.github.io/ 2 pages, [last accessed Sep. 24, 2019].

Keckler et al., GPUs and the future of parallel computing. IEEE Micro. 2011;31:7-17. DOI: 10.1109/MM.2011.89.

Kieling et al., On photonic Controlled Phase Gates. New Journal of Physics. 2010;12:0133003. 17 pages. DOI: 10.1088/1367-2630/12/1/013003.

Kilper et al., Optical networks come of age. Optics Photonics News. 2014;25:50-57. DOI: 10.1364/OPN.25.9.000050.

Kim et al., A functional hybrid memristor crossbar-array/cmos system for data storage and neuromorphic applications. Nano Letters. 2011;12:389-395.

Kirkpatrick et al., Optimization by simulated annealing. Science. 1983;220(4598):671-680.

Knill et al., A scheme for efficient quantum computation with linear optics. Nature. 2001;409(4652):46-52.

Knill et al., The Bayesian brain: the role of uncertainty in neural coding and computation. Trends in Neurosciences. 2004;27(12):712-719.

Knill, Quantum computing with realistically noisy devices. Nature. 2005;434:39-44.

Kok et al., Linear optical quantum computing with photonic qubits. Reviews of Modern Physics. 2007;79(1):135-174.

Koos et al., Silicon-organic hybrid (SOH) and plasmonic-organic hybrid (POH) integration. Journal of Lightwave Technology. 2016;34(2):256-268.

Krizhevsky et al., ImageNet classification with deep convolutional neural networks. Advances in Neural Information Processing Systems (NIPS). 2012. 9 pages.

Kucherenko et al., Application of Deterministic Low-Discrepancy Sequences in Global Optimization. Computational Optimization and Applications. 2005;30:297-318.

Kwack et al., Monolithic InP strictly non-blocking 8x8 switch for high-speed WDM optical interconnection. Optics Express. 2012;20(27):28734-41.

Lahini et al., Anderson Localization and Nonlinearity in One-Dimensional Disordered Photonic Lattices. Physical Review Letters. 2008;100:013906. 4 pages. DOI: 10.1103/PhysRevLett. 100. 013906.

Lahini et al., Quantum Correlations in Two-Particle Anderson Localization. Physical Review Letters. 2010; 105:163905. 4 pages. DOI: 10.1103/PhysRevLett.105.163905.

Laing et al., High-fidelity operation of quantum photonic circuits. Applied Physics Letters. 2010;97:211109. 5 pages. DOI: 10.1063/1.3497087.

Landauer, Irreversibility and heat generation in the computing process. IBM Journal of Research and Development. 1961. pp. 183-191.

Lanyon et al., Towards quantum chemistry on a quantum computer. Nature Chemistry. 2010;2:106-10. DOI: 10.1038/NCHEM.483.

Lawson et al., Basic linear algebra subprograms for Fortran usage. ACM Transactions on Mathematical Software (TOMS). 1979;5(3):308-323.

Lecun et al., Deep learning. Nature. 2015;521:436-444. DOI:10.1038/nature14539.

Lecun et al., Gradient-based learning applied to document recognition. Proceedings of the IEEE. Nov. 1998. 46 pages.

Levi et al., Hyper-transport of light and stochastic acceleration by evolving disorder. Nature Physics. 2012;8:912-7. DOI: 10.1038/NPHYS2463.

Li et al., Efficient and self-adaptive in-situ learning in multilayer memristor neural networks. Nature Communications. 2018;9:2385. 8 pages, doi: 10.1038/s41467-018-04484-2.

Lin et al., All-optical machine learning using diffractive deep neural networks. Science. 2018;361:1004-1008. 6 pages, doi: 10.1126/science.aat8084.

Little, The existence of persistent states in the brain. Mathematical Biosciences. 1974;19:101-120.

Lu et al., 16 x 16 non-blocking silicon optical switch based on electro-optic Mach-Zehnder interferometers. Optics Express. 2016:24(9):9295-9307. doi: 10.1364/OE.24.009295.

Ma et al., Optical switching technology comparison: Optical mems vs. Other technologies. IEEE Optical Communications. 2003;41(11):S16-S23.

MacReady et al., Criticality and Parallelism in Combinatorial Optimization. Science. 1996;271:56-59.

Marandi et al., Network of time-multiplexed optical parametric oscillators as a coherent Ising machine. Nature Photonics. 2014;8:937-942. doi: 10.1038/NPHOTON.2014.249.

Martin-Lopez et al., Experimental realization of Shor's quantum factoring algorithm using qubit recycling. Nature Photonics. 2012;6:773-6. DOI: 10.1038/NPHOTON.2012.259.

McMahon et al., A fully programmable 100-spin coherent Ising machine with all-to-all connections. Science. 2016;354(6312):614-7. DOI: 10.1126/science.aah5178.

Mead, Neuromorphic electronic systems. Proceedings of the IEEE. 1990;78(10):1629-1636.

Migdall et al., Tailoring single-photon and multiphoton probabilities of a single-photon on-demand source. Physical Review A. 2002;66:053805. 4 pages. DOI: 10.1103/PhysRevA.66.053805.

Mikkelsen et al., Dimensional variation tolerant silicon-on-insulator directional couplers. Optics Express. 2014;22(3):3145-50. DOI:10.1364/OE.22.003145.

Miller, Are optical transistors the logical next step? Nature Photonics. 2010;4:3-5.

Miller, Attojoule optoelectronics for low-energy information processing and communications. Journal of Lightwave Technology. 2017;35(3):346-96. DOI: 10.1109/JLT.2017.2647779.

Miller, Energy consumption in optical modulators for interconnects. Optics Express. 2012;20(S2):A293-A308.

Miller, Perfect optics with imperfect components. Optica. 2015;2(8):747-750.

Miller, Reconfigurable add-drop multiplexer for spatial modes. Optics Express. 2013;21(17):20220-9. DOI:10.1364/OE.21.020220.

Miller, Self-aligning universal beam coupler, Optics Express. 2013;21(5):6360-70.

(56) References Cited

OTHER PUBLICATIONS

Miller, Self-configuring universal linear optical component [Invited]. Photonics Research. 2013;1(1):1-15. URL:http://dx.doi.org/10.1364/PRJ.1.000001.
Misra et al., Artificial neural networks in hardware: A survey of two decades of progress. Neurocomputing. 2010;74:239-255.
Mohseni et al., Environment-assisted quantum walks in photosynthetic complexes. The Journal of Chemical Physics. 2008;129:174106. 10 pages. DOI: 10.1063/1.3002335.
Moore, Cramming more components onto integrated circuits. Proceeding of the IEEE. 1998;86(1):82-5.
Mower et al., Efficient generation of single and entangled photons on a silicon photonic integrated chip. Physical Review A. 2011;84:052326. 7 pages. DOI: 10.1103/PhysRevA.84.052326.
Mower et al., High-fidelity quantum state evolution in imperfect photonic integrated circuits. Physical Review A. 2015;92(3):032322. 7 pages, doi: 10.1103/PhysRevA.92.032322.
Nagamatsu et al., A 15 NS 32x32-bit CMOS multiplier with an improved parallel structure. IEEE Custom Integrated Circuits Conference. 1989. 4 pages.
Najafi et al., On-Chip Detection of Entangled Photons by Scalable Integration of Single-Photon Detectors. arXiv:1405.4244. May 16, 2014. 27 pages.
Najafi et al., On-Chip detection of non-classical light by scalable integration of single-photon detectors. Nature Communications. 2015;6:5873. 8 pages. DOI: 10.1038/ncomms6873.
Naruse, Nanophotonic Information Physics. Nanointelligence and Nanophotonic Computing. Springer. 2014. 261 pages. DOI 10.1007/978-3-642-40224-1.
Nozaki et al., Sub-femtojoule all-optical switching using a photonic-crystal nanocavity. Nature Photonics. 2010;4:477-483. doi: 10.1038/NPHOTON.2010.89.
O'Brien et al., Demonstration of an all-optical quantum controlled-NOT gate. Nature. 2003;426:264-7.
Onsager, Crystal Statistics. I. A Two-Dimensional Model with an Order-Disorder Transition. Physical Review. 1944;65(3,4):117-149.
Orcutt et al., Nanophotonic integration in state-of-the-art CMOS foundries. Optics Express. 2011;19(3):2335-46.
Pelissetto et al., Critical phenomena and renormalization-group theory. Physics Reports. Apr. 2002. 150 pages.
Peng, Implementation of AlexNet with Tensorflow. https://github.com/ykpengba/AlexNet-A-Practical-Implementation. 2018. 2 pages, [last accessed Sep. 24, 2019].
Peretto, Collective properties of neural networks: A statistical physics approach. Biological Cybernetics. 1984;50:51-62.
Pernice et al., High-speed and high-efficiency travelling wave single-photon detectors embedded in nanophotonic circuits. Nature Communications 2012;3:1325. 10 pages. DOI: 10.1038/ncomms2307.
Peruzzo et al., Quantum walk of correlated photons. Science. 2010;329;1500-3. DOI: 10.1126/science.1193515.
Politi et al., Integrated Quantum Photonics, IEEE Journal of Selected Topics in Quantum Electronics, 2009;5(6):1-12. Doi: 10.1109/JSTQE.2009.2026060.
Politi et al., Silica-on-Silicon Waveguide Quantum Circuits. Science. 2008;320:646-9. DOI: 10.1126/science.1155441.
Poon et al., Neuromorphic silicon neurons and large-scale neural networks: challenges and opportunities. Frontiers in Neuroscience. 2011;5:1-3. doi: 10.3389/fnins.2011.00108.
Prucnal et al., Recent progress in semiconductor excitable lasers for photonic spike processing. Advances in Optics and Photonics. 2016;8(2):228-299.
Psaltis et al., Holography in artificial neural networks. Nature. 1990;343:325-330.
Qiao et al., 16x16 non-blocking silicon electro-optic switch based on mach zehnder interferometers. Optical Fiber Communication Conference. Optical Society of America. 2016. 3 pages.
Ralph et al., Linear optical controlled-NOT gate in the coincidence basis. Physical Review A. 2002;65:062324-1-062324-5. DOI: 10.1103/PhysRevA.65.062324.
Ramanitra et al., Scalable and multi-service passive optical access infrastructure using variable optical splitters. Optical Fiber Communication Conference. Optical Society of America. 2005. 3 pages.
Raussendorf et al., A one-way quantum computer. Physical Review Letter. 2001;86(22):5188-91. DOI: 10.1103/PhysRevLett.86.5188.
Rechtsman et al., Photonic floquet topological insulators. Nature. 2013;496:196-200. doi: 10.1038/nature12066.
Reck et al., Experimental realization of any discrete unitary operator. Physical review letters. 1994;73(1):58-61. 6 pages.
Reed et al., Silicon optical modulators. Nature Photonics. 2010;4:518-26. DOI: 10.1038/NPHOTON.2010.179.
Rendl et al., Solving Max-Cut to optimality by intersecting semidefinite and polyhedral relaxations. Mathematical Programming. 2010;121:307-335. doi: 10.1007/s10107-008-0235-8.
Rios et al., Integrated all-photonic non-volatile multilevel memory. Nature Photonics. 2015;9:725-732. doi: 10.1038/NPHOTON.2015.182.
Rogalski, Progress in focal plane array technologies. Progress in Quantum Electronics. 2012;36:342-473.
Rohit et al., 8x8 space and wavelength selective cross-connect for simultaneous dynamic multi-wavelength routing. Optical Fiber Communication Conference. OFC/NFOEC Technical Digest. 2013. 3 pages.
Rosenblatt, The perceptron: a probabilistic model for information storage and organization in the brain. Psychological Review. 1958;65(6):386-408.
Russakovsky et al., ImageNet Large Scale Visual Recognition Challenge. arXiv:1409.0575v3. Jan. 2015. 43 pages.
Saade et al., Random projections through multiple optical scattering: Approximating Kernels at the speed of light. arXiv:1510.06664v2. Oct. 25, 2015. 6 pages.
Salandrino et al., Analysis of a three-core adiabatic directional coupler. Optics Communications. 2009;282:4524-6. doi:10.1016/j.optcom.2009.08.025.
Schaeff et al., Scalable fiber integrated source for higher-dimensional path-entangled photonic quNits. Optics Express. 2012;20(15):16145-153.
Schirmer et al., Nonlinear mirror based on two-photon absorption. Journal of the Optical Society of America B. 1997;14(11):2865-8.
Schmidhuber, Deep learning in neural networks: An overview. Neural Networks. 2015;61:85-117.
Schneider et al., Adaptive relevance matrices in Learning Vector Quantization. Institute for Mathematics and Computing Science, University of Groninge. 27 pages. URL: http://www.cs.rug.nl/~biehl/Preprints/mlmatrix.pdf [last retrieved Apr. 16, 2014].
Schreiber et al., Decoherence and Disorder in Quantum Walks: From Ballistic Spread to Localization. Physical Review Letters. 2011;106:180403. 4 pages. DOI: 10.1103/PhysRevLett.106.180403.
Schwartz et al., Transport and Anderson localization in disordered two-dimensional photonic lattices. Nature. 2007;446:52-5. doi:10.1038/nature05623.
Selden, Pulse transmission through a saturable absorber. British Journal of Applied Physics. 1967;18:743-8.
Shafiee et al., Isaac: A convolutional neural network accelerator with in-situ analog arithmetic in crossbars. ACM/IEEE 43rd Annual International Symposium on Computer Architecture. Oct. 2016. 13 pages.
Shen et al., Deep learning with coherent nanophotonic circuits. Nature Photonics. 2017;11:441-6. Doi: 10.1038/NPHOTON.2017.93.
Shoji et al., Low-crosstalk 2x2 thermo-optic switch with silicon wire waveguides. Optics Express.2010;18(9):9071-5.
Silver et al. Mastering chess and shogi by self-play with a general reinforcement learning algorithm. arXiv preprint arXiv:1712.01815. 19 pages. 2017.
Silver et al., Mastering the game of go with deep neural networks and tree search. Nature. 2016;529:484-9. 20 pages. doi:10.1038/nature16961.
Silver et al., Mastering the game of Go without human knowledge. Nature. 2017;550:354-9. 18 pages. doi:10.1038/nature24270.

(56) References Cited

OTHER PUBLICATIONS

Silverstone et al., On-chip quantum interference between silicon photon-pair sources. Nature Photonics. 2014;8:104-8. DOI: 10.1038/NPHOTON.2013.339.

Smith et al., Phase-controlled integrated photonic quantum circuits. Optics Express. 2009;17(16):13516-25.

Soljacic et al., Optimal bistable switching in nonlinear photonic crystals. Physical Review E. 2002;66:055601. 4 pages.

Solli et al., Analog optical computing. Nature Photonics. 2015;9:704-6.

Spring et al., Boson sampling on a photonic chip. Science. 2013;339:798-801. DOI: 10.1126/science.1231692.

Srinivasan et al., 56 GB/s germanium waveguide electro-absorption modulator. Journal of Lightwave Technology. 2016;34(2):419-24. DOI: 10.1109/JLT.2015.2478601.

Steinkraus et al., Using GPUs for machine learning algorithms. Proceedings of the 2005 Eight International Conference on Document Analysis and Recognition. 2005. 6 pages.

Suda et al., Quantum interference of photons in simple networks. Quantum Information Process. 2013;12:1915-45. DOI 10.1007/s11128-012-0479-3.

Sun et al., Large-scale nanophotonic phased array. Nature. 2013;493:195-9. doi:10.1038/nature11727.

Sun et al., Single-chip microprocessor that communicates directly using light. Nature. 2015;528:534-8. doi:10.1038/nature16454.

Suzuki et al., Ultra-compact 8x8 strictly-non-blocking Si-wire PILOSS switch. Optics Express. 2014;22(4):3887-94. DOI:10.1364/OE.22.003887.

Sze et al., Efficient processing of deep neural networks: A tutorial and survey. Proceedings of the IEEE. 2017;105(12):2295-2329. DOI: 10.1109/JPROC.2017.276174.

Tabia, Experimental scheme for qubit and qutrit symmetric informationally complete positive operator-valued measurements using multiport devices. Physical Review A. 2012;86:062107. 8 pages. DOI: 10.1103/PhysRevA.86.062107.

Tait et al., Broadcast and weight: An integrated network for scalable photonic spike processing. Journal of Lightwave Technology. 2014;32(21):3427-39. Doi: 10.1109/JLT.2014.2345652.

Tait et al., Chapter 8 Photonic Neuromorphic Signal Processing and Computing. Springer, Berlin, Heidelberg. 2014. pp. 183-222.

Tait et al., Neuromorphic photonic networks using silicon photonic weight banks. Scientific Reports. 2017;7:7430. 10 pages.

Tanabe et al., Fast bistable all-optical switch and memory on a silicon photonic crystal on-chip. Optics Letters. 2005;30(19):2575-7.

Tanizawa et al., Ultra-compact 32x32 strictly-non-blocking Si-wire optical switch with fan-out LGA interposer. Optics Express. 2015;23(13):17599-606. DOI:10.1364/OE.23.017599.

Thompson et al., Integrated waveguide circuits for optical quantum computing. IET Circuits, Devices, & Systems. 2011;5(2):94-102. doi: 10.1049/iet-cds.2010.0108.

Timurdogan et al., An ultralow power athermal silicon modulator. Nature Communications. 2014;5:4008. 11 pages. DOI: 10.1038/ncomms5008.

Vandoorne et al., Experimental demonstration of reservoir computing on a silicon photonics chip. Nature Communications. 2014;5:3541. 6 pages. DOI: 10.1038/ncomms4541.

Vazquez et al., Optical NP problem solver on laser-written waveguide plat-form. Optics Express. 2018;26(2):702-10.

Vivien et al., Zero-bias 40gbit/s germanium waveguide photodetector on silicon. Optics Express. 2012;20(2): 1096-1101.

Wang et al., Coherent Ising machine based on degenerate optical parametric oscillators. Physical Review A. 2013;88:063853. 9 pages. DOI: 10.1103/PhysRevA.88.063853.

Wang et al., Deep learning for identifying metastatic breast cancer. arXiv preprint arXiv:1606.05718. Jun. 18, 2016. 6 pages.

Werbos, Beyond regression: New tools for prediction and analysis in the behavioral sciences. Ph.D. dissertation, Harvard University. Aug. 1974. 454 pages.

Whitfield et al., Simulation of electronic structure Hamiltonians using quantum computers. Molecular Physics. 2010;109(5,10):735-50. DOI: 10.1080/00268976.2011.552441.

Wu et al., An optical fiber network oracle for NP-complete problems. Light: Science & Applications. 2014;3: e147. 5 pages. doi:10.1038/1sa.2014.28.

Xia et al., Mode conversion losses in silicon-on-insulator photonic wire based racetrack resonators. Optics Express. 2006;14(9):3872-86.

Xu et al., Experimental observations of bistability and instability in a two-dimensional nonlinear optical superlattice. Physical Review Letters. 1993;71(24):3959-62.

Yang et al., Non-Blocking 4x4 Electro-Optic Silicon Switch for On-Chip Photonic Networks. Optics Express 2011;19(1):47-54.

Yao et al., Serial-parallel multipliers. Proceedings of 27th Asilomar Conference on Signals, Systems and Computers. 1993. pp. 359-363.

Young et al., Recent trends in deep learning based natural language processing. IEEE Computational Intelligence Magazine. arXiv:1708.02709v8. Nov. 2018. 32 pages.

Zhou et al., Calculating Unknown Eigenvalues with a Quantum Algorithm. Nature Photonics. 2013;7:223-8. Doi: 10.1038/NPHOTON.2012.360.

\* cited by examiner

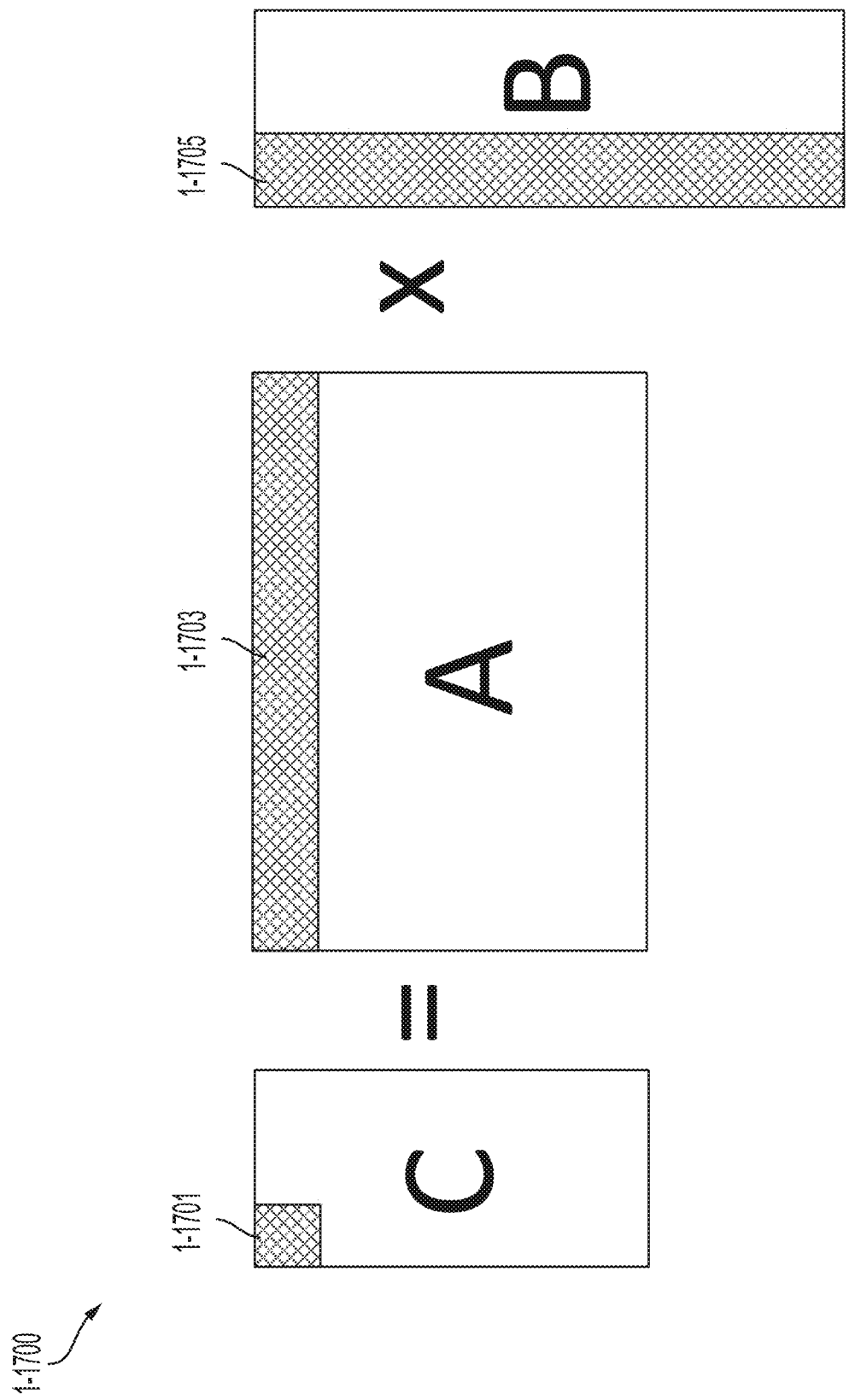

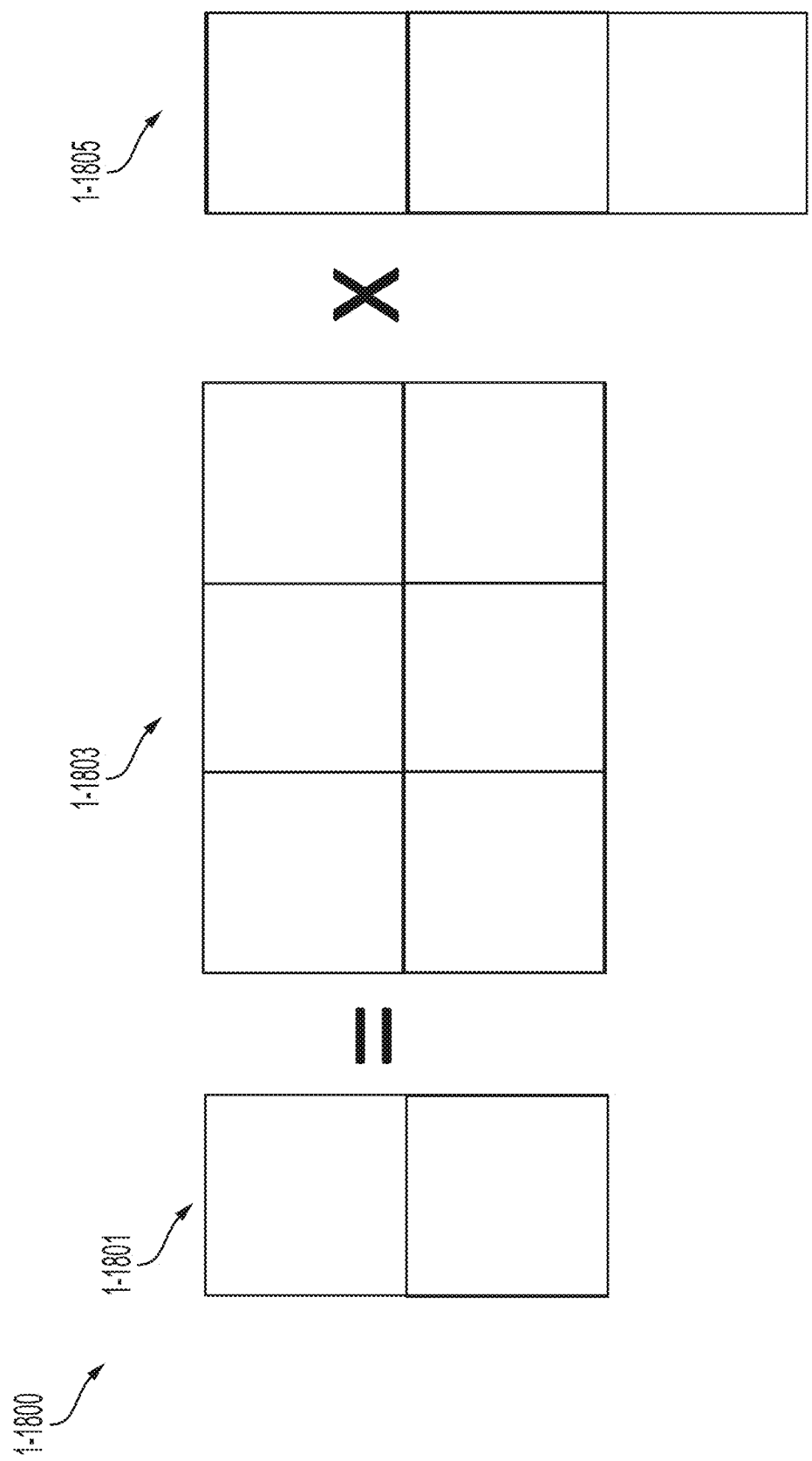

SYSTEMS AND METHODS FOR TRAINING MATRIX-BASED DIFFERENTIABLE PROGRAMS

RELATED APPLICATIONS

This Application is a Continuation of U.S. application Ser. No. 16/412,159, filed May 14, 2019, entitled "SYSTEMS AND METHODS FOR TRAINING MATRIX-BASED DIFFERENTIABLE PROGRAMS," which claims priority under 35 U.S.C. § 119(e) to U.S. Application Ser. No. 62/680,557, filed Jun. 4, 2018, entitled "PHOTONIC PROCESSING SYSTEMS AND METHODS," and U.S. Application Ser. No. 62/671,793, filed May 15, 2018, entitled "ALGORITHMS FOR TRAINING NEURAL NETWORKS WITH PHOTONIC HARDWARE ACCELERATORS," the entire contents of each of which is incorporated herein by reference in its entirety.

BACKGROUND

Deep learning, machine learning, latent-variable models, neural networks and other matrix-based differentiable programs are used to solve a variety of problems, including natural language processing and object recognition in images. Solving these problems with deep neural networks typically requires long processing times to perform the required computation. The conventional approach to speed up deep learning algorithms has been to develop specialized hardware architectures. This is because conventional computer processors, e.g., central processing units (CPUs), which are composed of circuits including hundreds of millions of transistors to implement logical gates on bits of information represented by electrical signals, are designed for general purpose computing and are therefore not optimized for the particular patterns of data movement and computation required by the algorithms that are used in deep learning and other matrix-based differentiable programs. One conventional example of specialized hardware for use in deep learning are graphics processing units (GPUs) having a highly parallel architecture that makes them more efficient than CPUs for performing image processing and graphical manipulations. After their development for graphics processing, GPUs were found to be more efficient than CPUs for other parallelizable algorithms, such as those used in neural networks and deep learning. This realization, and the increasing popularity of artificial intelligence and deep learning, led to further research into new electronic circuit architectures that could further enhance the speed of these computations.

Deep learning using neural networks conventionally requires two stages: a training stage and an evaluation stage (sometimes referred to as "inference"). Before a deep learning algorithm can be meaningfully executed on a processor, e.g., to classify an image or speech sample, during the evaluation stage, the neural network must first be trained. The training stage can be time consuming and requires intensive computation.

SUMMARY

Aspects of the present application relate to techniques for training matrix-based differentiable programs using a processing system. A matrix of values in a Euclidean vector spaces is represented as an angular representation and at least some gradients of parameters of the angular representation are computed in parallel by the processing system.

In some embodiments, a method for training a matrix-based differentiable program using a photonics-based processor is provided. The matrix-based differentiable program includes at least one matrix-valued variable associated with a matrix of values in a Euclidean vector space. The method comprises configuring components of the photonics-based processor to represent the matrix of values as an angular representation, processing, using the components of the photonics-based processor, training data to compute an error vector, determining in parallel, at least some gradients of parameters of the angular representation, wherein the determining is based on the error vector and a current input training vector, and updating the matrix of values by updating the angular representation based on the determined gradients.

In at least one aspect, configuring components of the photonics-based processor to represent the matrix of values as an angular representation comprises using singular value decomposition to transform the matrix of values into a first unitary matrix, a second unitary matrix and a diagonal matrix of signed or normalized singular values, decomposing the first unitary matrix into a first set of unitary transfer matrices, decomposing the second unitary matrix into a second set of unitary transfer matrices, configuring a first set of components of the photonics-based processor based on the first set of unitary transfer matrices, configuring a second set of components of the photonics-based processor based on the diagonal matrix of singular values, and configuring a third set of components of the photonics-based processor based on the second set of unitary transfer matrices.

In at least one aspect, the first set of unitary transfer matrices includes a plurality of columns, and wherein determining in parallel, at least some of the gradients of parameters of the angular representation comprises determining in parallel, gradients for multiple columns of the plurality of columns.

In at least one aspect, processing the training data to compute an error vector comprises encoding the input training vector using photonic signals, providing the photonic signals as input to the photonics-based processor to generate an output vector, decoding the output vector, determining, based on the decoded output vector, a value of a loss function for the input training vector, and computing the error vector based on aggregating the values of the loss function determined for a set of input training vectors in the training data.

In at least one aspect, determining in parallel, at least some gradients of parameters of the angular representation comprises determining in parallel, gradients of the parameters for each column of the decomposed first unitary matrix, gradients of the parameters for each column of the decomposed second unitary matrix, and gradients of the parameters for the singular values.

In at least one aspect, determining in parallel, gradients of the parameters for each column of the decomposed first unitary matrix comprises (a) computing a block diagonal derivative matrix containing derivatives with respect to each parameter in a selected column k of the first set of unitary transfer matrices, (b) computing a product of the error vector with all unitary transfer matrices in the decomposed first unitary matrix between the selected column k and an output column of the first set unitary transfer matrices, (c) computing a product of an input training data vector with all unitary transfer matrices in the decomposed first unitary matrix from an input column of the first set of unitary transfer matrices up to and including the selected column k of the first set of unitary transfer matrices, (d) multiplying the result of act (c) by the block diagonal derivative matrix computed in act (a), and computing inner products between successive pairs of elements from the output of act (b) and the output of act (d).

In at least one aspect, determining in parallel, at least some gradients of parameters of the angular representation comprises backpropagating the error vector through the angular representation of the matrix of values.

In at least one aspect, configuring components of the photonics-based processor to represent the matrix of values as an angular representation comprises partitioning the matrix of values into two or more matrices having smaller dimensions, and configuring components of the photonics-based processor to represent the values in one of the two or more matrices having smaller dimensions.

In at least one aspect, updating the angular representation comprises updating the parameters for the first set of components, the second set of components and the third set of components using a plurality of iterations, and for some iterations of the plurality of iterations only the parameters for the second set of components is updated.

In at least one aspect, updating the angular representation comprises updating the parameters for the first set of components, the second set of components and the third set of components, and a first learning rate for updating the first and third sets of components is different than a second learning rate for updating the second set of components.

In some embodiments, a non-transitory computer readable medium encoded with a plurality of instructions is provided. The plurality of instructions, when executed by at least one photonics-based processor, perform a method for training a latent variable graphical model, the latent variable graphical model including at least one matrix-valued latent variable associated with a matrix of values in a Euclidean vector space. The method comprises configuring components of the photonics-based processor to represent the matrix of values as an angular representation, processing, using the components of the photonics-based processor, training data to compute an error vector, determining in parallel, at least some gradients of parameters of the angular representation, wherein the determining is based on the error vector and a current input training vector, and updating the matrix of values by updating the angular representation based on the determined gradients.

In at least one aspect, configuring components of the photonics-based processor to represent the matrix of values as an angular representation comprises, using singular value decomposition to transform the matrix of values into a first unitary matrix, a second unitary matrix and a diagonal matrix of signed or normalized singular values, decomposing the first unitary matrix into a first set of unitary transfer matrices, decomposing the second unitary matrix into a second set of unitary transfer matrices, configuring a first set of components of the photonics-based processor based on the first set of unitary transfer matrices, configuring a second set of components of the photonics-based processor based on the diagonal matrix of singular values, and configuring a third set of components of the photonics-based processor based on the second set of unitary transfer matrices.

In at least one aspect, the first set of unitary transfer matrices includes a plurality of columns, and wherein determining in parallel, at least some of the gradients of parameters of the angular representation comprises determining in parallel, gradients for multiple columns of the plurality of columns.

In at least one aspect, processing the training data to compute an error vector comprises encoding the input training vector using photonic signals, providing the photonic signals as input to the photonics-based processor to generate an output vector, decoding the output vector, determining, based on the decoded output vector, a value of a loss function for the input training vector, and computing the error vector based on aggregating the values of the loss function determined for a set of input training vectors in the training data.

In at least some aspects, determining in parallel, at least some gradients of parameters of the angular representation comprises determining in parallel, gradients of the parameters for each column of the decomposed first unitary matrix, gradients of the parameters for each column of the decomposed second unitary matrix, and gradients of the parameters for the singular values.

In at least some aspects, determining in parallel, gradients of the parameters for each column of the decomposed first unitary matrix and the decomposed second unitary matrix comprises (a) computing a block diagonal derivative matrix containing derivatives with respect to each parameter in a selected column k of the first set of unitary transfer matrices, (b) computing a product of the error vector with all unitary transfer matrices in the decomposed first unitary matrix between selected column k of the first set of unitary transfer matrices and an output column of the first set unitary transfer matrices, (c) computing a product of an input training data vector with all unitary transfer matrices in the decomposed first unitary matrix from an input column of the first set of unitary transfer matrices up to and including the selected column k of the first set of unitary transfer matrices, (d) multiplying the result of act (c) by the block diagonal derivative matrix computed in act (a), and computing inner products between successive pairs of elements from the output of act (b) and the output of act (d).

In at least some aspects, determining in parallel, at least some gradients of parameters of the angular representation comprises backpropagating the error vector through the angular representation of the matrix of values.

In at least some aspects, configuring components of the photonics-based processor to represent the matrix of values as an angular representation comprises partitioning the matrix of values into two or more matrices having smaller dimensions, and configuring components of the photonics-based processor to represent the values in one of the two or more matrices having smaller dimensions.

In at least some aspects, updating the angular representation comprises updating the parameters for the first set of components, the second set of components and the third set of components using a plurality of iterations, and for some iterations of the plurality of iterations only the parameters for the second set of components is updated.

In at least some aspects, updating the angular representation comprises updating the parameters for the first set of components, the second set of components and the third set of components, and a first learning rate for updating the first and third sets of components is different than a second learning rate for updating the second set of components.

In some embodiments, a photonics-based processing system is provided. The photonics-based processing system, comprises a photonics processor, and a non-transitory computer readable medium encoded with a plurality of instructions that, when executed by the photonics processor perform a method for training a latent variable graphical model, the latent variable graphical model including at least one matrix-valued latent variable associated with a matrix of values in a Euclidean vector space. The method comprises configuring components of the photonics processor to represent the matrix of values as an angular representation, processing, using the components of the photonics processor, training data to compute an error vector, determining in parallel, at least some gradients of parameters of the angular representation, wherein the determining is based on the error vector and a current input training vector, and updating the matrix of values by updating the angular representation based on the determined gradients.

In at least some aspects, configuring components of the photonics-based processor to represent the matrix of values as an angular representation comprises using singular value decomposition to transform the matrix of values into a first unitary matrix, a second unitary matrix and a diagonal matrix of signed or normalized singular values, decomposing the first unitary matrix into a first set of unitary transfer matrices, decomposing the second unitary matrix into a second set of unitary transfer matrices, configuring a first set of components of the photonics-based processor based on the first set of unitary transfer matrices, configuring a second set of components of the photonics-based processor based on the diagonal matrix of singular values, and configuring a third set of components of the photonics-based processor based on the second set of unitary transfer matrices.

In at least some aspects, the first set of unitary transfer matrices includes a plurality of columns, and wherein determining in parallel, at least some of the gradients of parameters of the angular representation comprises determining in parallel, gradients for multiple columns of the plurality of columns.

In at least some aspects, processing the training data to compute an error vector comprises encoding the input training vector using photonic signals, providing the photonic signals as input to the photonics-based processor to generate an output vector, decoding the output vector, determining, based on the decoded output vector, a value of a loss function for the input training vector, and computing the error vector based on aggregating the values of the loss function determined for a set of input training vectors in the training data.

In at least some aspects, determining in parallel, at least some gradients of parameters of the angular representation comprises determining in parallel, gradients of the parameters for each column of the decomposed first unitary matrix, gradients of the parameters for each column of the decomposed second unitary matrix, and gradients of the parameters for the singular values.

In at least some aspects, determining in parallel, gradients of the parameters for each column of the decomposed first unitary matrix and the decomposed second unitary matrix comprises (a) computing a block diagonal derivative matrix containing derivatives with respect to each parameter in a selected column k of the first set of unitary transfer matrices, (b) computing a product of the error vector with all unitary transfer matrices in the decomposed first unitary matrix between selected column k of the first set of unitary transfer matrices and an output column of the first set unitary transfer matrices, (c) computing a product of an input training data vector with all unitary transfer matrices in the decomposed first unitary matrix from an input column of the first set of unitary transfer matrices up to and including the selected column k of the first set of unitary transfer matrices, (d) multiplying the result of act (c) by the block diagonal derivative matrix computed in act (a), and computing inner products between successive pairs of elements from the output of act (b) and the output of act (d).

In at least some aspects, determining in parallel, at least some gradients of parameters of the angular representation comprises backpropagating the error vector through the angular representation of the matrix of values.

In at least some aspects, configuring components of the photonics-based processor to represent the matrix of values as an angular representation comprises partitioning the matrix of values into two or more matrices having smaller dimensions, and configuring components of the photonics-based processor to represent the values in one of the two or more matrices having smaller dimensions.

In at least some aspects, updating the angular representation comprises updating the parameters for the first set of components, the second set of components and the third set of components using a plurality of iterations, and for some iterations of the plurality of iterations only the parameters for the second set of components is updated.

In at least some aspects, updating the angular representation comprises updating the parameters for the first set of components, the second set of components and the third set of components, and a first learning rate for updating the first and third sets of components is different than a second learning rate for updating the second set of components.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF THE DRAWINGS

FIG. 1-2 is a schematic diagram of an optical encoder, in accordance with some non-limiting embodiments.

FIG. 1-3 is a schematic diagram of a photonic processor, in accordance with some non-limiting embodiments.

FIG. 1-4 is a schematic diagram of an interconnected variable beam splitter array, in accordance with some non-limiting embodiments.

FIG. 1-5 is a schematic diagram of a variable beam splitter, in accordance with some non-limiting embodiments.

FIG. 1-6 is a schematic diagram of a diagonal attenuation and phase shifting implementation, in accordance with some non-limiting embodiments.

FIG. 1-7 is a schematic diagram of an attenuator, in accordance with some non-limiting embodiments.

FIG. 1-8 is a schematic diagram of a power tree, in accordance with some non-limiting embodiments.

FIG. 1-9 is a schematic diagram of an optical receiver, in accordance with some non-limiting embodiments, in accordance with some non-limiting embodiments.

FIG. 1-10 is a schematic diagram of a homodyne detector, in accordance with some non-limiting embodiments, in accordance with some non-limiting embodiments.

FIG. 1-11 is a schematic diagram of a folded photonic processing system, in accordance with some non-limiting embodiments.

FIG. 1-12A is a schematic diagram of a wavelength-division-multiplexed (WDM) photonic processing system, in accordance with some non-limiting embodiments.

FIG. 1-12B is a schematic diagram of the frontend of the wavelength-division-multiplexed (WDM) photonic processing system of FIG. 1-12A, in accordance with some non-limiting embodiments.

FIG. 1-12C is a schematic diagram of the backend of the wavelength-division-multiplexed (WDM) photonic processing system of FIG. 1-12A, in accordance with some non-limiting embodiments.

FIG. 1-13 is a schematic diagram of a circuit for performing analog summation of optical signals, in accordance with some non-limiting embodiments.

FIG. 1-14 is a schematic diagram of a photonic processing system with column-global phases shown, in accordance with some non-limiting embodiments.

FIG. 1-15 is a plot showing the effects of uncorrected global phase shifts on homodyne detection, in accordance with some non-limiting embodiments.

FIG. 1-16 is a plot showing the quadrature uncertainties of coherent states of light, in accordance with some non-limiting embodiments.

FIG. 1-17 is an illustration of matrix multiplication, in accordance with some non-limiting embodiments.

FIG. 1-18 is an illustration of performing matrix multiplication by subdividing matrices into sub-matrices, in accordance with some non-limiting embodiments.

FIG. 1-19 is a flowchart of a method of manufacturing a photonic processing system, in accordance with some non-limiting embodiments.

FIG. 1-20 is a flowchart of a method of manufacturing a photonic processor, in accordance with some non-limiting embodiments.

FIG. 1-21 is a flowchart of a method of performing an optical computation, in accordance with some non-limiting embodiments.

FIG. 2-1 is a flow chart of a process for training a matrix-based differentiable program, in accordance with some non-limiting embodiments.

FIG. 2-2 is a flow chart of a process for configuring a photonics processing system to implement unitary transfer matrices, in accordance with some non-limiting embodiments.

FIG. 2-3 is a flow chart of a process for computing an error vector using a photonics processing system, in accordance with some non-limiting embodiments.

FIG. 2-4 is a flow chart of a process for determining updated parameters for unitary transfer matrices, in accordance with some non-limiting embodiments.

FIG. 2-5 is a flow chart of a process for updating parameters for unitary transfer matrices, in accordance with some non-limiting embodiments.

DETAILED DESCRIPTION

I. Overview of Photonics-Based Processing

Figure 1:
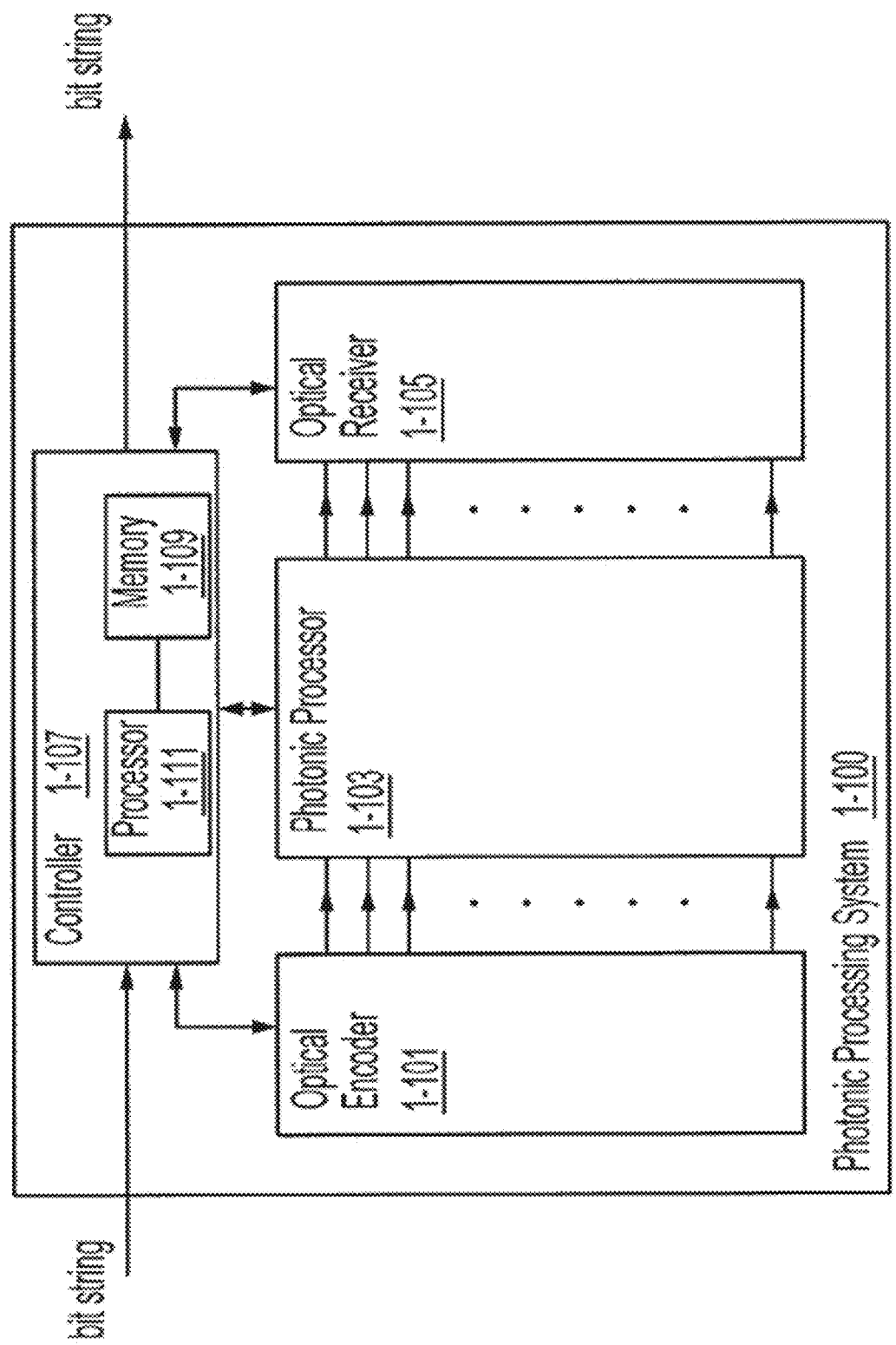
FIG. 1-1 is a schematic diagram of a photonic processing system, in accordance with some non-limiting embodiments.

The inventors have recognized and appreciated that there are limitations to the speed and efficiency of conventional processors based on electrical circuits. Every wire and transistor in the circuits of an electrical processor has a resistance, an inductance, and a capacitance that cause propagation delay and power dissipation in any electrical signal. For example, connecting multiple processor cores and/or connecting a processor core to a memory uses a conductive trace with a non-zero impedance. Large values of impedance limit the maximum rate at which data can be transferred through the trace with a negligible bit error rate. In applications where time delay is crucial, such as high frequency stock trading, even a delay of a few hundredths of a second can make an algorithm unfeasible for use. For processing that requires billions of operations by billions of transistors, these delays add up to a significant loss of time. In addition to electrical circuits' inefficiencies in speed, the heat generated by the dissipation of energy caused by the impedance of the circuits is also a barrier in developing electrical processors.

The inventors further recognized and appreciated that using light signals, instead of electrical signals, overcomes many of the aforementioned problems with electrical computing. Light signals travel at the speed of light in the medium in which the light is traveling; thus the latency of photonic signals is far less of a limitation than electrical propagation delay. Additionally, no power is dissipated by increasing the distance traveled by the light signals, opening up new topologies and processor layouts that would not be feasible using electrical signals. Thus, light-based processors, such as a photonics-based processor may have better speed and efficiency performance than conventional electrical processors.

Additionally, the inventors have recognized and appreciated that a light-based processor, such as a photonics-based processor, may be well-suited for particular types of algorithms. For example, many machine learning algorithms, e.g. support vector machines, artificial neural networks, probabilistic graphical model learning, rely heavily on linear transformations on multi-dimensional arrays/tensors. The simplest example is multiplying vectors by matrices, which using conventional algorithms has a complexity on the order of $O(n^2)$, where n is the dimensionality of the square matrices being multiplied. The inventors have recognized and appreciated that a photonics-based processor, which in some embodiment may be a highly parallel linear processor, can perform linear transformations, such as matrix multiplication, in a highly parallel manner by propagating a particular set of input light signals through a configurable array of beam splitters. Using such implementations, matrix multiplication of matrices with dimension n=512 can be completed in hundreds of picoseconds, as opposed to the tens to hundreds of nanoseconds using conventional processing. Using some embodiments, matrix multiplication is estimated to speed up by two orders of magnitude relative to conventional techniques. For example, a multiplication that may be performed by a state-of-the-art graphics processing unit (GPU) can be performed in about 10 ns can be performed by a photonic processing system according to some embodiments in about 200 ps.

To implement a photonics-based processor, the inventors have recognized and appreciated that the multiplication of an input vector by a matrix can be accomplished by propagating coherent light signals, e.g., laser pulses, through a first array of interconnected variable beam splitters (VBSs), a second array of interconnected variable beam splitters, and multiple controllable optical elements (e.g., electro-optical or optomechanical elements) between the two arrays that connect a single output of the first array to a single input of the second array.

Details of certain embodiments of a photonic processing system that includes a photonic processor are described below.

II. Overview of Training and Backpropagation

The inventors have recognized and appreciated that for many matrix-based differentiable program (e.g., neural network or latent-variable graphical model) techniques, the bulk of the computational complexity lies in matrix-matrix products that are computed as layers of the model are traversed. The complexity of a matrix-matrix product is $O(IJK)$, where the two matrices have dimension I-by-J and J-by-K. Moreover, these matrix-matrix products are performed in both the training stage and the evaluation stage of the model.

A deep neural network (i.e., a neural network with more than one hidden layer) is an example of a type of matrix-based differentiable program that may employ some of the techniques described herein. However, it should be appreciated that the techniques described herein for performing parallel processing may be used with other types of matrix-based differentiable programs including, but not limited to, Bayesian networks, Trellis decoders, topic models, and Hidden Markov Models (HMMs).

The success of deep learning is in large part due to the development of backpropagation techniques that allow for training the weight matrices of the neural network. In conventional backpropagation techniques, an error from a loss function is propagated backwards through individual weight matrix components using the chain rule of calculus. Backpropagation techniques compute the gradients of the elements in the weight matrix, which are then used to determine an update to the weight matrix using an optimization algorithm, such as stochastic gradient descent (SOD), AdaGrad, RMSProp, Adam, or any other gradient-based optimization algorithm. Successive application of this procedure is used to determine the final weight matrix that minimizes the loss function.

The inventors have recognized and appreciated that an optical processor of the type described herein enables the performance of a gradient computation by recasting the weight matrix into an alternative parameter space, referred to herein as a "phase space" or "angular representation." Specifically, in some embodiments, a weight matrix is reparameterized as a composition of unitary transfer matrices, such as Givens rotation matrices. In such a reparameterization, training the neural network includes adjusting the angular parameters of the unitary transfer matrices. In this reparameterization, the gradient of a single rotation angle is decoupled from the other rotations, allowing parallel computation of gradients. This parallelization results in a computational speedup relative to conventional serial gradient determination techniques in terms of the number of computation steps needed.

Before describing the details of the backpropagation procedure, an example photonic processing system that may be used to implement the backpropagation procedure is described. The phase space parameters of the reparameterized weight matrix may be encoded into phase shifters or variable beam splitters of the photonic processing system to implement the weight matrix. Encoding the weight matrix into the phase shifters or variable beam splitters may be used for both the training and evaluation stages of the neural network. While the backpropagation procedure is described in connection with the particular system described below, it should be understood that embodiments are not limited to the particular details of the photonic processing system described in the present disclosure.

III. Photonic Processing System Overview

Referring to FIG. 1-1, a photonic processing system 1-100 includes an optical encoder 1-101, a photonic processor 1-103, an optical receiver 1-105, and a controller 1-107, according to some embodiments. The photonic processing system 1-100 receives, as an input from an external processor (e.g., a CPU), an input vector represented by a group of input bit strings and produces an output vector represented by a group of output bit strings. For example, if the input vector is an n-dimensional vector, the input vector may be represented by n separate bit strings, each bit string representing a respective component of the vector. The input bit string may be received as an electrical or optical signal from the external processor and the output bit string may be transmitted as an electrical or optical signal to the external processor. In some embodiments, the controller 1-107 does not necessarily output an output bit string after every process iteration. Instead, the controller 1-107 may use one or more output bit strings to determine a new input bit stream to feed through the components of the photonic processing system 1-100. In some embodiments, the output bit string itself may be used as the input bit string for a subsequent iteration of the process implemented by the photonic processing system 1-100. In other embodiments, multiple output bit streams are combined in various ways to determine a subsequent input bit string. For example, one or more output bit strings may be summed together as part of the determination of the subsequent input bit string.

The optical encoder 1-101 is configured to convert the input bit strings into optically encoded information to be processed by the photonic processor 1-103. In some embodiments, each input bit string is transmitted to the optical encoder 1-101 by the controller 1-107 in the form of electrical signals. The optical encoder 1-101 converts each component of the input vector from its digital bit string into an optical signal. In some embodiments, the optical signal represents the value and sign of the associated bit string as an amplitude and a phase of an optical pulse. In some embodiments, the phase may be limited to a binary choice of either a zero phase shift or a n phase shift, representing a positive and negative value, respectively. Embodiments are not limited to real input vector values. Complex vector components may be represented by, for example, using more than two phase values when encoding the optical signal. In some embodiments, the bit string is received by the optical encoder 1-101 as an optical signal (e.g., a digital optical signal) from the controller 1-107. In these embodiments, the optical encoder 1-101 converts the digital optical signal into an analog optical signal of the type described above.

The optical encoder 1-101 outputs n separate optical pulses that are transmitted to the photonic processor 1-103. Each output of the optical encoder 1-101 is coupled one-to-one to a single input of the photonic processor 1-103. In some embodiments, the optical encoder 1-101 may be disposed on the same substrate as the photonic processor 1-103 (e.g., the optical encoder 1-101 and the photonic processor 1-103 are on the same chip). In such embodiments, the optical signals may be transmitted from the optical encoder 1-101 to the photonic processor 1-103 in waveguides, such as silicon photonic waveguides. In other embodiments, the optical encoder 1-101 may be disposed on a separate substrate from the photonic processor 1-103. In such embodiments, the optical signals may be transmitted from the optical encoder 1-101 to the photonic processor 103 in optical fiber.

The photonic processor 1-103 performs the multiplication of the input vector by a matrix M. As described in detail below, the matrix M is decomposed into three matrices using a combination of a singular value decomposition (SVD) and a unitary matrix decomposition. In some embodiments, the unitary matrix decomposition is performed with operations similar to Givens rotations in QR decomposition. For example, an SVD in combination with a Householder decomposition may be used. The decomposition of the matrix M into three constituent parts may be performed by the controller 1-107 and each of the constituent parts may be implemented by a portion of the photonic processor 1-103. In some embodiments, the photonic processor 1-103 includes three parts: a first array of variable beam splitters (VBSs) configured to implement a transformation on the array of input optical pulses that is equivalent to a first matrix multiplication (see, e.g., the first matrix implementation 1-301 of FIG. 1-3); a group of controllable optical elements configured to adjust the intensity and/or phase of each of the optical pulses received from the first array, the adjustment being equivalent to a second matrix multiplication by a diagonal matrix (see, e.g., the second matrix implementation 1-303 of FIG. 1-3); and a second array of VBSs configured to implement a transformation on the optical pulses received from the group of controllable electro-optical element, the transformation being equivalent to a third matrix multiplication (see, e.g., the third matrix implementation 1-305 of FIG. 3).

The photonic processor 1-103 outputs n separate optical pulses that are transmitted to the optical receiver 1-105. Each output of the photonic processor 1-103 is coupled one-to-one to a single input of the optical receiver 1-105. In some embodiments, the photonic processor 1-103 may be disposed on the same substrate as the optical receiver 1-105 (e.g., the photonic processor 1-103 and the optical receiver 1-105 are on the same chip). In such embodiments, the optical signals may be transmitted from the photonic processor 1-103 to the optical receiver 1-105 in silicon photonic waveguides. In other embodiments, the photonic processor 1-103 may be disposed on a separate substrate from the optical receiver 1-105. In such embodiments, the optical signals may be transmitted from the photonic processor 103 to the optical receiver 1-105 in optical fibers.

The optical receiver 1-105 receives the n optical pulses from the photonic processor 1-103. Each of the optical pulses is then converted to electrical signals. In some embodiments, the intensity and phase of each of the optical pulses is measured by optical detectors within the optical receiver. The electrical signals representing those measured values are then output to the controller 1-107.

The controller 1-107 includes a memory 1-109 and a processor 1-111 for controlling the optical encoder 1-101, the photonic processor 1-103 and the optical receiver 1-105. The memory 1-109 may be used to store input and output bit strings and measurement results from the optical receiver 1-105. The memory 1-109 also stores executable instructions that, when executed by the processor 1-111, control the optical encoder 1-101, perform the matrix decomposition algorithm, control the VBSs of the photonic processor 103, and control the optical receivers 1-105. The memory 1-109 may also include executable instructions that cause the processor 1-111 to determine a new input vector to send to the optical encoder based on a collection of one or more output vectors determined by the measurement performed by the optical receiver 1-105. In this way, the controller 1-107 can control an iterative process by which an input vector is multiplied by multiple matrices by adjusting the settings of the photonic processor 1-103 and feeding detection information from the optical receiver 1-105 back to the optical encoder 1-101. Thus, the output vector transmitted by the photonic processing system 1-100 to the external processor may be the result of multiple matrix multiplications, not simply a single matrix multiplication.

In some embodiments, a matrix may be too large to be encoded in the photonic processor using a single pass. In such situations, one portion of the large matrix may be encoded in the photonic processor and the multiplication process may be performed for that single portion of the large matrix. The results of that first operation may be stored in memory 1-109. Subsequently, a second portion of the large matrix may be encoded in the photonic processor and a second multiplication process may be performed. This "chunking" of the large matrix may continue until the multiplication process has been performed on all portions of the large matrix. The results of the multiple multiplication processes, which may be stored in memory 1-109, may then be combined to form the final result of the multiplication of the input vector by the large matrix.

In other embodiments, only collective behavior of the output vectors is used by the external processor. In such embodiments, only the collective result, such as the average or the maximum/minimum of multiple output vectors, is transmitted to the external processor.

IV. Optical Encoder

Figures 1, 2:
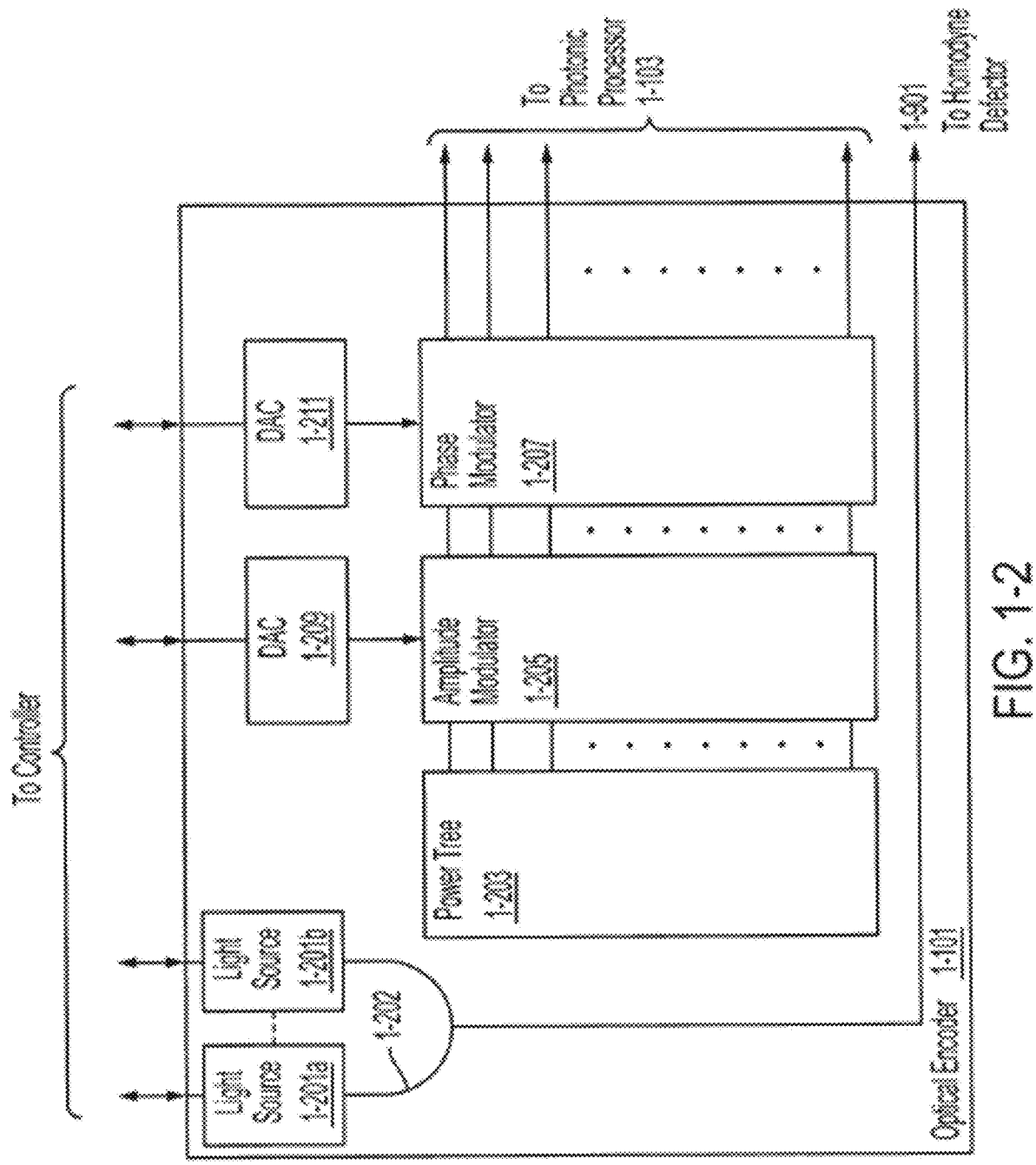

Referring to FIG. 1-2, the optical encoder includes at least one light source 1-201, a power tree 1-203, an amplitude modulator 1-205, a phase modulator 1-207, a digital to analog converter (DAC) 1-209 associated with the amplitude modulator 1-205, and a 1-DAC 211 associated with the phase modulator 1-207, according to some embodiments. While the amplitude modulator 1-205 and phase modulator 1-207 are illustrated in FIG. 1-2 as single blocks with n inputs and n outputs (each of the inputs and outputs being, for example, a waveguide), in some embodiments each waveguide may include a respective amplitude modulator and a respective phase modulator such that the optical encoder includes n amplitude modulators and n phase modulators. Moreover, there may be an individual DAC for each amplitude and phase modulator. In some embodiments, rather than having an amplitude modulator and a separate phase modulator associated with each waveguide, a single modulator may be used to encode both amplitude and phase information. While using a single modulator to perform such an encoding limits the ability to precisely tune both the amplitude and phase of each optical pulse, there are some encoding schemes that do not require precise tuning of both the amplitude and phase of the optical pulses. Such a scheme is described later herein.

The light source 1-201 may be any suitable source of coherent light. In some embodiments, the light source 1-201 may be a diode laser or a vertical-cavity surface emitting lasers (VCSEL). In some embodiments, the light source 1-201 is configured to have an output power greater than 10 mW, greater than 25 mW, greater than 50 mW, or greater than 75 mW. In some embodiments, the light source 1-201 is configured to have an output power less than 100 mW. The light source 1-201 may be configured to emit a continuous wave of light or pulses of light ("optical pulses") at one or more wavelengths (e.g., the C-band or O-band). The temporal duration of the optical pulses may be, for example, about 100 ps.

While light source 1-201 is illustrated in FIG. 1-2 as being on the same semiconductor substrate as the other components of the optical encoder, embodiments are not so limited. For example, the light source 1-201 may be a separate laser packaging that is edge-bonded or surface-bonded to the optical encoder chip. Alternatively, the light source 1-201 may be completely off-chip and the optical pulses may be coupled to a waveguide 1-202 of the optical encoder 1-101 via an optical fiber and/or a grating coupler.

The light source 1-201 is illustrated as two light sources 1-201a and 1-201b, but embodiments are not so limited. Some embodiments may include a single light source. Including multiple light sources 201a-b, which may include more than two light sources, can provide redundancy in case one of the light sources fails. Including multiple light sources may extend the useful lifetime of the photonic processing system 1-100. The multiple light sources 1-201a-b may each be coupled to a waveguide of the optical encoder 1-101 and then combined at a waveguide combiner that is configured to direct optical pulses from each light source to the power tree 1-203. In such embodiments, only one light source is used at any given time.

Some embodiments may use two or more phase-locked light sources of the same wavelength at the same time to increase the optical power entering the optical encoder system. A small portion of light from each of the two or more light sources (e.g., acquired via a waveguide tap) may be directed to a homodyne detector, where a beat error signal may be measured. The bear error signal may be used to determine possible phase drifts between the two light sources. The beat error signal may, for example, be fed into a feedback circuit that controls a phase modulator that phase locks the output of one light source to the phase of the other light source. The phase-locking can be generalized in a master-slave scheme, where N≥1 slave light sources are phase-locked to a single master light source. The result is a total of N+1 phase-locked light sources available to the optical encoder system.

In other embodiments, each separate light source may be associated with light of different wavelengths. Using multiple wavelengths of light allows some embodiments to be multiplexed such that multiple calculations may be performed simultaneously using the same optical hardware.

The power tree 1-203 is configured to divide a single optical pulse from the light source 1-201 into an array of spatially separated optical pulses. Thus, the power tree 1-203 has one optical input and n optical outputs. In some embodiments, the optical power from the light source 1-201 is split evenly across n optical modes associated with n waveguides. In some embodiments, the power tree 1-203 is an array of 50:50 beam splitters 1-801, as illustrated in FIG. 1-8. The number "depth" of the power tree 1-203 depends on the number of waveguides at the output. For a power tree with n output modes, the depth of the power tree 1-203 is ceil(log 2(n)). The power tree 1-203 of FIG. 1-8 only illustrates a tree depth of three (each layer of the tree is labeled across the bottom of the power tree 1-203). Each layer includes $2^{m-1}$ beam splitters, where m is the layer number. Consequently, the first layer has a single beam splitter 1-801a, the second layer has two beam splitters 1-801b-1-801c, and the third layer has four beam splitters 1-801d-1-801g.

While the power tree 1-203 is illustrated as an array of cascading beam splitters, which may be implemented as evanescent waveguide couplers, embodiments are not so limited as any optical device that converts one optical pulse into a plurality of spatially separated optical pulses may be used. For example, the power tree 1-203 may be implemented using one or more multimode interferometers (MMI), in which case the equations governing layer width and depth would be modified appropriately.

No matter what type of power tree 1-203 is used, it is likely that manufacturing a power tree 1-203 such that the splitting ratios are precisely even between the n output modes will be difficult, if not impossible. Accordingly, adjustments can be made to the setting of the amplitude modulators to correct for the unequal intensities of the n optical pulses output by the power tree. For example, the waveguide with the lowest optical power can be set as the maximum power for any given pulse transmitted to the photonic processor 1-103. Thus, any optical pulse with a power higher than the maximum power may be modulated to have a lower power by the amplitude modulator 1-205, in addition to the modulation to the amplitude being made to encode information into the optical pulse. A phase modulator may also be placed at each of the n output modes, which may be used to adjust the phase of each output mode of the power tree 1-203 such that all of the output signals have the same phase.

Alternatively or additionally, the power tree 1-203 may be implemented using one or more Mach-Zehnder Interferometers (MZI) that may be tuned such that the splitting ratios of each beam splitter in the power tree results in substantially equal intensity pulses at the output of the power tree 1-203.

The amplitude modulator 1-205 is configured to modify, based on a respective input bit string, the amplitude of each optical pulse received from the power tree 1-203. The amplitude modulator 1-205 may be a variable attenuator or any other suitable amplitude modulator controlled by the DAC 1-209, which may further be controlled by the controller 1-107. Some amplitude modulators are known for telecommunication applications and may be used in some embodiments. In some embodiments, a variable beam splitter may be used as an amplitude modulator 1-205, where only one output of the variable beam splitter is kept and the other output is discarded or ignored. Other examples of amplitude modulators that may be used in some embodiments include traveling wave modulators, cavity-based modulators, Franz-Keldysh modulators, plasmon-based modulators, 2-D material-based modulators and nano-opto-electro-mechanical switches (NOEMS).

The phase modulator 1-207 is configured to modify, based on the respective input bit string, the phase of each optical pulse received from the power tree 1-203. The phase modulator may be a thermo-optic phase shifter or any other suitable phase shifter that may be electrically controlled by the 1-211, which may further be controlled by the controller 1-107.

While FIG. 1-2 illustrates the amplitude modulator 1-205 and phase modulator 1-207 as two separate components, they may be combined into a single element that controls both the amplitudes and phases of the optical pulses. However, there are advantages to separately controlling the amplitude and phase of the optical pulse. Namely, due to the connection between amplitude shifts and phase shifts via the Kramers-Kronenig relations, there is a phase shift associated with any amplitude shift. To precisely control the phase of an optical pulse, the phase shift created by the amplitude modulator 1-205 should be compensated for using the phase modulator 1-207. By way of example, the total amplitude of an optical pulse exiting the optical encoder 1-101 is $A=a_0 a_1 a_2$ and the total phase of the optical pulse exiting the optical encoder is $\theta = \Delta\theta + \Delta\varphi + \varphi$, where $a_0$ is the input intensity of the input optical pulse (with an assumption of zero phase at the input of the modulators), $a_1$ is the amplitude attenuation of the amplitude modulator 1-205, $\Delta\theta$ is the phase shift imparted by the amplitude modulator 1-205 while modulating the amplitude, $\Delta\varphi$ is the phase shift imparted by the phase modulator 1-207, $a_2$ is the attenuation associated with the optical pulse passing through the phase modulator 1-209, and V is the phase imparted on the optical signal due to propagation of the light signal. Thus, setting the amplitude and the phase of an optical pulse is not two independent determinations. Rather, to accurately encode a particular amplitude and phase into an optical pulse output from the optical encoder 1-101, the settings of both the amplitude modulator 1-205 and the phase modulator 1-207 should be taken into account for both settings.

In some embodiments, the amplitude of an optical pulse is directly related to the bit string value. For example, a high amplitude pulse corresponds to a high bit string value and a low amplitude pulse corresponds to a low bit string value.

The phase of an optical pulse encodes whether the bit string value is positive or negative. In some embodiments, the phase of an optical pulse output by the optical encoder 1-101 may be selected from two phases that are 180 degrees (π radians) apart. For example, positive bit string values may be encoded with a zero degree phase shift and negative bit string values may be encoded with a 180 degree (π radians) phase shift. In some embodiments, the vector is intended to be complex-valued and thus the phase of the optical pulse is chosen from more than just two values between 0 and 2π.

In some embodiments, the controller 1-107 determines the amplitude and phase to be applied by both the amplitude modulator 1-205 and the phase modulator 1-207 based on the input bit string and the equations above linking the output amplitude and output phase to the amplitudes and phases imparted by the amplitude modulator 1-204 and the phase modulator 1-207. In some embodiments, the controller 1-107 may store in memory 1-109 a table of digital values for driving the amplitude modulator 1-205 and the phase modulator 1-207. In some embodiments, the memory may be placed in close proximity to the modulators to reduce the communication temporal latency and power consumption.

The digital to analog converter (DAC) 1-209, associated with and communicatively coupled to the amplitude modulator 1-205, receives the digital driving value from the controller 1-107 and converts the digital driving value to an analog voltage that drives the amplitude modulator 1-205. Similarly, the DAC 1-211, associated with and communicatively coupled to the phase modulator 1-207, receives the digital driving value from the controller 1-107 and converts the digital driving value to an analog voltage that drives the phase modulator 1-207. In some embodiments, the DAC may include an amplifier that amplifies the analog voltages to sufficiently high levels to achieve the desired extinction ratio within the amplitude modulators (e.g., the highest extinction ratio physically possible to implement using the particular phase modulator) and the desired phase shift range within the phase modulators (e.g., a phase shift range that covers the full range between 0 and 2π). While the DAC 1-209 and the DAC 1-211 are illustrated in FIG. 1-2 as being located in and/or on the chip of the optical encoder 1-101, in some embodiments, the DACs 1-209 and 1-211 may be located off-chip while still being communicatively coupled to the amplitude modulator 1-205 and the phase modulator 1-207, respectively, with electrically conductive traces and/or wires.

After modulation by the amplitude modulator 1-205 and the phase modulator 1-207, the n optical pulses are transmitted from the optical encoder 1-101 to the photonic processor 1-103.

V. Photonic Processor

Figures 1, 2, 3:
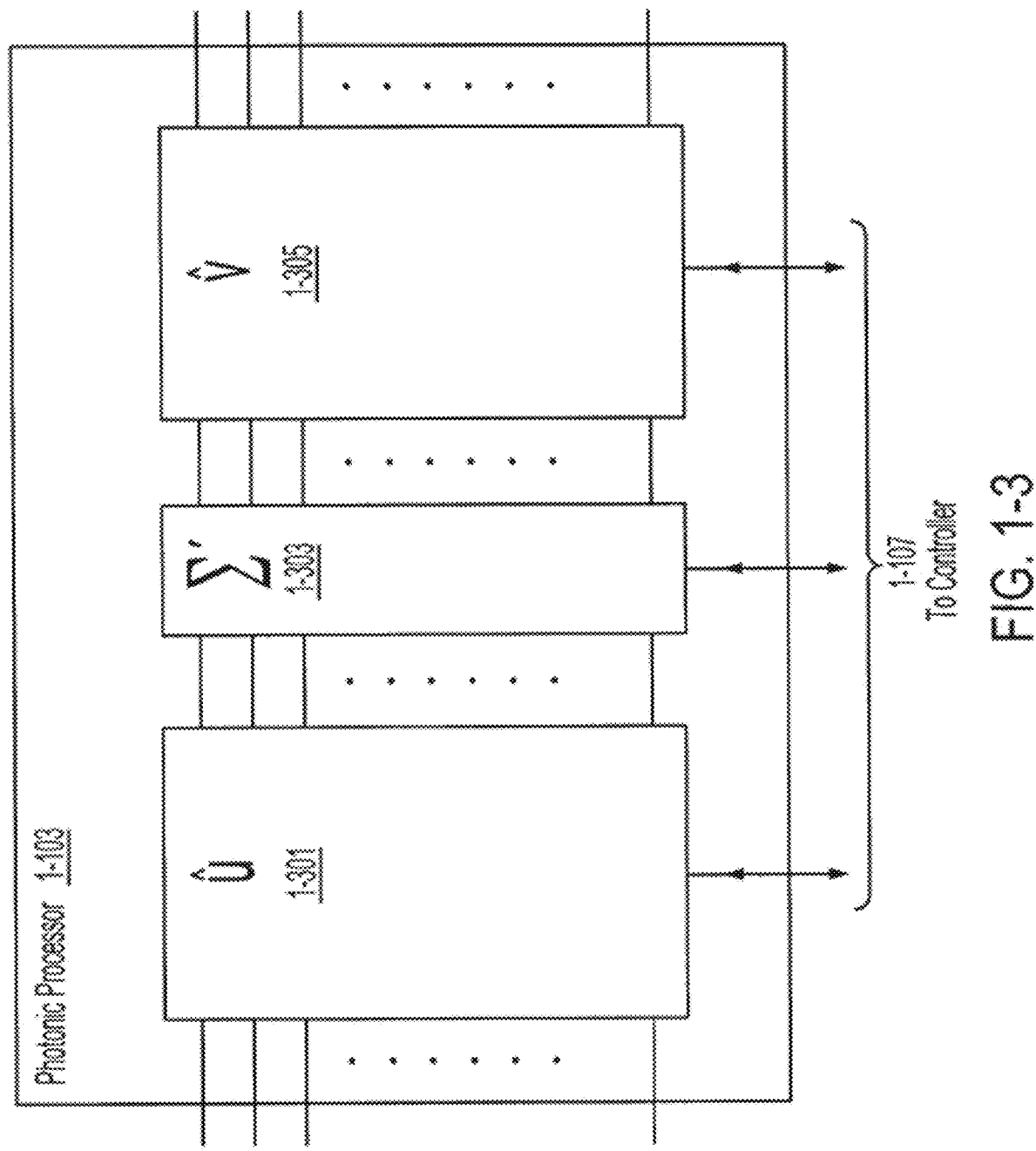
Figure 14:
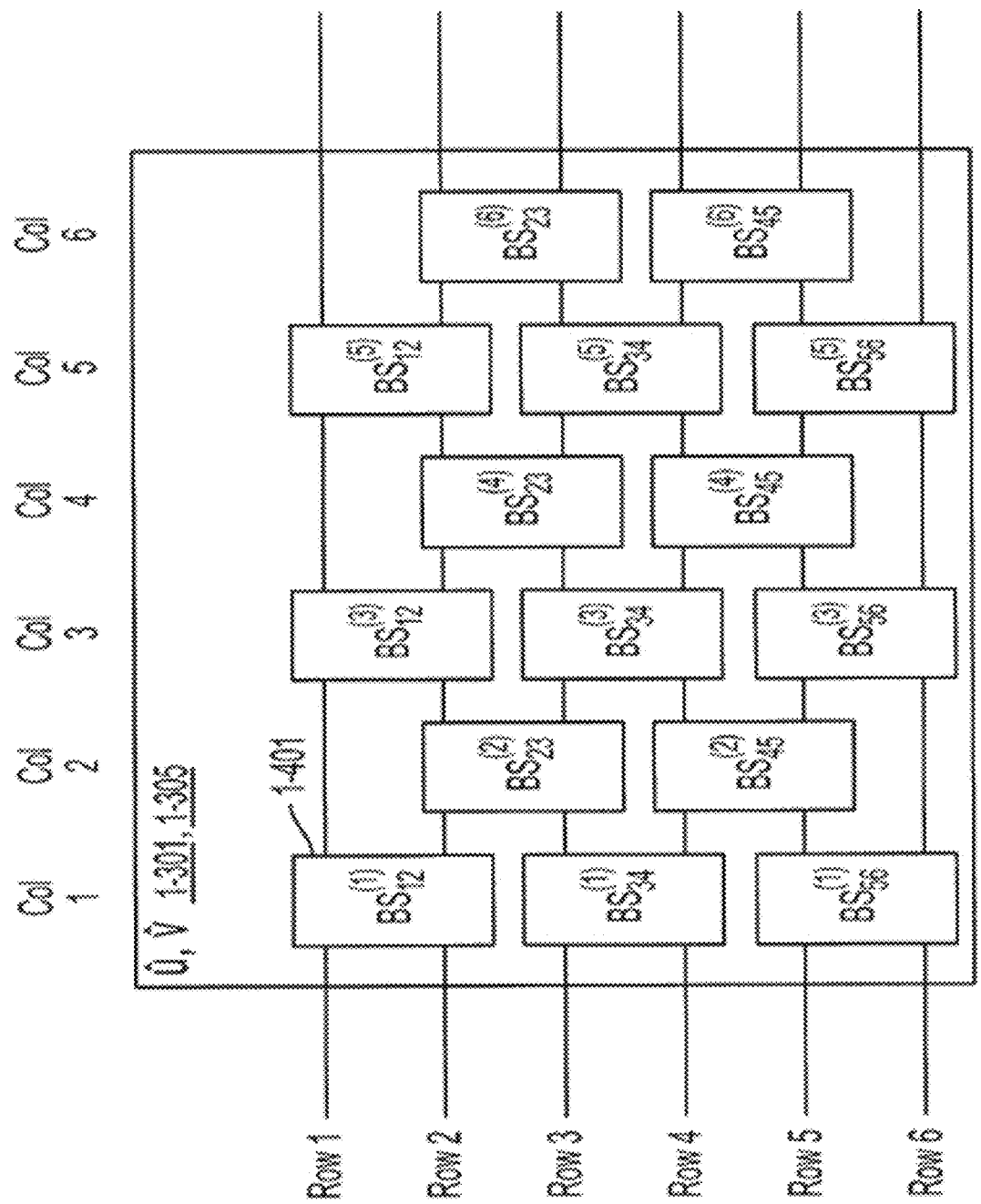

Referring to FIG. 1-3, the photonic processor 1-103 implements matrix multiplication on an input vector represented by the n input optical pulse and includes three main components: a first matrix implementation 1-301, a second matrix implementation 1-303, and a third matrix implementation 1-305. In some embodiments, as discussed in more detail below, the first matrix implementation 1-301 and the third matrix implementation 1-305 include an interconnected array of programmable, reconfigurable, variable beam splitters (VBSs) configured to transform the n input optical pulses from an input vector to an output vector, the components of the vectors being represented by the amplitude and phase of each of the optical pulses. In some embodiments, the second matrix implementation 1-303 includes a group of electro-optic elements.

The matrix by which the input vector is multiplied, by passing the input optical pulses through the photonic processor 1-103, is referred to as M. The matrix M is a general m×n known to the controller 1-107 as the matrix that should be implemented by the photonic processor 1-103. As such, the controller 1-107 decomposes the matrix M using a singular value decomposition (SVD) such that the matrix M is represented by three constituent matrices: $M=V^T\Sigma U$, where U and V are real orthogonal n×n and m×m matrices, respectively ($U^T U = UU^T = I$ and $V^T V = VV^T = I$), and Σ is an m×n diagonal matrix with real entries. The superscript "T" in all equations represents the transpose of the associated matrix. Determining the SVD of a matrix is known and the controller 1-107 may use any suitable technique to determine the SVD of the matrix M. In some embodiments, the matrix M is a complex matrix, in which case the matrix M can be decomposed into $M=V^\dagger\Sigma U$, where V and U are complex unitary n×n and m×m matrices, respectively $U^\dagger U = UU^\dagger = I$ and $V^\dagger V = VV^\dagger = I$), and Σ is an m×n diagonal matrix with real or complex entries. The values of the diagonal singular values may also be further normalized such that the maximum absolute value of the singular values is 1.

Once the controller 1-107 has determined the matrices U, Σ and V for the matrix M, in the case where the matrices U and V are orthogonal real matrices, the control may further decompose the two orthogonal matrices U and V into a series of real-valued Givens rotation matrices. A Givens rotation matrix $G(i, j, \theta)$ is defined component-wise by the following equations:

$g_{kk}=1$ for $k \neq i,j$ $g_{kk}=\cos(\theta)$ for $k=i,j$ $g_{ij}=-g_{ji}=-\sin(\theta)$, $g_{kl}=0$ otherwise, where $g_{ij}$ represents the element in the i-th row and j-th column of the matrix G and θ is the angle of rotation associated with the matrix. Generally, the matrix G is an arbitrary 2×2 unitary matrix with determinant 1 (SU(2) group) and it is parameterized by two parameters. In some embodiments, those two parameters are the rotation angle θ and another phase value φ. Nevertheless, the matrix G can be parameterized by other values other than angles or phases. e.g. by reflectivities/transmissivities or by separation distances (in the case of NOEMS).

Algorithms for expressing an arbitrary real orthogonal matrix in terms of a product of sets of Givens rotations in the complex space are provided in M. Reck, et al., "Experimental realization of any discrete unitary operator," Physical Review Letters 73, 58 (1994) ("Reck"), and W. R. Clements, et al., "Optimal design for universal multiport interferometers," Optica 3, 12 (2016) ("Clements"), both of which are incorporated herein by reference in their entirety and at least for their discussions of techniques for decomposing a real orthogonal matrix in terms of Givens rotations. (In the case that any terminology used herein conflicts with the usage of that terminology in Reck and/or Clements, the terminology should be afforded a meaning most consistent with how a person of ordinary skill would understand its usage herein.). The resulting decomposition is given by the following equation:

$$U = D \prod_{k=1}^{n} \prod_{(i,j) \in S_k} G(i, j, \theta_{ij}^{(k)}),$$

where U is an n×n orthogonal matrix. $S_k$ is the set of indices relevant to the k-th set of Givens rotations applied (as defined by the decomposition algorithm), $\theta_{ij}^{(k)}$ represents the angle applied for the Givens rotation between components i and j in the k-th set of Givens rotations, and D is a diagonal matrix of either +1 or −1 entries representing global signs on each component. The set of indices $S_k$ is dependent on whether n is even or odd. For example, when n is even:

$S_k = \{(1,2),(3,4), \ldots ,(n-1,n)\}$ for odd $k$ $S_k = \{(2,3),(4,5), \ldots ,(n-2,n-1)\}$ for even $k$ When n is odd:

$S_k = \{(1,2),(3,4), \ldots ,(n-2,n-1)\}$ for odd $k$ $S_k = ((2,3),(4,5), \ldots ,(n-1,n))$ for even $k$ By way of example and not limitation, the decomposition of a 4×4 orthogonal matrix can be represented as:

$U = DG(1,2,\theta_{12}^{(1)})G(3,4,\theta_{34}^{(1)}))G(2,3,\theta_{23}^{(2)})$
$G(1,2,\theta_{12}^{(3)})G(3,4,\theta_{34}^{(3)})G(2,3,\theta_{23}^{(4)})$ A brief overview of one embodiment of an algorithm for decomposing an n×n matrix U in terms of n sets of real-valued Givens rotations, which may be implemented using the controller 1-107, is as follows:

```
U' ← U
For i from 1 to n − 1 :
    If i is odd :|
        For j = 0 to i − 1 :
            Find G^T_{i-j, i-j+1} (θ) that nullifies element U'_{n-j, i-j} i.e.
            θ = tan^{-1}(U'_{n-j, i-j}/U'_{n-j,i-j+1})
            U' ← U'G^T_{i-j,i-j+1} (θ)
    Else if i is even :
        For j = 1 to i :
            Find G_{n+j-i-1, n+j-1}(θ) that nullifies element U'_{n+j-i,j} i.e.
            θ = tan^{-1}(−U'_{n+j-i,j}/U'_{n+j-i-1,j})
            U' ← G_{n+j-i-1, n+j-1}(θ) U'
```

The resultant matrix U' of the above algorithm is lower triangular and is related to the original matrix U by the equation:

$$U = \prod_{(j,k) \in S_L} G_{jk}^T U' \prod_{(j,k) \in S_R} G_{jk} = D_U \prod_{(j,k) \in S} G_{jk},$$

where the label $S_L$ labels the set of two modes connected by the VBS to the left of U' and the label $S_R$ labels the set of two modes connected by the VBS to the right of U'. Because U is an orthogonal matrix, U' is a diagonal matrix with $\{-1,1\}$ entries along the diagonal. This matrix, $U'=D_U$, is referred to as a "phase screen."

The next step of the algorithm, is to repeatedly find which $G^T_{jk}(\theta_1)D_U = D_U G_{jk}(\theta_2)$ is accomplished using the following algorithm, which may be implemented using the controller 1-107:

```
For every (j,k) in S_L :
    If U'_{j,j} and U'_{k,k} have different signs:
        θ_2 = − θ_1
    Else :
        θ_2 = θ_1
```

The above algorithm may also be used to decompose V and/or $V^T$ to determine the m layers of VBS values and the associated phase screen.

The above concept of decomposing an orthogonal matrix into real-valued Givens rotation matrices can be expanded to complex matrices, e.g., unitary matrices rather than orthogonal matrices. In some embodiments, this may be accomplished by including an additional phase in the parameterization of the Givens rotation matrices. Thus, a general form of the Givens matrices with the addition of the additional phase term is $T(i,j,\theta,\phi)$, where $t_{kk}=1$ for $k \neq i,j$, $t_{ii}=e^{i\phi} \cos(\theta)$, $t_{jj}=\cos(\theta)$, $t_{ij}=-\sin(\theta)$, $t_{ji}=e^{i\phi} \sin(\theta)$, $t_{kl}=0$ otherwise, where $t_{ij}$ represents the i-th row and j-th column of the matrix T, $\theta$ is the angle of rotation associated with the matrix, and $\phi$ is the additional phase. Any unitary matrix can be decomposed into matrices of the type $T(i,j,\theta,\phi)$. By making the choice to set the phase $\phi=0$, the conventional real-valued Givens rotation matrices described above are obtained. If, instead, the phase $\phi=\pi$, then a set of matrices known as Householder matrices are obtained. A Householder matrix, H, has the form $H=I-(v \otimes v)$, where I is the n×n identity matrix, v is a unit vector, and $\otimes$ is the outer product. Householder matrices represent reflections about a hyperplane orthogonal to the unit vector v. In this parameterization the hyperplane is a two-dimensional subspace, rather than an n−1 dimensional subspace as is common in defining Householder matrices for the QR decomposition. Thus, a decomposition of a matrix into Givens rotations is equivalent to a decomposition of the matrix into Householder matrices.

Based on the aforementioned decomposition of an arbitrary unitary matrix into a restricted set of Givens rotations, any unitary matrix can be implemented by a particular sequence of rotations and phase shifts. And in photonics, rotations may be represented by variable beam splitters (VBS) and phase shifts are readily implemented using phase modulators. Accordingly, for the n optical inputs of the photonic processor 1-103, the first matrix implementation 1-301 and the third matrix implementation 1-305, representing the unitary matrices of the SVD of the matrix M may be implemented by an interconnected array of VBSs and phase shifters. Because of the parallel nature of passing optical pulses through a VBS array, matrix multiplication can be performed in O(1) time. The second matrix implementation 1-303 is a diagonal matrix of the SVD of the matrix M combined with the diagonal matrices D associated with each of the orthogonal matrices of the SVD. As mentioned above, each matrix D is referred to as a "phase screen" and can be labeled with a subscript to denote whether it is the phase screen associated with the matrix U or the matrix V. Thus, the second matrix implementation 303 is the matrix $\Sigma'=D_V \Sigma D_U$.

In some embodiments, the VBS unit cell of the photonic processor 1-103 associated with the first matrix implementation 1-301 and the third matrix implementation 1-305 may be a Mach-Zehnder interferometer (MZI) with an internal phase shifter. In other embodiments, the VBS unit cell may be a microelectromechanical systems (MEMS) actuator. An external phase shifter may be used in some embodiments to implement the additional phase needed for the Givens rotations.

The second matrix implementation 1-303, representing the diagonal matrix $D_V \Sigma D_U$ may be implemented using an amplitude modulator and a phase shifter. In some embodiments, a VBS may be used to split off a portion of light that can be dumped to variably attenuate an optical pulse. Additionally or alternatively, a controllable gain medium may be used to amplify an optical signal. For example, GaAs, InGaAs, GaN, or InP may be used as an active gain medium for amplifying an optical signal. Other active gain processes such as the second harmonic generation in materials with crystal inversion symmetric, e.g. KTP and lithium niobate, and the four-wave mixing processes in materials that lack inversion symmetry, e.g. silicon, can also be used. A phase shifter in each optical mode may be used to apply either a zero or a $\pi$ phase shift, depending on the phase screen being implemented. In some embodiments, only a single phase shifter for each optical mode is used rather than one phase shifter for each phase screen. This is possible because each of the matrices $D_V$, $\Sigma$, and $D_U$ are diagonal and therefore commute. Thus, the value of each phase shifter of the second matrix implementation 1-303 of the photonic processor 1-103 is the result of the product of the two phase screens: $D_V D_U$.

Referring to FIG. 1-4, the first and third matrix implementation 1-301 and 1-305 are implemented as an array of VBSs 1-401, according to some embodiments. For the sake of simplicity, only n=6 input optical pulses (the number of rows) are illustrated resulting in a "circuit depth" (e.g., the number of columns) equal to the number of input optical pulses (e.g., six). For the sake of clarity, only a single VBS 1-401 is labeled with a reference numeral. The VBS are labeled, however, with subscripts that identify which optical modes are being mixed by a particular VBS and a super script labeling the associated column. Each VBS 1-401 implements a complex Givens rotation, $T(i,j,\theta,\phi)$, as discussed above, where i and j are equivalent to the subscript labels of the VBSs 1-401, $\theta$ is the rotation angle of the Givens rotation, and $\phi$ is the additional phase associated with the generalized rotation.

Referring to FIG. 1-5, each VBS 1-401 may be implemented using a MZI 1-510 and at least one external phase shifter 1-507. In some embodiments, a second external phase shifter 1-509 may also be included. The MZI 1-510 includes a first evanescent coupler 1-501 and a second evanescent coupler 1-503 for mixing the two input modes of the MZI 1-510. An internal phase shifter 1-505 modulates the phase $\theta$ in one arm of the MZI 1-510 to create a phase difference between the two arms. Adjusting the phase $\theta$ causes the intensity of light output by the VBS 1-401 to vary from one output mode of the MZI 1-510 to the other thereby creating a beam splitter that is controllable and variable. In some embodiments, a second internal phase shifter can be applied on the second arm. In this case, it is the difference between the two internal phase shifters that cause the output light intensity to vary. The average between the two internal phases will impart a global phase to the light that enter mode i and mode j. Thus the two parameters $\theta$ and $\phi$ may each be controlled by a phase shifter. In some embodiments, the second external phase shifter 1-509 may be used to correct for an unwanted differential phase across the output modes of the VBS due to static phase disorder.

In some embodiments, the phase shifters 1-505, 1-507 and 1-509 may include a thermo-optic, electro-optic, or optomechanic phase modulator. In other embodiments, rather than including an internal phase modulator 505 within an MZI 510, a NOEMS modulator may be used.

In some embodiments, the number of VBSs grows with the size of the matrix. The inventors have recognized and appreciated that controlling a large number of VBSs can be challenging and there is a benefit to sharing a single control circuit among multiple VBSs. An example of a parallel control circuit that may be used to control multiple VBSs is a digital-to-analog converter receives as an input a digital string that encodes the analog signal to be imparted on a specific VBS. In some embodiments, the circuit also receives a second input the address of the VBS that is to be controlled. The circuit may then impart analog signals on the addressed VBS. In other embodiments, the control circuit may automatically scan through a number of VBSs and impart analog signals on the multiple VBSs without being actively given an address. In this case, the addressing sequence is predefined such that it traverses the VBS array in known order.

Referring to FIG. 1-6, the second matrix implementation 1-303 implements multiplication by the diagonal matrix $\Sigma'=D_V \Sigma D_U$. This may be accomplished using two phase shifters 1-601 and 1-605 to implement the two phase screens and an amplitude modulator 1-603 to adjust the intensity of an associate optical pulse by an amount $\eta$. As mentioned above, in some embodiments only a single phase modulator 1-601 may be used, as the two phase screens can be combined together since the three constituent matrices that form $\Sigma'$ are diagonal and therefore commute.

In some embodiments, the amplitude modulators 1-603 may be implemented using an attenuator and/or an amplifier. If the value of the amplitude modulation q is greater than one, the optical pulse is amplified. If the value of the amplitude modulation q is less than one, the optical pulse is attenuated. In some embodiments, only attenuation is used. In some embodiments, the attenuation may be implemented by a column of integrated attenuators. In other embodiments, as illustrated in FIG. 1-7, the attenuation 1-603 may be implemented using a MZI that includes two evanescent couplers 1-701 and 1-703 and a controllable internal phase shifter 1-705 to adjust how much of the input light is transmitted from the input of the MZI to a first output port 1-709 of the MZI. A second output port 1-707 of the MZI may be ignored, blocked or dumped.

In some embodiments, the controller 1-107 controls the value of each phase shifter in the photonic processor 1-103. Each phase shifter discussed above may include a DAC similar to the DACs discussed in connection with the phase modulator 1-207 of the optical encoder 1-101.

The photonic processor 1-103 can include any number of input nodes, but the size and complexity of the interconnected VBS arrays 1-301 and 1-305 will increase as the number of input modes increases. For example, if there are n input optical modes, then the photonic processor 1-103 will have a circuit depth of 2n+1, where the first matrix implementation 1-301 and the second matrix implementation 1-305 each has a circuit depth n and the second matrix implementation 1-303 has a circuit depth of one. Importantly, the complexity in time of performing a single matrix multiplication is not even linear with the number of input optical pulses—it is always O(1). In some embodiments, this low order complexity afforded by the parallelization results in energy and time efficiencies that cannot be obtained using conventional electrical processors.

It is noted that, while embodiments described herein illustrate the photonic processor 1-103 as having n inputs and n outputs, in some embodiments, the matrix M implemented by the photonic processor 1-103 may not be a square matrix. In such embodiments, the photonic processor 1-103 may have a different number of outputs and inputs.

It is also noted that, due to the topology of the interconnections of the VBSs within the first and second matrix implementations 1-301 and 1-305, it is possible to subdivide the photonic processor 1-103 into non-interacting subsets of rows such that more than one matrix multiplication can be performed at the same time. For example, in the VBS array illustrated in FIG. 1-4, if each VBS 1-401 that couples optical modes 3 and 4 is set such that optical modes 3 and 4 do not couple at all (e.g., as if the VBSs 1-401 with subscript "34" were absent from FIG. 1-4) then the top three optical modes would operate completely independently from the bottom three optical modes. Such a subdivision may be done at a much larger scale with a photonic processor with a larger number of input optical modes. For example, an n=64 photonic processor may multiply eight eight-component input vectors by a respective 8×8 matrix simultaneously (each of the 8×8 matrices being separately programmable and controllable). Moreover, the photonic processor 1-103 need not be subdivided evenly. For example, an n=64 photonic processor may subdivide into seven different input vectors with 20, 13, 11, 8, 6, 4, and 2 components, respectively, each multiplied by a respective matrix simultaneously. It should be understood that the above numerical examples are for illustration purposes only and any number of subdivisions is possible.

Additionally, while the photonic processor 1-103 performs vector-matrix multiplication, where a vector is multiplied by a matrix by passing the optical signals through the array of VBSs, the photonic processor 1-103 may also be used to perform matrix-matrix multiplication. For example, multiple input vectors may be passed through the photonic processor 1-103, one after the other, one input vector at a time, where each input vector represents a column of an input matrix. After optically computing each of the individual vector-matrix multiplications (each multiplication resulting in an output vector that corresponds to a column of an output column of the resulting matrix), the results may be combined digitally to form the output matrix resulting from the matrix-matrix multiplication.

VI. Optical Receiver

The photonic processor 1-103 outputs n optical pulses that are transmitted to the optical receiver 1-105. The optical receiver 1-105 receives the optical pulses and generates an electrical signal based on the received optical signals. In some embodiments, the amplitude and phase of each optical pulse is determined. In some embodiments, this is achieved using homodyne or heterodyne detection schemes. In other embodiments, simple phase-insensitive photodetection may be performed using conventional photodiodes.

Referring to FIG. 1-9, the optical receiver 1-105 includes a homodyne detector 1-901, a transimpedance amplifier 1-903 and an analog-to-digital converter (ADC) 1-905, according to some embodiments. While the components are shown as one element for all optical modes in FIG. 1-9, this is for the sake of simplicity. Each optical mode may have a dedicated homodyne detector 1-901, a dedicated transimpedance amplifier 1-903 and a dedicated ADC 1-905. In some embodiments, a transimpedance amplifier 1-903 may not be used. Instead, any other suitable electronic circuit that converts a current to a voltage may be used.

Referring to FIG. 1-10, the homodyne detector 1-903 includes a local oscillator (LO) 1-1001, a quadrature controller 1-1003, a beam splitter 1-1005 and two detectors 1-1007 and 1-1009, according to some embodiments. The homodyne detector 1-903 outputs an electrical current that is based on the difference between the current output by the first detector 1-1007 and the second detector 1-1009.

The local oscillator 1-1001 is combined with the input optical pulse at the beam splitter 1-1005. In some embodiments, a portion of the light source 1-201 is transmitted via an optical waveguide and/or an optical fiber to the homodyne detector 1-901. The light from the light source 1-201 may itself be used as the local oscillator 1-1001 or, in other embodiments, the local oscillator 1-1001 may be a separate light source that uses the light from the light source 1-201 to generate a phase matched optical pulse. In some embodiments, an MZI may replace the beam splitter 1-1005 such that adjustments can be made between the signal and the local oscillator.

The quadrature controller 1-1003 controls the cross-section angle in phase space in which the measurement is made. In some embodiments, the quadrature controller 1-1003 may be a phase shifter that controls the relative phase between the input optical pulse and the local oscillator. The quadrature controller 1-1003 is shown as a phase shifter in the input optical mode. But in some embodiments, the quadrature controller 1-1003 may be in the local oscillator mode.

The first detector 1-1007 detects light output by a first output of the beam splitter 1-1005 and the second detector 1-1009 detects light output by a second output of the beam splitter 1-1005. The detectors 1-1007 and 1-1009 may be photodiodes operated with zero bias.

A subtraction circuit 1-1011 subtracts the electrical current from the first detector 1-1007 from the electrical current from the second detector 1-1009. The resulting current therefore has an amplitude and a sign (plus or minus). The transimpedance amplifier 1-903 converts this difference in current into a voltage, which may be positive or negative. Finally, an ADC 1-905 converts the analog signal to a digital bit string. This output bit string represents the output vector result of the matrix multiplication and is an electrical, digital version of the optical output representation of the output vector that is output by the photonic processor 1-103. In some embodiments, the output bit string may be sent to the controller 1-107 for additional processing, which may include determining a next input bit string based on one or more output bit strings and/or transmitting the output bit string to an external processor, as described above.

The inventors have further recognized and appreciated that the components of the above-described photonic processing system 1-100 need not be chained together back-to-back such that there is a first matrix implementation 1-301 connected to a second matrix implementation 1-303 connected to a third matrix implementation 1-305. In some embodiments, the photonic processing system 1-103 may include only a single unitary circuit for performing one or more multiplications. The output of the single unitary circuit may be connected directly to the optical receiver 1-105, where the results of the multiplication are determined by detecting the output optical signals. In such embodiments, the single unitary circuit may, for example, implement the first matrix implementation 1-301. The results detected by the optical receiver 1-105 may then be transmitted digitally to a conventional processor (e.g., processor 1-111) where the diagonal second matrix implementation 1-303 is performed in the digital domain using a conventional processor (e.g., 1-111). The controller 1-107 may then reprogram the single unitary circuit to perform the third matrix implementation 1-305, determine an input bit string based on the result of the digital implementation of the second matrix implementation, and control the optical encoder to transmit optical signals, encoded based on the new input bit string, through the single unitary circuit with the reprogrammed settings. The resulting output optical signals, which are detected by the optical receiver 105, are then used to determine the results of the matrix multiplication.

The inventors have also recognized and appreciated that there can be advantages to chaining multiple photonic processors 1-103 back-to-back, in series. For example, to implement a matrix multiplication $M=M_1M_2$, where $M_1$ and $M_2$ are arbitrary matrices but $M_2$ changes more frequently than $M_1$ based on a changing input workload, the first photonic processor can be controlled to implement $M_2$ and the second photonic processor coupled optically to the first photonic processor can implement $M_1$ which is kept static. In this way, only the first photonic processing system needs to be frequently updated based on the changing input workload. Not only does such an arrangement speed up the computation, but it also reduces the number of data bits that travel between the controller 1-107 and the photonic processors.

VII. Folded Photonic Processing System

In FIG. 1-1, in such an arrangement, the optical encoder 1-101 and the optical receiver 1-105 are positioned on opposite sides of the photonic processing system 1-100. In applications where feedback from the optical receiver 1-105 is used to determine the input for the optical encoder 1-101 for a future iteration of the process, the data is transferred electronically from the optical receiver 1-105 to the controller 1-107 and then to the optical encoder 1-101. The inventors have recognized and appreciated that reducing the distance that these electrical signals need to travel (e.g., by reducing the length of electrical traces and/or wires) results in power savings and lower latency. Moreover, there is no need for the optical encoder 1-101 and optical receiver 1-105 to be placed on opposite ends of the photonic processing system.

Accordingly, in some embodiments, the optical encoder 1-101 and the optical receiver 1-105 are positioned near one another (e.g., on the same side of the photonics processor 1-103) such that the distance electrical signals have to travel between the optical encoder 1-101 and the optical receiver 1-105 is less than the width of the photonics processor 1-103. This may be accomplished by physically interleaving components of the first matrix implementation 1-301 and the third matrix implementation 1-305 such that they are physically in the same portion of the chip. This arrangement is referred to as a "folded" photonic processing system because the light first propagates in a first direction through the first matrix implementation 1-301 until it reaches a physical portion of the chip that is far from the optical encoder 1-101 and the optical receiver 1-105, then folds over such that the waveguides turn the light to be propagating in a direction opposite to the first direction when implementing the third matrix implementation 1-305. In some embodiments, the second matrix implementation 1-303 is physically located adjacent to the fold in the waveguides. Such an arrangement reduces the complexity of the electrical traces connecting the optical encoder 1-101, the optical receiver 1-105, and the controller 1-107 and reduces the total chip area used to implement the photonic processing system 1-100. For example, some embodiments using the folded arrangement only use 65% of the total chip area that would be needed if the back-to-back photonic arrangement of FIG. 1-1 was used. This may reduce the cost and complexity of the photonic processing system.

The inventors have recognized and appreciated that there are not only electrical advantages to a folded arrangement, but also optical advantages. For example, by reducing the distance that the light signal has to travel from the light source to be used as a local oscillator for the homodyne detection, the time-dependent phase fluctuations of the optical signal may be reduced, resulting in higher quality detection results. In particular, by locating the light source and the homodyne on the same side of the photonics processor, the distance traveled by the light signal used for the local oscillator is no longer dependent on the size of the matrix. For example, in the back-to-back arrangement of FIG. 1-1, the distance traveled by the light signal for the local oscillator scales linearly with the size of the matrix, whereas the distance traveled in the folded arrangement is constant, irrespective of the matrix size.

FIG. 1-11 is a schematic drawing of a folded photonic processing system 1-1100, according to some embodiments. The folded photonic processing system 1-1100 includes a power tree 1-1101, a plurality of optical encoders 1-1103a-1-1103d, a plurality of homodyne detectors 1-1105a-1-1105d, a plurality of selector switches 1-1107a-1-1107d, a plurality of U-matrix components 1-1109a-1-1109j, a plurality of diagonal-matrix components 1-1111a-1-1111d, and a plurality of V-matrix components 1-1113a-1-1113j. For the sake of clarity, not all components of the folded photonic processing system are shown in the figure. It should be understood that the folded photonic processing system 1-1100 may include similar components as the back-to-back photonic processing system 1-100.

The power tree 1-1101 is similar to the power tree 1-203 of FIG. 2 and is configured to deliver light from a light source (not shown) to the optical encoders 1-1103. However, a difference in the power tree 1-1101 and the power tree 1-203 is that the power tree delivers optical signals to the homodyne detectors 1-1105a directly. In FIG. 2, the light source 201 delivers a local oscillator signal to the homodyne detectors on the other side of the photonic processor by tapping off a portion of the optical signal from the light source and guiding the optical signal using a waveguide. In FIG. 1-11, the power tree 1-1101 includes a number of outputs that is equal to twice the number of spatial modes. For example, FIG. 1-11 illustrates only four spatial modes of a photonic processor, which results in eight output modes from the power tree 1-1101—one output directing light to each optical encoder 1-1103 and one output directing light to each homodyne detector 1-1105. The power tree may be implemented, for example, using cascading beam splitters or a multimode interferometer (MMI).

The optical encoders 1-1103 are similar to the power tree optical encoder 1-101 of FIG. 1 and are configured to encode information into the amplitude and/or phase of the optical signals received from the power tree 1-1101. This may be achieved, for example as described in connection with the optical encoder 1-101 of FIG. 2.

The homodyne detectors 1-1105 are located between the power tree 1-1101 and the U-matrix components 1-1109. In some embodiments, the homodyne detectors 1-1105 are physically positioned in a column with the optical encoder 1-1103. In some embodiments, the optical encoders 1-1103 and the homodyne detectors 1-1105 may be interleaved in a single column. In this way, the optical encoders 1-1103 and the homodyne detectors 1-1105 are in close proximity to one another, reducing the distance of electrical traces (not shown) used to connect the optical encoders 1-1103 and the homodyne detectors 1-1105 and a controller (not shown) which may be physically located adjacent to the column of the optical encoders 1-1103 and the homodyne detectors 1-1105.

Each of the optical encoders 1-1103 is associated with a respective homodyne detector 1-1105. Both the optical encoders 1-1103 and the homodyne detectors 1-1105 receive optical signals from the power tree 1-1101. The optical encoders 1-1103 use the optical signals to encode an input vector, as described above. The homodyne detectors 1-1105 use the received optical signals received from the power tree as the local oscillator, as described above.

Each pair of the optical encoders 1-1103 and the homodyne detectors 1-1105 is associated with and connected to a selector switch 1-1107 by a waveguide. The selector switches 1-1107a-1-1107d may be implemented using, for example, a conventional 2×2 optical switch. In some embodiments, the 2×2 optical switch is a MZI with an internal phase shifter to control the MZI's behavior from a crossing to a bar. The switch 1-1107 is connected to a controller (not shown) to control whether an optical signal received from the optical encoder 1-1103 will be guided towards the U-matrix components 1-1109 or the V-matrix components 1-1113. The optical switch is also controlled to guide light received from the U-matrix components 1-1109 and/or the V-matrix components 1-1113 toward the homodyne detectors 1-1105 for detection.

The techniques for implementing matrix multiplication is similar in the photonic folded photonic processing system 1-1100 as was described above in connection with the back-to-back system, described in FIG. 1-3. A difference between the two systems is in the physical placement of the matrix components and the implementation of a fold 1-1120, where the optical signals change from propagating approximately left to right in FIG. 1-11 to propagating approximately right to left. In FIG. 1-11, the connections between components may represent waveguides. The solid-lined connections represent portions of waveguide where the optical signals are propagating from left to right, in some embodiments, and the dashed-lined connections represent portions of waveguide where the optical signals are propagating from right to left, in some embodiments. In particular, given this nomenclature, the embodiment illustrated in FIG. 1-11 is an embodiment where the selector switches 1-1107 guide the optical signals to the U-matrix components 1-1109 first. In other embodiments, the selector switches 1-1107 may guide the optical signals to the V-matrix components 1-1113 first, in which case the dashed lines would represent portions of waveguide where the optical signals are propagating from left to right, and the solid-lined connections would represent portions of waveguide where the optical signals are propagating from right to left.

The U-matrix of the SVD of a matrix M is implemented in photonic processing system 1-1100 using U-matrix components 1-1109 that are interleaved with the V-matrix components 1-1113. Thus, unlike the embodiment of the back-to-back arrangement illustrated in FIG. 1-3, all of the U-matrix components 1-1109 and the V-matrix components 1-1113 are not physically located in a respective self-contained array within a single physical area. Accordingly, in some embodiments, the photonic processing system 1-1100 includes a plurality of columns of matrix components and at least one of the columns contains both U-matrix components 1-1109 and V-matrix components 1-1113. In some embodiments, the first column may only have U-matrix components 1-1109, as illustrated in FIG. 1-11. U-matrix components 1-1109 are implemented similarly to the first matrix implementation 1-301 of FIG. 3.

Due to the interleaving structure of the U-matrix components 1-1109 and the V-matrix components 1-1113, the folded photonic processing system 1-1100 includes waveguide crossovers 1-1110 at various locations between the columns of matrix elements. In some embodiments, the waveguide crossovers can be constructed using adiabatic evanescent elevators between two or more layers in an integrated photonics chip. In other embodiments, the U-matrix and the V-matrix may be positioned on different layers of the same chip and the waveguide crossovers are not used.

After optical signals propagate through all of the U-matrix components 1-1109, the optical signals propagate to the diagonal-matrix components 1-1111, which are implemented similarly to the second matrix implementation 1-303 of FIG. 1-3.

After optical signals propagate through all of the diagonal-matrix components 1-1111, the optical signals propagate to the V-matrix components 1-1113, which are implemented similarly to the third matrix implementation 1-305 of FIG. 1-3. The V-matrix of the SVD of a matrix M is implemented in photonic processing system 1-1100 using V-matrix components 1-1113 that are interleaved with the U-matrix components 1-1109. Thus, all of the V-matrix components 1-1113 are not physically located in a single self-contained array.

After the optical signals propagate through all of the V-matrix components 1-1113, the optical signals return to the selector switch 1-1107, which guides the optical signals to the homodyne detectors 1-1105 for detection.

The inventors have further recognized and appreciated that by including selector switches after the optical encoders and before the matrix components, the folded photonic processing system 1-1100 allows efficient bi-directionality of the circuit. Thus, in some embodiments, a controller, such as the controller 1-107 described in connection with FIG. 1-1, may control whether the optical signals are multiplied by the U matrix first or the $V^T$ matrix first. For an array of VBSs set to implement a unitary matrix U when propagating the optical signals from left to right, propagating the optical signals from right to left implements a multiplication by a unitary matrix $U^T$. Thus, the same settings for an array of VBSs can implement both U and $U^T$ depending which way the optical signals are propagated through the array, which may be controlled using the selector switch in 1-1107. In some applications, such as back-propagation used to train a machine learning algorithm, it may be desirable to run optical signals through one or more matrices backwards. In other applications, the bi-directionality can be used to compute the operation of an inverted matrix on an input vector. For example, for an invertible n×n matrix M, an SVD results in $M=V^T\Sigma U$. The inverse of this matrix is $M^{-1}=U^T\Sigma^{-1}V$, where $\Sigma^{-1}$ is the inverse of a diagonal matrix which can be computed efficiently by inverting each diagonal element. To multiply a vector by the matrix M, the switches are configured to direct the optical signals through the matrix U, then $\Sigma$, then $V^T$ in a first direction. To multiply a vector by the inverse $M^{-1}$, the singular values are first set to program the implementation of the $\Sigma^{-1}$ matrix. This constitutes changing the settings of only one column of VBSs instead of all 2n+1 columns of the photonic processor, which is the case for a single-directional photonic processing system such as the one illustrated in FIG. 1-3. The optical signals representing the input vector are then propagated through the matrix $V^T$, then $\Sigma^{-1}$, and then U in a second direction that is opposite the first direction. Using the selector switches 1-1107, the folded photonic processing system 1-1100 may be easily changed from implementing the U matrix (or its transpose) first and implementing the $V^T$ matrix (or its transpose) first.

VIII. Wavelength Division Multiplexing

The inventors have further recognized and appreciated that there are applications where different vectors may be multiplied by the same matrix. For example, when training or using machine learning algorithms sets of data may be processed with the same matrix multiplications. The inventors have recognized and appreciated that this may be accomplished with a single photonic processor if the components before and after the photonic processor are wavelength-division-multiplexed (WDM). Accordingly, some embodiments include multiple frontends and backends, each associated with a different wavelength, while only using a single photonic processor to implement the matrix multiplication.

FIG. 1-12A illustrates a WDM photonic processing system 1-1200, according to some embodiments. The WDM photonic processing system 1-1200 includes N frontends 1-1203, a single photonic processor 1-1201 with N spatial modes, and N backends 1-1205.

The photonic processor 1-1201 may be similar to the photonic processor 1-103, with N input modes and N output modes. Each of the N frontends 1-1203 is connected to a respective input mode of photonic processor 1-1201. Similarly, each of the N backends 1-1205 is connected to a respective output mode of photonic processor 1-1201.

FIG. 1-12B illustrates details of at least one of the frontends 1-1203. As with the photonic processing system of other embodiments, the photonic processing system 1-1200 includes optical encoders 1-1211. But in this embodiment, there are M different optical encoders, where M is the number of wavelengths being multiplexed by the WDM photonic processing system 1-1200. Each of the M optical encoders 1-1211 receives light from a light source (not shown) that generates the M optical signals, each of a different wavelength. The light source may be, for example, an array of lasers, a frequency comb generator or any other light source that generates coherent light at different wavelengths. Each of the M optical encoders 1-1211 is controlled by a controller (not shown) to implement an appropriate amplitude and phase modulation to encode data into the optical signal. Then, the M encoded optical signals are combined into a single waveguide using an M:1 WDM 1-1213. The single waveguide then connects to the one of the N waveguides of the photonic processor 1-1201.

FIG. 1-12C illustrates details of at least one of the backends 1-1205. As with the photonic processing system of other embodiments, the photonic processing system 1-1200 includes detectors 1-1223, which may be phase-sensitive or phase-insensitive detectors. But in this embodiment, there are M different detectors 1-1223, where M is the number of wavelengths being multiplexed by the WDM photonic processing system 1-1200. Each of the M detectors 1-1223 receives light from a 1:M WDM 1-1221, which splits the single output waveguide from photonic processor 1-1201 into M different waveguides, each carrying an optical signal of a respective wavelength. Each of the M detectors 1-1223 may be controlled by a controller (not shown) to record measurement results. For example, each of the M detectors 1223 may be a homodyne detector or a phase insensitive photodetector.

In some embodiments, the VBSs in the photonic processor 1-1201 may be chosen to be non-dispersive within the M wavelengths of interest. As such, all the input vectors are multiplied by the same matrix. For example, an MMI can be used instead of a directional coupler. In other embodiments, the VBSs may be chosen to be dispersive within the M wavelengths of interest. In some applications related to stochastic optimization of the parameters of a neural network model, this is equivalent to adding noise when computing the gradient of the parameters; increased gradient noise may be beneficial for faster optimization convergence and may improve the robustness of a neural network.

While FIG. 1-12A illustrates a back-to-back photonic processing system, similar WDM techniques may be used to form a WDM folded photonic processor using the techniques described in relation to folded photonic processor 1-1100.

IX. Analog Summation of Outputs

The inventors have recognized and appreciated that there are applications where it is useful to calculate the sum or the average of the outputs from the photonic processor 1-103 over time. For example, when the photonic processing system 1-100 is used to compute a more exact matrix-vector multiplication for a single data point, one may want to run a single data point through the photonic processor multiple times to improve the statistical results of the calculation. Additionally or alternatively, when computing the gradient in a backpropagation machine learning algorithm, one may not want a single data point determining the gradient, so multiple training data points may be run through photonic processing system 1-100 and the average result may be used to calculate the gradient. When using a photonic processing system to perform a batched gradient based optimization algorithm, this averaging can increase the quality of the gradient estimate and thereby reduce the number of optimization steps required to achieve a high quality solution.

The inventors have further recognized and appreciated that the output signals may be summed in the analog domain, before converting the outputs to digital electrical signals. Thus, in some embodiments, a low pass filter is used to sum the outputs from the homodyne detectors. By performing the summation in the analog domain, the homodyne electronics may use a slow ADC rather than a costlier fast ADC (e.g., an ADC with high power consumption requirements) that would be required to perform a summation in the digital domain.

FIG. 1-13 illustrates a portion of an optical receiver 1-1300 and how a low pass filter 1-1305 may be used with a homodyne detector 1-1301, according to some embodiments. The homodyne detector 1-1301 performs a measurement of the field and phase of an incoming optical pulse. If k is the label for the different input pulses over time and there is a total of K inputs, the sum over k can be automatically performed in the analog domain using low-pass filter 1-1305. The main difference between this optical receiver 1-1300 and the optical receiver 1-105 illustrated in FIG. 1-9 is that the low-pass filter is after the transimpedance amplifier 1-1303 after the output of the homodyne detector. If a total of K signals (with components $y_i^{(k)}$) arrive at the homodyne detector within a single slow sampling period $T_S^{(slow)}$, the low-pass filter will have accumulated/removed the charges in the capacitor C according to the sign and value of $y_i^{(k)}$. The final output of the low-pass filter is proportional to $Y_i = \Sigma_{k=1}^K y_i^{(k)}$, which can be read once with a slower ADC (not shown) with a sampling frequency of $f_S^{(slow)} = 1/T_S^{(slow)} = f_S/K$, where $f_S$ is the originally required sampling frequency. For an ideal system, the low-pass filter should have a 3-dB bandwidth: $f_{3\ dB} = f_S^{(slow)}/2$. For a low-pass filter using an RC circuit as shown in the embodiment of FIG. 1-13, $f_{3\ dB} = 1/(2\pi RC)$, and the values of R and C can be chosen to obtain the desired sampling frequency: $f_S^{(slow)}$.

In some embodiments both a fast ADC and a slow ADC may be present. In this context, a fast ADC is an ADC that is configured to receive and convert each individual analog signal into a digital signal (e.g., an ADC with a sampling frequency equal to or greater than the frequency at which the analog signals arrive at the ADC), and a slow ADC is an ADC that is configured to receive multiple analog signals and convert the sum or average of multiple received analog signals into a single digital signal (e.g., an ADC with a sampling frequency less than the frequency at which the analog signals arrive at the ADC). An electrical switch may be used to switch the electrical signal from the homodyne detector and possibly transimpedance amplifier to the low-pass filter with a slow ADC or to the fast ADC. In this way, the photonic processing system of some embodiments may switch between performing analog summation using the slow ADC and measuring every optical signal using the fast ADC.

X. Stabilizing Phases

The inventors have recognized and appreciated that it is desirable to stabilize the phase of the local oscillator used for performing phase-sensitive measurements (e.g., homodyne detection) to ensure accurate results. The photonic processors of the embodiments described herein perform matrix operations by interfering light between N distinct spatial modes. The results are measured, in some embodiments, with phase sensitive detectors, such as homodyne or heterodyne detectors. Thus, to ensure the matrix operations are accurately performed, the phase imparted at various portions of the photonic processor should be as accurate as possible and the phase of the local oscillator used to perform phase-sensitive detection should be precisely known.

The inventors have recognized and appreciated that parallel interference operations, such as those performed within a single column of VBSs of the photonic processor, must not only impart the correct phases using the phase modulators controlling the relative phase within the MZI of the VBS and the phase and the relative phase of the output of the MZI, but each VBS in a column should impart the same global phase shift across all the spatial modes of photonic processor. In this application, the global phase shift for a column of VBSs in the photonic processor is referred to as the "column-global phase." The column-global phase is the phase imparted due to effects not related to the programmed phases associated with the VBS, such as phases imparted due to propagation through the waveguide or phases due to temperature shifts. These phases need not be imparted exactly simultaneously within a column on VBSs, but only need be imparted as a result of traversing the column in question. Ensuring the column-global phase is uniform between the different spatial modes of the column is important because the output optical signals from one column will likely be interfered at one or more VBSs at a subsequent column. The subsequent interference—and therefore the accuracy of the calculation itself—would be incorrect if the column-global phase at the previous columns is not uniform.

FIG. 1-14 illustrates the column-global phases and total global phase for a photonic processing system 1-1400. Similar to the above-described embodiments of photonic processing systems, the photonic processing system 1-1400 includes a U-matrix implementation 1-1401, a diagonal matrix implementation 1-1403, a V-matrix implementation 1-1405, and a plurality of detectors 1-1407a-1-1407d. These implementations are similar to the first, second and third matrix implementations described above. For the sake of simplicity, only four modes of the photonic processing system 1-1400 are shown, though it should be understood that any larger number of modes may be used. Also for simplicity, only the VBSs associated with the U-matrix implementation 1-1401 are illustrated. The arrangement of components of the diagonal matrix implementation 1-1403 and a V-matrix implementation 1-1405 are similar to the third and fourth matrix implementations described above.

The U-matrix implementation 1-1401 includes a plurality of VBSs 1-1402, though only a single VBS 1-1402 is labeled for the sake of clarity. The VBSs are labeled, however, with subscripts that identify which optical modes are being mixed by a particular VBS and a superscript labeling the associated column.

As illustrated in FIG. 1-14, each column is associated with a column-global phase that is ideally uniform for every element of the column. For example, column 1 of the U-matrix implementation 1-1401 is associated with a column-global phase $\phi_{U_1}$, column 2 of the U-matrix implementation 1-1401 is associated with a column-global phase $\phi_{U_2}$, column 3 of the U-matrix implementation 1-1401 is associated with a column-global phase $\phi_{U_3}$, and column 4 of the U-matrix implementation 1-1401 is associated with a column-global phase $\phi_4$.

In some embodiments, the column-global phases can be made uniform at least in part by implementing each VBS 1-1402 as a MZI in a push-pull configuration. Alternatively or additionally, external phase shifter can be added to the output of each MZI to correct for any phase error imparted from the internal phase elements of the MZIs (e.g., the phase shifters).

The inventors have further recognized and appreciated that even if the conditions are such that each column of the photonic processing system 1-1400 provides a uniform column-global phase, phases can be accrued as the signal propagates from the first column to the last. There is a global U-matrix phase, $\Phi_U$, associated with the entire U-matrix implementation 1-1401 and is equal to the sum of the individual column-global phase. Similarly, the diagonal-matrix implementation 1-1403 is associated with a global diagonal-matrix phase, $\Phi_\Sigma$, and the V-matrix implementation 1-1405 is associated with a global diagonal-matrix phase, $\Phi_V$. A total global phase $\Phi_G$ for the entire photonic processing system 1-1400 is then given by the sum of the three individual global matrix phases. This total global phase may be set to be uniform between all the output modes, but the local oscillator that is used for phase-sensitive detection did not propagate through the photonic processor and did not experience this total global phase. The total global phase $\Phi_G$, if not accounted for, can lead to an error in the values read out by the homodyne detectors 1-1407a-1-1407d.

The inventors have further recognized that errors in the multiplication operation may result from changes in temperature, which change a waveguide's effective refractive index $n_{eff}$. Accordingly, in some embodiments, either the temperature of each column is set to be uniform or stabilization circuits can be placed at each column such that the phases imparted to all the modes of a single column are actively tuned to be uniform. Additionally, as the light signal for the local oscillator propagates through a different part of the system, the temperature difference between different parts of the system can cause errors in the phase-sensitive measurements. The amount of phase difference between the signal and the local oscillator $$\Phi_T = \frac{2\pi}{\lambda}(n_{eff}(T_S)L_s - n_{eff}(T_{LO})L_{LO}),$$

where $T_s$ and $T_{LO}$ are the temperatures of the signal waveguide in the photonic processor and the local oscillator waveguide, respectively, $n_{eff}(T)$ is the effective index of refraction as a function of temperature, $\lambda$ is the average wavelength of the light, and $L_s$ and $L_{LO}$ are the propagation lengths through the signal waveguide in the photonic processor and the local oscillator waveguide, respectively. Assuming that the difference in temperature $\Delta T = T_{LO} - T_S$ is small, then the effective index can be rewritten as:

$$n_{eff}(T_{LO}) \approx n_{eff}(T_S) + \frac{dn_{eff}}{dT}\bigg|_{T=T_S} \Delta T.$$

Therefore, the phase difference between the signal and the LO can be well approximated by $$\Phi_T = \frac{2\pi}{\lambda} \frac{dn_{eff}}{dT}\bigg|_{T=T_S} L \cdot \Delta T,$$

which increases linearly with longer propagation length L. Therefore, for a sufficiently long propagation distance, a small change in temperature can result in a large phase shift (on the order of one radian). Importantly, the values of $L_S$ does not need to be the same as the value of $L_{LO}$, and the maximum difference between the two is determined by the coherence length of the light source $L_{coh}$. For a light source with a bandwidth of $\Delta v$, the coherence length can be well approximated by $L_{coh} \approx c_{eff}\Delta v$, where $c_{eff}$ is the speed of light in the transmission medium. As long as the length difference between $L_S$ and $L_{LO}$ is much shorter than $L_{coh}$, interference between the signal and the local oscillator will be possible for the correct operation of the photonic processing system.

Based on the foregoing, the inventors have identified at least two sources of possible phase errors between the output signals of the photonic processor and the local oscillator used for homodyne detection in some embodiments. Thus, where an ideal homodyne detector would measure the magnitude and phase of the signal output by subtracting the outputs of the two photodetectors, resulting in a phase sensitive intensity output measurement of $I_{out} \propto |E_S||E_{LO}| \cos(\theta_S, \theta_{LO} + \Phi_G + \Phi_T)$, where $E_S$ is the electric field magnitude of the optical signal from the output of the photonic processor, $E_{LO}$ is the electric field magnitude of the local oscillator, $\theta_S$ is the phase shift imparted by the photonic processor that is desired to be measured, $\Phi_G$ is the total global phase, and $\Phi_T$ is the phase shift caused by temperature differences between the local oscillator and the optical signal. Consequently, if the total global phase and the phase shift due to temperature differences are not accounted for, the result of the homodyne detection can be erroneous. Therefore, in some embodiments the total systematic phase error, $\Delta\Phi = \Phi_G + \Phi_T$, is measured and the system is calibrated based on that measurement. In some embodiments, the total systematic phase error includes contributions from other sources of error that are not necessarily known or identified.

According to some embodiments, the homodyne detectors may be calibrated by sending pre-computed test signals to the detectors and using the difference between the pre-computed test signals and the measured test signals to correct for the total systematic phase error in the system.

In some embodiments, rather than considering the total global phase, $\Phi_G$, and the phase shift caused by temperature differences, $\Phi_T$, as being related to the optical signals propagating through the photonic processor, they can be described as the signal not accruing any phase shift at all but the LO having a total systematic phase error $-\Delta\Phi$. FIG. 1-15 illustrates the effect on the results of the homodyne measurements in such a situation. The original (correct) vector of quadrature values of the signal $[x, p]^T$ is rotated by a rotation matrix parameterized by $\phi\Phi$ producing an incorrect quadrature values of $[x', p']^T$.

Based on the rotation in quadrature due to the total systematic error, in some embodiments, the value of $\Delta\Phi$ is obtained as follows. First, a vector $\vec{v}_{in}$ is selected (e.g., a random vector), using, e.g., the controller 1-107. The vector is of a type that can be prepared by the optical encoders of the photonic processing system. Second, the output value of $\vec{v}_{out} = M \vec{v}_{in}$, where M is the matrix implemented by the photonic processor in the ideal case assuming that there is no unaccounted phase accrued of $\Delta\Phi$, is calculated using, for example, the controller 1-107 or some other computing device. As a result, each element of $\vec{v}_{out}$ corresponds to $x_k + ip_k$, where k labels each of the output modes of the photonic processor.

In some embodiments, loss in propagating the random vector through the photonic processor may be considered when calculating the theoretical prediction $x_k + ip_k$. For example, for a photonic processor with transmission efficiency $\eta$, the field signal of $x_k + ip_k$ will become $\sqrt{\eta}(x_k + ip_k)$.

Next, the random vector $\vec{v}_{in}$ is prepared by the optical encoder of the actual system, propagated through the photonic processor, and each element of the output vector is measured in both quadratures to obtain $x_k' + ip_k'$. The phase difference $\Delta\Phi_k$ between the local oscillator and the signal of output mode k is given by $$\Delta\Phi_k = \tan^{-1}\left(\frac{p_{k'}x_k - x_{k'}p_k}{x_k x_{k'} + p_k p_{k'}}\right).$$

(Generally, the phase difference $\Delta\Phi_k \neq \Delta\Phi_l$ for $k \neq l$ as the path length of the LO to the detector for mode k can be different to that for mode l).

Finally, the local oscillator phase shifter used to select the measurement quadrature of the homodyne detector is controlled to impart $\theta^{LO,k} = \Delta\Phi_k$. As a result, the axes $(x, p)$ will align with the axes $(x', p')$, as illustrated in FIG. 1-15. The calibration may be checked at this stage to ensure it is accurate by propagating the vector $\vec{v}_{in}$ once again to see that the obtained measurement results are equal to the predicted $\vec{v}_{out}$ when both quadratures are measured.

Generally, the value of $\Delta\Phi_k$ can be determined more precisely if the field amplitude $|E_{S,k}| = \sqrt{x_k^2 + p_k^2} = \sqrt{x_{k'}^2 + p_{k'}^2}$ is as large as possible. For example, if the field $E_{S,k}$ is considered to be a coherent signal, e.g. from a laser source, then the optical signal may be theoretically modeled as a coherent state. The intuitive picture is given in FIG. 1-16, where the signal is the amplitude $|E_{S,k}|$ and the noise is given by the standard deviation of the Gaussian coherent state. The coherent state $|\alpha_k\rangle$ in mode k is the eigenstate of the annihilation operator $a_k$, i.e. $a_k|\alpha_k\rangle = \alpha_k|\alpha_k\rangle$. The electric field of mode k with a single frequency $\omega$ is described by $E_{S,k}^{(+)}(t) = a_k e^{-i\omega t}$, which is also an eigenstate of the coherent state: $E_{S,k}^{(+)}(t)|\alpha_k\rangle = \alpha_k e^{-\omega t}|\alpha_k\rangle$. A homodyne detector with a local oscillator of the same frequency $\omega$ performs the quadrature measurements $x_k = (a_k + a_k^\dagger)/2$ when $\theta_{LO} = 0$ and $p_k = (a_k - a_k^\dagger)/2i$ when $\theta_{LO} = \pi/2$. An ideal homodyne detector will find that these measurements have an intrinsic quantum noise of $\sqrt{\langle\Delta x_k^2\rangle} = \frac{1}{2}$ and $\sqrt{\langle\Delta p_k^2\rangle} = \frac{1}{2}$. This noise is related to the quantum uncertainties, and it can be reduced by squeezing on the quadratures. The precision at which the angle $\Delta\Phi_k$ can be determined is directly related to the signal-to-noise ratio (SNR) of these measurements. For a coherent-state signal $E_{S,k}$ with a total of $N_{ph}$ photons (i.e. $E_{S,k} = |\sqrt{N_{ph}} e^{i\theta_S}\rangle$, the SNR of both $x_k$ and $p_k$ is upper bounded by:

$$SNR_x = \frac{\langle x_k \rangle^2}{\langle \Delta x_k \rangle^2} \leq 4N_{ph} \text{ and}$$

$$SNR_p = \frac{\langle p_k \rangle^2}{\langle \Delta p_k \rangle^2} \leq 4N_{ph}.$$

(The bound of $SNR_x$ is saturated when $\theta_S = 0$ or $\pi$, and the bound on $SNR_p$ is saturated when $\theta_S = \pi/2$ or $3\pi/2$). Therefore, to increase the SNR and to determine the values of $\Delta\Phi_k$ more accurately, some embodiments may propagate a few different choices of vector $\sqrt{v_{in}}$ (e.g., multiple different random vectors). In some embodiments, the choices of $\sqrt{v_{in}}$ are chosen to maximize the amplitude $|E_{S,k}| = N_{ph}$ for one value of k at a time.

There may be phase drift during the operation of the photonic processing system, e.g., due to temperature fluctuations over time. Thus, in some embodiments, the aforementioned calibration procedure may be performed repeatedly during the operation of the system. For example, in some embodiments, the calibration procedure is performed regularly at a time scale that is shorter than the natural timescale of the phase drift.

The inventors have further recognized and appreciated that it is possible to perform signed matrix operations without the need of phase-sensitive measurements at all. Therefore, in applications, each homodyne detector at each output mode may be replaced by a direct photodetector which measures the intensity of the light at that output mode. As there is no local oscillator in such a system, the systematic phase error $\Delta\Phi$ is non-existent and meaningless. Thus, according to some embodiments, phase-sensitive measurements, such as homodyne detection, may be avoided such that the systematic phase error is insignificant. For example, when computing matrix operations of signed matrices and vectors, complex matrices and vectors, and hypercomplex (quaternion, octonion, and other isomorphisms (e.g., elements of unital algebra)) matrices and vectors using unsigned matrices do not require phase-sensitive measurements.

To illustrate how phase-sensitive measurements are not necessary, consider the case of performing matrix multiplication between a signed matrix M and a signed vector $\sqrt{v_{in}}$. To compute the value of signed output $\sqrt{v_{out}} = M\sqrt{v_{in}}$, the following procedure may be performed by, for example, the controller 1-107. First, the matrix M is split into $M_+$ and $M_-$, where $M_+(M_-)$ is a matrix that contains all the positive (negative) entries of M. In this case, $M = M_+ - M_-$. Second, the vector is split in a similar manner such that the vector $\sqrt{v_{in}} = \sqrt{v_{in,+}} - \sqrt{v_{in,-}}$, where $\sqrt{v_{in,+}}(\sqrt{v_{in,-}})$ is a vector that contains all the positive (negative) entries of $\sqrt{v_{in}}$. As a result of the splittings, $\sqrt{v_{out}} = M\sqrt{v_{in}} = (M_+ - M_-)(\sqrt{v_{in,+}} - \sqrt{v_{in,-}}) = (M_+\sqrt{v_{in,+}} + M_-\sqrt{v_{in,-}}) - (M_+\sqrt{v_{in,-}} + M_-\sqrt{v_{in,+}})$. Each term of this final equation corresponds to a separate operation ($M_+\sqrt{v_{in,+}}, M_-\sqrt{v_{in,-}}, M_+\sqrt{v_{in,-}}$, and $M_-\sqrt{v_{in,+}}$) that may be performed individually by the photonic processing system. The output of each operation is a vector of a single (positive) sign, and therefore can be measured using a direct detection scheme without the need for homodyne detection. The photodetector scheme will measure the intensity, but the square root of the intensity may be determined, resulting in the electric field amplitude. In some embodiments, each operation is performed separately and the results are stored in a memory (e.g., memory 1-109 of controller 1-107) until all of the separate operations are performed and the results may be digitally combined to obtain the final result of the multiplication, $\sqrt{v_{out}}$.

The above scheme works because $M_+$ and $M_-$ are both matrices of all positive entries. Similarly, $\sqrt{v_{in,+}}$ and $\sqrt{v_{in,-}}$ are both vectors of all positive entries. Therefore, the results of their multiplications will be vectors of all positive entries-regardless of the combination.

The inventors have further recognized and appreciated that the above splitting technique may be extended to complex-valued vectors/matrices, quaternion-valued vectors/matrices, octonion-valued vectors/matrices, and other hypercomplex representations. Complex numbers employ two different fundamental units $\{1, i\}$, Quaternions employ four different fundamental units $\{1, i, j, k\}$, and octonions employ eight fundamental units $\{e_0 \equiv 1, e_1, e_2, \ldots, e_7\}$.

In some embodiments, a complex vector may be multiplied by a complex matrix without the need for phase-sensitive detection by splitting the multiplication into separate operations similar to the procedure described above for signed matrices and vectors. In the case of complex numbers, the multiplication splits into 16 separate multiplications of all-positive matrices and all-positive vectors. The results of the 16 separate multiplications may then be digitally combined to determine the output vector result.

In some embodiments, a quaternion-valued vector may be multiplied by a quaternion-valued matrix without the need for phase-sensitive detection by splitting the multiplication into separate operations similar to the procedure described above for signed matrices and vectors. In the case of quaternion-valued numbers, the multiplication splits into 64 separate multiplications of all-positive matrices and all-positive vectors. The results of the 64 separate multiplications may then be digitally combined to determine the output vector result.

In some embodiments, a octonion-valued vector may be multiplied by a octonion-valued matrix without the need for phase-sensitive detection by splitting the multiplication into separate operations similar to the procedure described above for signed matrices and vectors. In the case of octonion-valued numbers, the multiplication splits into 256 separate multiplications of all-positive matrices and all-positive vectors. The results of the 256 separate multiplications may then be digitally combined to determine the output vector result.

The inventors have further recognized and appreciated that temperature-dependent phase $\Phi_T$ can be corrected by placing a temperature sensor next to each MZI of the photonic processor. The results of the temperature measurement may then be used as an input to a feedback circuitry that controls the external phases of each MZI. The external phases of the MZI are set to cancel the temperature-dependent phase accrued at every MZI. A similar temperature feedback loop can be used on the local oscillator propagation path. In this case, the temperature measurement results are used to inform the settings of the homodyne detector quadrature-selecting phase shifter to cancel the phase accrued by the local oscillator due to detected temperature effects.

In some embodiments, the temperature sensors can be those conventionally used in semiconductor devices, e.g. p-n junction or bipolar junction transistor, or they can be photonic temperature sensors, e.g. using resonators whose resonance changes with temperatures. External temperature sensors such as thermocouples or thermistors may also be used in some embodiments.

In some embodiments, the phases accrued may be directly measured by, for example, tapping some light at every column and performing homodyne detection with the same global local oscillator. This phase measurement can directly inform the values of external phases used at each MZI to correct for any phase error. In the case of directly measured phase errors, the errors do not need to be column-global to be corrected.

XI. Intermediary Computation for Large Data

The inventors have recognized and appreciated that the matrix vector product performed by the photonic processor 1-103, and/or any other photonic processor according to other embodiments described in the present disclosure, can be generalized into tensor (multidimensional array) operations. For example, the core operation of $M\vec{x}$ where M is a matrix and z is a vector can be generalized into a matrix-matrix product: MX where both M and X are matrices. In this particular example, consider the n-by-m matrix X to be a collection of m column vectors each consisting of n elements. i.e. $X=[\vec{x_1}, \vec{x_2}, \ldots, \vec{x_m}]$. A photonic processor can complete the matrix-matrix product MX one column vector at a time with a total of m matrix-vector products. The computation can be distributed among multiple photonic processors as the computation is a linear operation, which is perfectly parallelizable, e.g., any one matrix-vector product output does not depend on the results of the other matrix-vector products. Alternatively, the computation can be performed by a single photonic processor serially over time, e.g., by performing each matrix-vector product one at a time and combining the results digitally after performing all of the individual matrix-vector multiplications to determine the result of the matrix-matrix product (e.g., by storing the results in an appropriate memory configuration).

The concept above can be generalized into computing a product (e.g., a dot product) between two multidimensional tensors. The general algorithm is as follows and may be performed, at least in part, by a processor such as the processor 1-111: (1) Take a matrix slice of the first tensor; (2) Take a vector slice of the second tensor, (3) Perform a matrix-vector product, using the photonic processor, between the matrix slice in step 1 and the vector slice in step 2, resulting in an output vector; (4) Iterate over the tensor indices from which the matrix slice (from step 1) was obtained and the tensor indices from which the vector slice (from step 2) was obtained. It should be noted that when taking the matrix slice and the vector slice (steps 1 and 2), multiple indices can be combined into one. For example, a matrix can be vectorized by stacking all the columns into a single column vector, and in general a tensor can be matricized by stacking all the matrices into a single matrix. Since all the operations are fully linear, they are again can be highly parallelized where each of a plurality of photonic processor does not need to know whether the other photonic processors have completed their jobs.

By way of a non-limiting example, consider the multiplication between two three-dimensional tensors $C_{ijlm}=\Sigma_k A_{ijk}B_{klm}$. The pseudocode based on the prescription above is as follows:

(1) Take a matrix slice: $A_i \leftarrow A[i,:,:]$;

(2) Take a vector slice: $\vec{b}_{lm} \leftarrow B[:,l,m]$;

(3) Compute $\vec{c}_{ilm}=A_i\vec{b}_{lm}$, where $C[i,:,l,m] \leftarrow \vec{c}_{ilm}$; and (4) Iterate over the indices i, l, and m to reconstruct the four-dimensional tensor $C_{ijlm}$, where the values of all elements indexed by j is fully determined with a single matrix-vector multiplication.

The inventors have further recognized and appreciated that the size of the matrices/vectors to be multiplied can be larger than the number of modes supported by the photonic processor. For example, a convolution operation in a convolutional neural network architecture may use only a few parameters to define a filter, but may consist of a number of matrix-matrix multiplications between the filter and different patches of the data. Combining the different matrix-matrix multiplications result in two input matrices that are larger than the size of the original filter matrix or data matrix.

The inventors have devised a method of performing matrix operations using the photonic processor when the matrices to be multiplied are larger than the size/the number of modes possessed by the photonic processor being used to perform the calculation. In some embodiments, the method involves using memory to store intermediate information during the calculation. The final calculation result is computed by processing the intermediate information. For example, as illustrated in FIG. 1-17, consider the multiplication 1-1700 between an I×J matrix A and a J×K matrix B to give a new matrix C=AB, which has I×K elements, using an n×n photonic processing system with n≤I, J, K. In FIG. 1-17, the shaded elements simply illustrate that the element 1-1701 of matrix C is calculated using the elements of row 1-1703 of matrix A and column 1-1705 of matrix B. The method illustrated by FIGS. 1-17 and 1-18 is as follows:

Construct n×n submatrix blocks of within matrices A and B. Label the blocks by the parenthesis superscript $A^{(ij)}$ and $B^{(jk)}$, where $i \in \{1, \ldots, \text{ceil}(I/n)\}$, $j \in \{1, \ldots, \text{ceil}(J/n)\}$, and $k \in \{1, \ldots, \text{ceil}(K/n)\}$. When the values of I, J, or K are not divisible by n, the matrices may be padded with zeros such that the new matrix has dimensions that are divisible by n-hence the ceil function in the indexing of i, j, and k. In the example multiplication 1-1800 illustrated in FIG. 1-18, matrix A is split into six n×n submatrix blocks 1-1803 and matrix B is split into three n×n submatrix blocks 1-1805, resulting in a resulting matrix C that is comprised of two n×n submatrix blocks 1-1801.

To compute the n×n submatrix block $C^{(ik)}$ within matrix C, perform the multiplications $C^{(ik)} = \sum_{j=1}^{\text{ceil}(J/n)} A^{(ij)} B^{(jk)}$ in the photonic processor by, for example:

(1) Controlling the photonic processor to implement the submatrix $A^{(ij)}$ (e.g., one of the submatrices 1-1803);
(2) Encoding optical signals with the column vectors of one of the submatrices $B^{(jk)}$ (e.g., one of the submatrices 1-1805) and propagating the signals through the photonic processor;
(3) Storing the intermediate results of each matrix-vector multiplication in memory;
(4) Iterating over the values of j, repeating steps (a)-(c); and
(5) Computing the final submatrix $C^{(ik)}$ (e.g., one of the submatrices 1-1801) by combining the intermediate results with digital electronics, e.g., a processor.

As described above and shown in FIG. 1-17 and FIG. 1-18, the method may include expressing the matrix multiplication using parentheses index notation and performing the operation of the matrix-matrix multiplication using the parentheses superscript indices instead of the subscript indices, which are used to describe the matrix elements in this disclosure. These parentheses superscript indices correspond to the n×n block of submatrix. In some embodiments, the method can be generalized to tensor-tensor multiplications by breaking up the multidimensional arrays into n×n submatrix block slices, for example, by combining this method with the tensor-tensor multiplication described above.

In some embodiments, an advantage of processing blocks of submatrices using a photonic processor with fewer number of modes is that it provides versatility with regards to the shape of the matrices being multiplied. For example, in a case where I>>J, performing singular value decompositions will produce a first unitary matrix of size $I^2$, a second unitary matrix of size $J^2$, and a diagonal matrix with J parameters. The hardware requirements of storing or processing $I^2$ matrix elements, which are much larger than the number of elements of the original matrix, can be too large for the number of optical modes included in some embodiments of the photonic processor. By processing submatrices rather than the entire matrix all at once, any size matrices may be multiplied without imposing limitations based on the number of modes of the photonic processor.

In some embodiments, the submatrices of B are further vectorized. For example, the matrix A may be first padded to a $[(n \cdot [I/n]) \times (n \cdot [J/n])]$ matrix and then partitioned into a $[[I/n] \times [J/n]]$ grid of submatrices (each of size [n×n]) and A (i is the [n×n] submatrix in the $i^{th}$ row and $j^{th}$ column of this grid, B has been first padded to a $[(n \cdot [J/n]) \times K]$ matrix and then partitioned into a $[[J/n] \times 1]$ grid of submatrices (each of size [n×K]) and $B^{(j)}$ is the [n×K] submatrix in the $j^{th}$ row of this grid, and C has been first padded to a $[(n \cdot [J/n]) \times K]$ matrix and then partitioned into a $[[I/n] \times 1]$ grid of submatrices (each of size [n×K]) and $C^{(i)}$ is the [n×K] submatrix in the $i^{th}$ row of this grid. In this vectorized form, the computation is denoted by: $C^{(i)} = \sum_{j=1}^{[J/n]} A^{(ij)} B^{(j)}$.

In some embodiments, the submatrices of B are further vectorized. For example, the matrix A may be first padded to a $[(n \cdot [I/n]) \times (n \cdot [J/n])]$ matrix and then partitioned into a $[[I/n] \times [J/n]]$ grid of submatrices (each of size [n×n]) and $A^{(ij)}$ is the [n×n] submatrix in the $i^{th}$ row and $j^{th}$ column of this grid, B has been first padded to a $[(n \cdot [J/n]) \times K]$ matrix and then partitioned into a $[[J/n] \times 1]$ grid of submatrices (each of size [n×K]) and $B^{(j)}$ is the [n×K] submatrix in the $j^{th}$ row of this grid, and C has been first padded to a $[(n \cdot [J/n]) \times K]$ matrix and then partitioned into a $[[I/n] \times 1]$ grid of submatrices (each of size [n×K]) and $C^{(i)}$ is the [n×K] submatrix in the $i^{th}$ row of this grid. In this vectorized form, the computation is denoted by: $C^{(i)} = \sum_{j=1}^{[J/n]} A^{(ij-)} B^{(j)}$.

XII. Precision of the Computation

The inventors have recognized and appreciated that the photonic processor 1-103, and/or any other photonic processor according to other embodiments described in the present disclosure, is an instance of analog computer and, as most data in this information age are stored in a digital representation, the digital precision of the computation performed by the photonic processor is important to quantify. In some embodiments, the photonic processor according to some embodiments performs a matrix-vector product: $\vec{y} = M \vec{x}$, where $\vec{x}$ is the input vector, M is an n×n matrix, and $\vec{y}$ is the output vector. In index notation, this multiplication is written as $y_i = \sum_{j=1}^{n} M_{ij} x_j$ which is the multiplication between n elements of $M_{ij}$ (iterate over j) and n elements of $x_j$ (iterate over j) and then summing the results altogether. As the photonic processor is a physical analog system, in some embodiments the elements $M_{ij}$ and $x_j$ are represented with a fixed point number representation. Within this representation, if $M_{ij} \in \{0,1\}^{m_1}$ is an $m_1$-bit number and $x_j \in \{0,1\}^{m_2}$ is an $m_2$-bit number, then a total of $m_1 + m_2 + \log_2(n)$ bits are used to fully represent the resulting vector element $y_i$. In general, the number of bits used to represent the result of a matrix-vector product is larger than the number of bits required to represent the inputs of the operation. If the analog-to-digital converter (ADC) used is unable to read out the output vector at full precision, then the output vector elements may be rounded to the precision of the ADC.

The inventors have recognized and appreciated that constructing an ADC with a high bit-precision at bandwidths that correspond to the rate at which input vectors in the form of optical signals are sent through the photonic processing system can be difficult to achieve. Therefore, in some embodiments, the bit precision of the ADC may limit the bit precision at which the matrix elements $M_{ij}$ and the vector element $x_j$ are represented (if a fully precise computation is desired). Accordingly, the inventors have devised a method of obtaining an output vector at its full precision, which can be arbitrarily high, by computing partial products and sums. For the sake of clarity, it will be assumed that the number of bits needed to represent either $M_{ij}$ or $x_j$ is the same, i.e. $m_1 = m_2 = m$. However, this assumption however can obviated in general and does not limit the scope of embodiments of the present disclosure.

The method, according to some embodiments, as a first act, includes dividing the bit-string representation of the matrix element $M_{ij}$ and the vector element $x_j$ into d divisions with each division containing k=m/d bits. (If k is not an integer, zeros may be appended until m is divisible by d.) As a result, the matrix element $M_{ij}=M_{ij}^{[0]}2^{k(d-1)}+M_{ij}^{[1]}2^{k(d-2)}+\ldots+M_{ij}^{[d-1]}2^0$, where $M_{ij}^{[a]}$ is the k-bit value of the a-th most significant k-bit string of $M_{ij}$. In terms of bit string, one writes $M_{ij}=M_{ij}^{[0]}M_{ij}^{[1]}\ldots M_{ij}^{[d-1]}$. Similarly, one can also obtain $x_j=x_j^{[0]}2^{k(d-1)}+x_j^{[1]}2^{k(d-2)}+\ldots+x_j^{[d-1]}2^0$, where the vector element $x_j=x_j^{[0]}x_j^{[1]}\ldots x_j^{[d-1]}$ in terms of its bit string. The multiplication $y_i=\Sigma_j M_{ij}x_j$ can be broken down in terms of these divisions as: $y_i=\Sigma_{p=0}^{2(d-1)}((\Sigma_{a,b\in S_p}\Sigma_j M_{ij}^{[a]}x_j^{[b]})2^{2k(d-1)-pk})$, where the set $S_p$ is the set of all integer values of a and b, where a+b=p.

The method, as a second act, includes controlling the photonic processor to implement the matrix $M_{ij}^{[a]}$ and propagating the input vector $x_j^{[b]}$, each of which is only k-bit precise, through the photonic processor in the form of encoded optical signals. This matrix-vector product operation performs $y_i^{[a,b]}=\Sigma_j M_{ij}^{[a]}x_j^{[b]}$. The method includes, storing the output vector $y_i^{[a,b]}$ which is precise up to $2k+\log_2(n)$ bits.

The method further includes iterating over the different values of a, b within the set $S_p$ and repeating the second act for each of the different values of a, b and storing the intermediate results $y_i^{[a,b]}$.

As a third act, the method includes computing the final result $\Sigma_{a,b\in S_p}\Sigma_j M_{ij}^{[a]}x_{j[b]}=\Sigma_{a,b\in S_p}y_i^{[a,b]}$ by summing over the different iterations of a and b with digital electronics, such as a processor.

The precision of the ADC used to capture a fully precise computation according to some embodiments of this method is only $2k+\log_2(n)$ bits, which is fewer than the $2m+\log_2(n)$ bits of precision needed if the computation is done using only a single pass.

The inventors have further recognized and appreciated that embodiments of the foregoing method can be generalized to operate on tensors. As previously described, the photonic processing system can perform tensor-tensor multiplications by using matrix slices and vector slices of the two tensors. The method described above can be applied to the matrix slices and vector slices to obtain the output vector slice of the output tensor at full precision.

Some embodiments of the above method use the linearity of the elementary representation of the matrix. In the description above, the matrix is represented in terms of its Euclidean matrix space and the matrix-vector multiplication is linear in this Euclidean space. In some embodiments, the matrix is represented in terms of the phases of the VBSs and therefore the divisions may be performed on the bit strings representing the phases, instead of the matrix elements directly. In some embodiments, when the map between the phases to the matrix elements is a linear map, then the relationship between the input parameters—the phases of the VBSs and the input vector elements in this case—and the output vector is linear. When this relationship is linear, the method described above is still applicable. However, in general, a nonlinear map from the elementary representation of the matrix to the photonic representation may be considered, according to some embodiments. For example, the bit-string division of the Euclidean space matrix elements from their most-significant k-bit string to the least-significant k-bit string may be used to produce a series of different matrices that are decomposed to a phase representation and implementing using a photonic processor.

The divisions need not be performed on both the matrix elements and the input vector elements simultaneously. In some embodiments, the photonic processor may propagate many input vectors for the same matrices. It may be efficient to only perform the divisions on the input vectors and keep the VBS controls at a set precision (e.g., full precision) because the digital-to-analog converters (DACs) for the vector preparations may operate at a high bandwidth while the DACs for the VBSs may be quasi-static for multiple vectors. In general, including a DAC with a high bit precision at higher bandwidth is more difficult than designing one at a lower bandwidth. Thus, in some embodiments, the output vector elements may be more precise than what is allowed by the ADC, but the ADC will automatically perform some rounding to the output vector value up to the bit precision allowed by the ADC.

XIII. Method of Manufacture

Embodiments of the photonic processing system may be manufactured using conventional semiconductor manufacturing techniques. For example, waveguides and phase shifters may be formed in a substrate using conventional deposition, masking, etching, and doping techniques.

FIG. 1-19 illustrates an example method 1-1900 of manufacturing a photonic processing system, according to some embodiments. At act 1-1901, the method 1-1900 includes forming an optical encoder using, e.g., conventional techniques. For example, a plurality of waveguides and modulators may be formed in a semiconductor substrate. The optical encoder may include one or more phase and/or amplitude modulators as described elsewhere in this application.

At act 1-1903, the method 1-1900 includes forming a photonic processor and optically connecting the photonic processor to the optical encoder. In some embodiments, the photonic processor is formed in the same substrate as the optical encoder and the optical connections are made using waveguides formed in the substrate. In other embodiments, the photonic processor is formed in a separate substrate from the substrate of the optical encoder and the optical connection is made using optical fiber.

At act, 1-1905, the method 1-1900 include forming an optical receiver and optically connecting the optical receiver to the photonic processor. In some embodiments, the optical receiver is formed in the same substrate as the photonic processor and the optical connections are made using waveguides formed in the substrate. In other embodiments, the optical receiver is formed in a separate substrate from the substrate of the photonic processor and the optical connection is made using optical fiber.

FIG. 1-20 illustrates an example method 1-2000 of forming a photonic processor, as shown in act 1-1903 of FIG. 1-19. At act 1-2001, the method 1-2000 includes forming a first optical matrix implementation, e.g., in a semiconductor substrate. The first optical matrix implementation may include an array of interconnected VBSs, as described in the various embodiments above.

At act 1-2003, the method 1-2000 include forming a second optical matrix implementation and connecting the second optical matrix implementation to the first optical matrix implementation. The second optical matrix implementation may include one or more optical components that are capable of controlling the intensity and phase of each optical signal received from the first optical matrix implementation, as described in the various embodiments above. The connections between the first and second optical matrix implementation may include waveguides formed in the substrate.

At act 1-2005, the method 1-2000 includes forming a third optical matrix implementation and connecting the third optical matrix implementation to the second optical matrix implementation. The third optical matrix implementation may include an array of interconnected VBSs, as described in the various embodiments above. The connections between the second and third optical matrix implementation may include waveguides formed in the substrate.

In any of the above acts, the components of the photonic processor may be formed in a same layer of the semiconductor substrate or in different layers of the semiconductor substrate.

XIV. Method of Use

FIG. 1-21 illustrates a method 1-2100 of performing optical processing, according to some embodiments. At act 1-2101, the method 1-2100 includes encoding a bit string into optical signals. In some embodiments, this may be performed using a controller and optical encoder, as described in connection with various embodiments of this application. For example, a complex number may be encoded into the intensity and phase of an optical signal.

At act 1-2103, the method 1-2100 includes controlling a photonic processor to implement a first matrix. As described above, this may be accomplished by having a controller perform an SVD on the matrix and break the matrix into three separate matrix components that are implemented using separate portions of a photonic processor. The photonic processor may include a plurality of interconnected VBSs that control how the various modes of the photonic processor are mixed together to coherently interfere the optical signals when they are propagated through the photonic processor.

At act 1-2105, the method 1-2100 includes propagating the optical signals though the optical processor such that the optical signals coherently interfere with one another in a way that implements the desired matrix, as described above.

At act, 1-2107, the method 1-2100 includes detecting output optical signals from the photonic processor using an optical receiver. As discussed above, the detection may use phase-sensitive or phase-insensitive detectors. In some embodiments, the detection results are used to determine a new input bit string to be encoded and propagated through the system. In this way, multiple calculations may be performed in serial where at least one calculation is based on the results of a previous calculation result.

XV. Backpropagation Processing

As described above, in some embodiments, photonics processing system 100 may be used to implement aspects of a neural network or other matrix-based differentiable program that may be trained using a backpropagation technique.

An example backpropagation technique 2-100 for updating a matrix of values in a Euclidean vector space (e.g., a weight matrix for a layer of a neural network) for a differentiable program (e.g., a neural network or latent variable graphical model) is shown in FIG. 2-1.

At act 2-101, a matrix of values in a Euclidean vector space (e.g., a weight matrix for a layer of a neural network) may be represented as an angular representation by, for example, configuring components of photonics processing system 100 to represent the matrix of values. After the matrix is represented in the angular representation, the process 2-100 proceeds to act 2-102, where training data (e.g., a set of input training vectors and associated labeled outputs) is processed to compute an error vector by assessing a performance measure of the model. Process 2-100 then proceeds to act 2-103, where at least some gradients of parameters of the angular representation needed for backpropagation are determined in parallel. For example, as discussed in more detail below, the techniques described herein enable gradients for an entire column of parameters to be determined simultaneously, significantly speeding up the amount of time needed to perform backpropagation as compared to evaluating the gradient with respect to each angular rotation individually. Process 2-100 then proceeds to act 2-104, where the matrix of values in the Euclidean vector space (e.g., the weight matrix values for a layer of a neural network) is updated by updating the angular representation using the determined gradients. A further description of each of the acts illustrated in process 2-100 of FIG. 2-1 is provided below.

FIG. 2-2 illustrates a flowchart of how act 2-101 shown in FIG. 2-1 may be performed in accordance with some embodiments. At act 2-201, a controller (e.g., controller 107) may receive a weight matrix for a layer of a neural network. At act 2-202, the weight matrix may be decomposed into a first unitary matrix, V, a second unitary matrix, U, and a diagonal matrix of signed singular values, $\Sigma$, such that the weight matrix W, is defined as:

$$W = V^T \Sigma U,$$

where U is an m×m unitary matrix. V is an n×n unitary matrix, $\Sigma$ is an n×m diagonal matrix with signed singular values, and the superscript "T" indicates the transpose of a matrix. In some embodiments, the weight matrix W is first partitioned into tiles, each of which is decomposed into the triple product of such matrices. The weight matrix, W, may be a conventional weight matrix as is known in the field of neural networks.

In some embodiments, the weight matrix decomposed into phase space is a pre-specified weight matrix, such as those provided by a random initialization procedure or by employing a partially trained weight matrix. If there is no partially-specified weight matrix to use for initialization of the backpropagation routine, then the decomposition in act 2-202 may be skipped and instead, the parameters of the angular representation (e.g., singular values and parameters of the unitary or orthogonal decomposition) may be initialized by, for example, randomly sampling the phase space parameters from a particular distribution. In other embodiments, a predetermined initial set of singular values and angular parameters may be used.

At act 2-203, the two unitary matrices U and V may be represented as compositions of a first and second set of unitary transfer matrices, respectively. For example, when matrices U and V are orthogonal matrices, they may be transformed in act 2-203 into a series of real-valued Givens rotation matrices or Householder reflectors, an example of which is described above in Section V.

At act 2-204, a photonics-based processor may be configured based on the decomposed weight matrix to implement the unitary transfer matrices. For example, as described above, a first set of components of the photonics-based processor may be configured based on the first set of unitary transfer matrices, a second set of components of the photonics-based processor may be configured based on the diagonal matrix of signed singular values, and a third set of components of the photonics-based processor may be configured based on the second set of unitary transfer matrices. Although the processes described herein are with respect to implementing the backpropagation technique using a photonics-based processor, it should be appreciated that the backpropagation technique may be implemented using other computing architectures that provide parallel processing capabilities, and embodiments are not limited in this respect.

Returning to the process 2-100 in FIG. 2-1, act 2-102 is directed to processing training data to compute an error vector after the weight matrix has been represented as an angular representation, for example, using a photonics-based processor as described above. FIG. 2-3 shows a flowchart of implementation details for performing act 2-102 in accordance with some embodiments. Prior to processing training data using the techniques described herein, the training data may divided into batches. Training data may take any form. In some embodiments, the data may be divided into batches in the same way as is done for some conventional mini-batch stochastic gradient descent (SGD) techniques. The gradients computed with this procedure can be used for any optimization algorithm, including but not limited to SGD, AdaGrad, Adam, RMSProp, or any other gradient-based optimization algorithm.

In the process shown in FIG. 2-3, each vector in a particular batch of training data may be passed through the photonics processor and a value of a loss function may be computed for that vector. At act 2-301, an input training vector from a particular batch of training data is received. At act 2-302, the input training vector is converted into photonic signals, for example, by encoding the vector using optical pulses that have amplitudes and phases corresponding to the input training vector values, as described above. At act 2-303, the photonic signals corresponding to the input training vector are provided as input to a photonics processor (e.g., photonics processor 103), which has been configured to implement (e.g., using an array of configurable phase shifters and beam splitters) a weight matrix, as described above, to produce an output vector of pulses. The optical intensity of the pulses output from the photonics processor may be detected using, for example, homodyne detection, as described above in connection with FIGS. 9 and 10 to produce a decoded output vector. At act 2-304, the value of a loss function (also known as a cost function or error metric) is computed for the input training vector. The process of acts 2-301 to 2-304 then repeats until all input training vectors in the particular batch have been processed and a corresponding value of the loss function has been determined. At act 2-305, the total loss is computed by aggregating these losses from each input training vector, e.g., this aggregation may take the form of an average.

Figures 1, 2, 3, 4, 5:
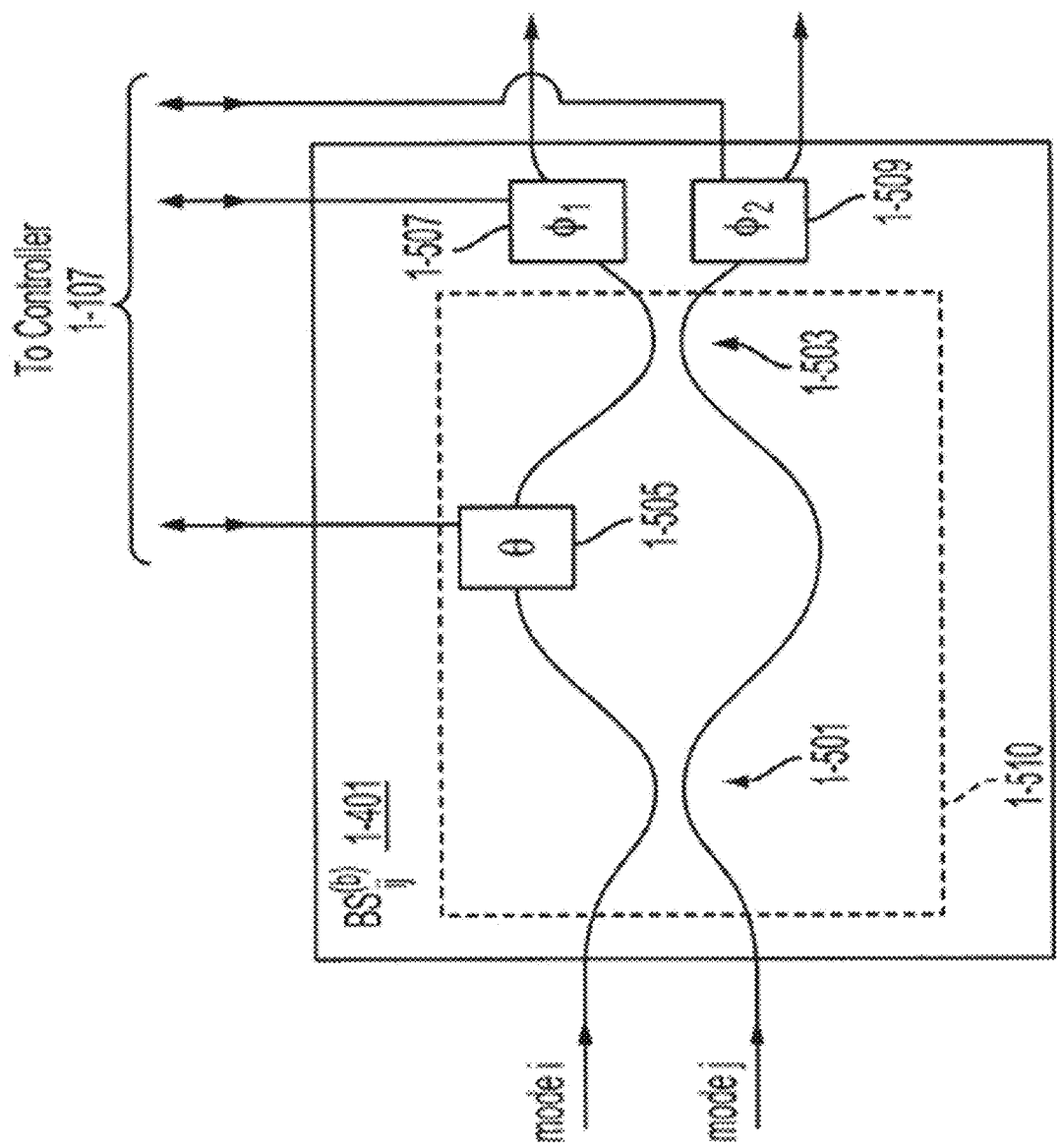
Figures 1, 2, 3, 4, 5, 6:
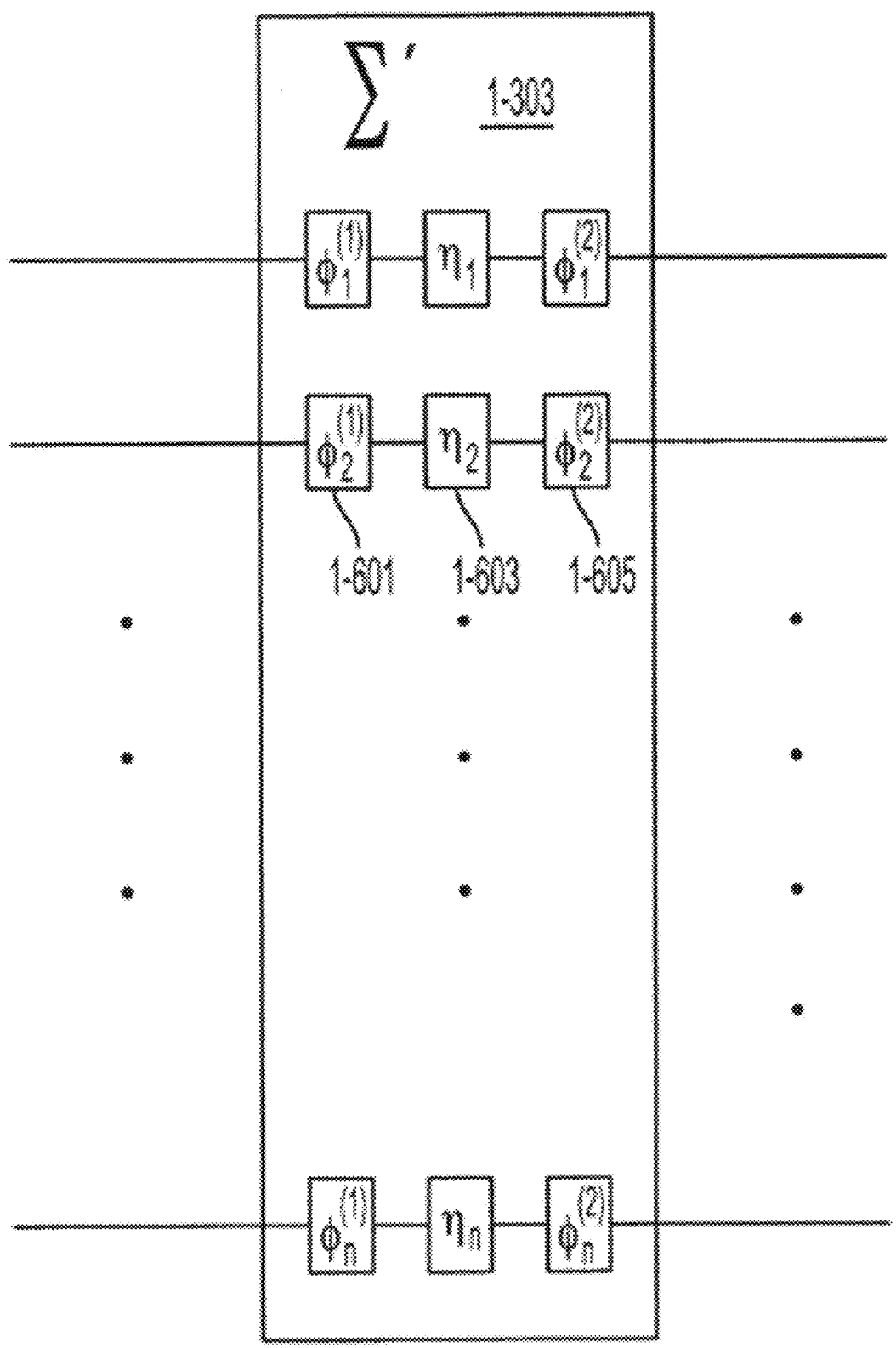
Figures 1, 2, 3, 4, 5, 6, 7:
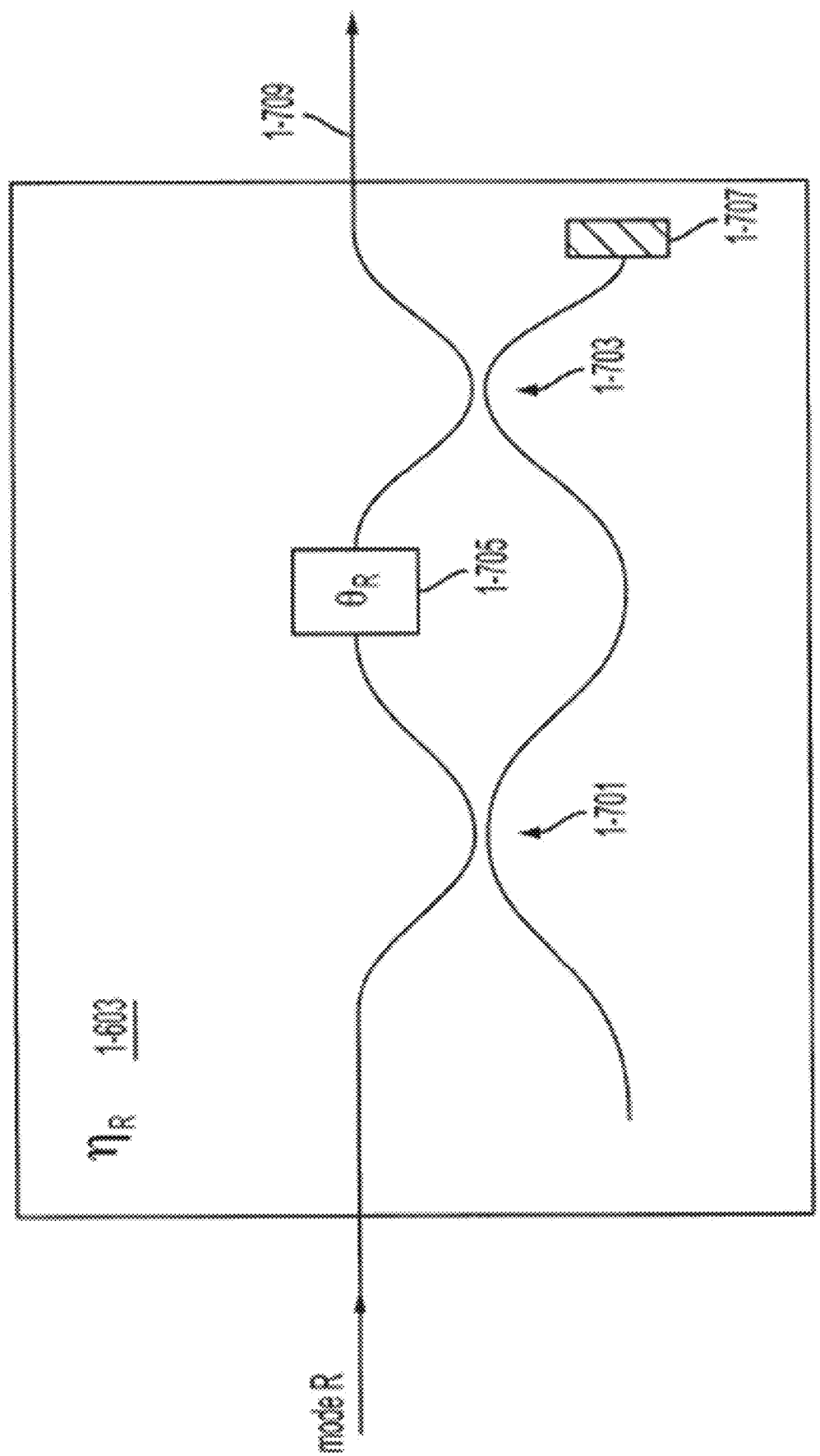
Figures 1, 2, 3, 4, 5, 6, 7, 8:
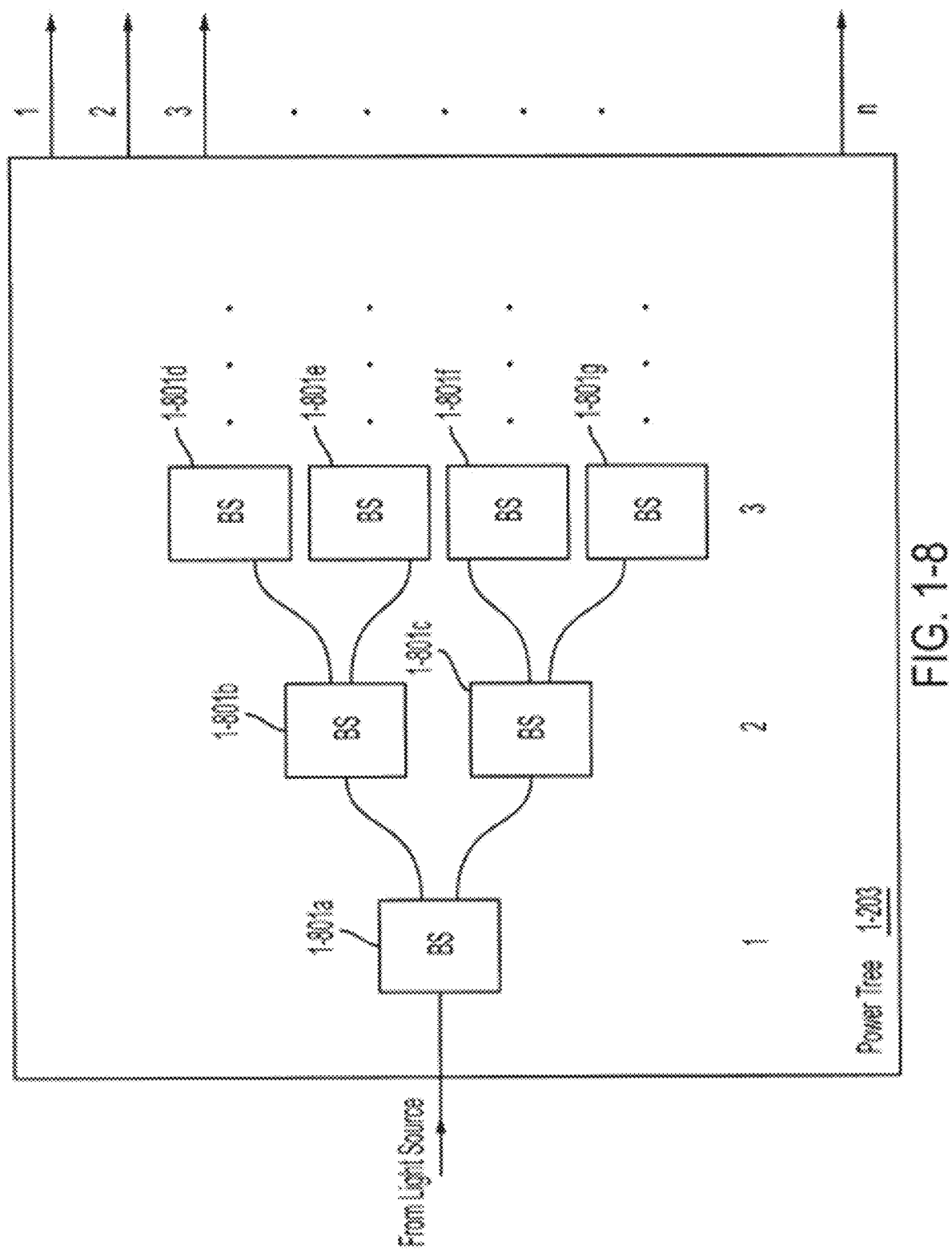
Figures 1, 2, 3, 4, 5, 6, 7, 8, 9:
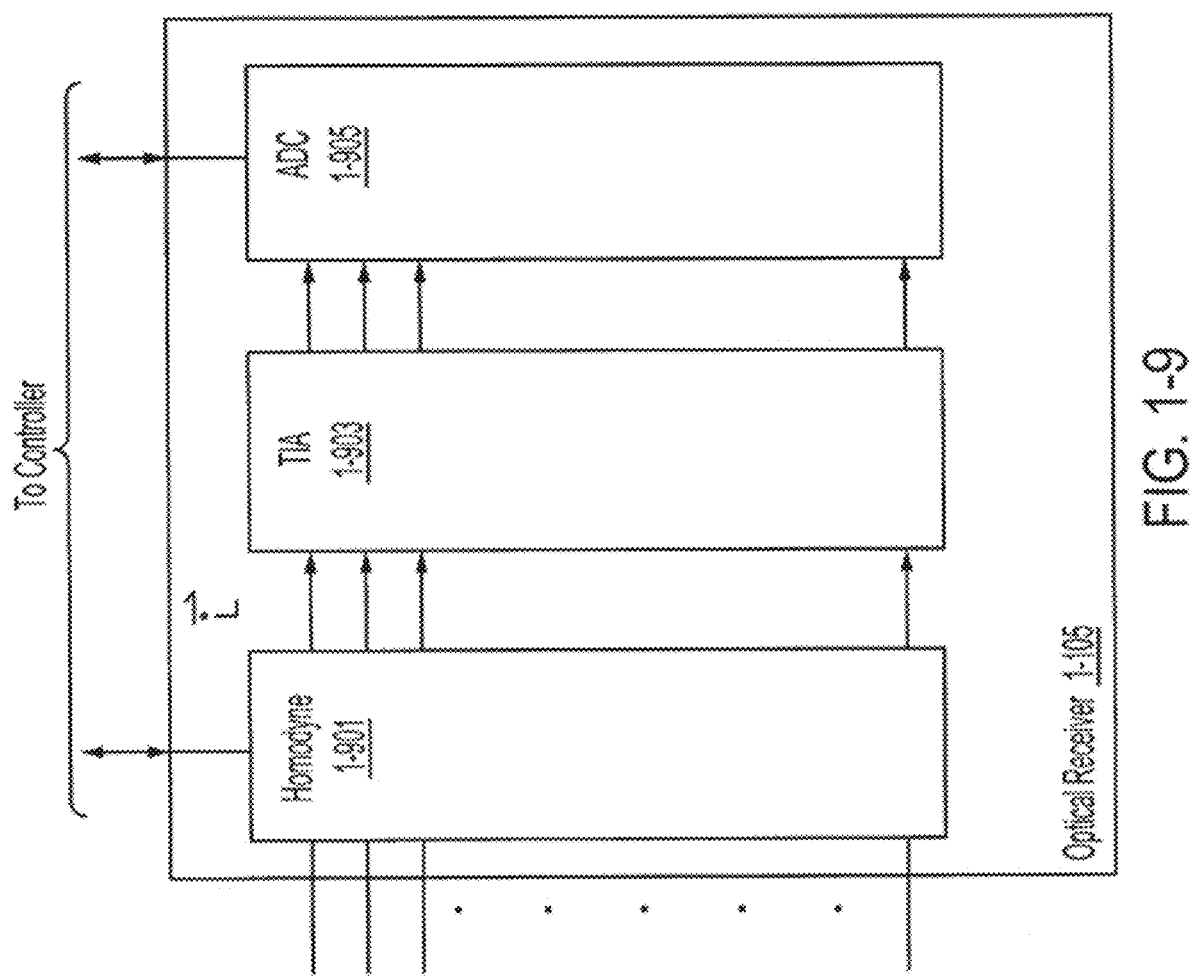
Figures 1, 2, 3, 4, 5, 6, 7, 8, 9, 10:
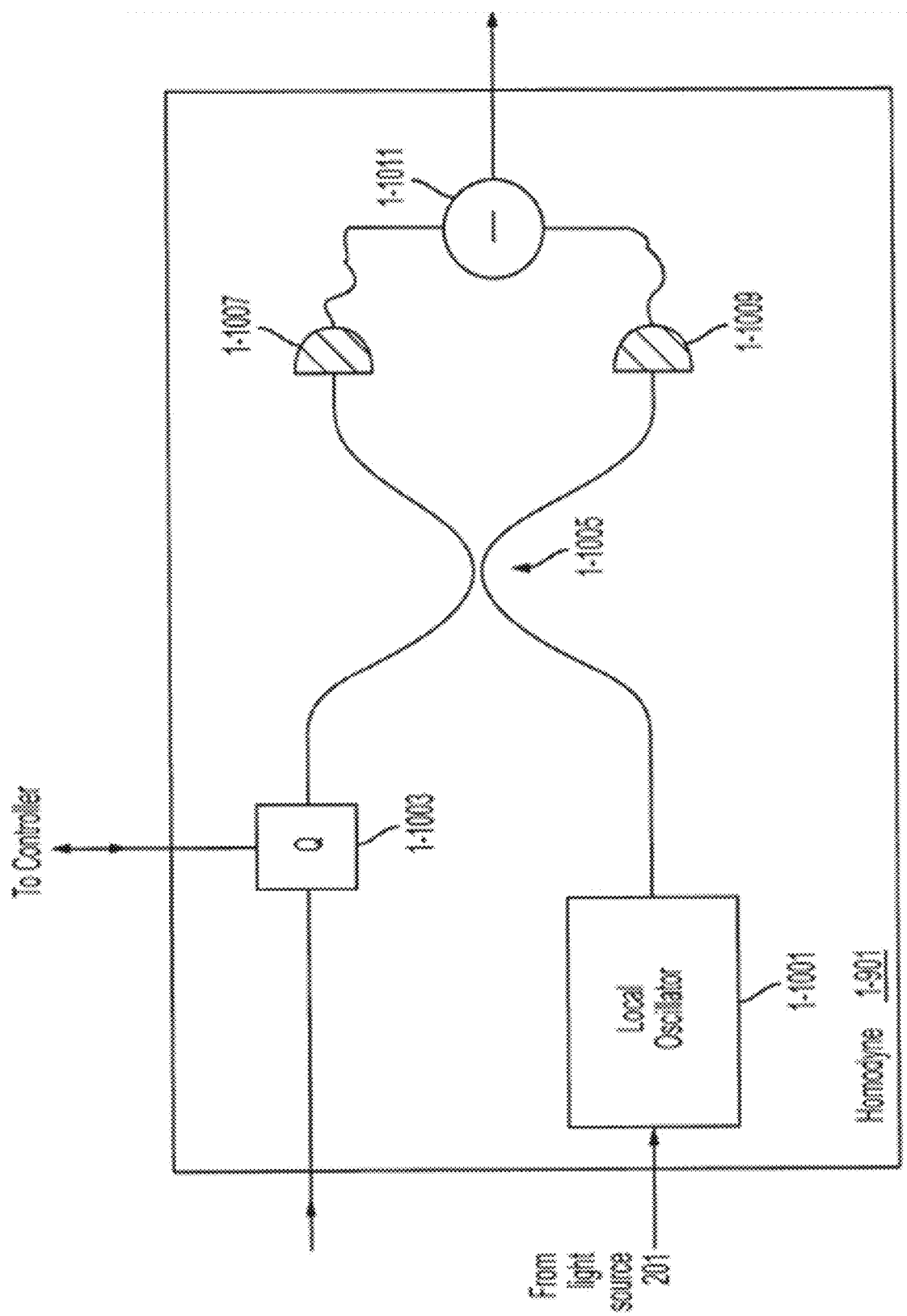
Figures 1, 2, 3, 4, 5, 6, 7, 8, 9, 10, 11:
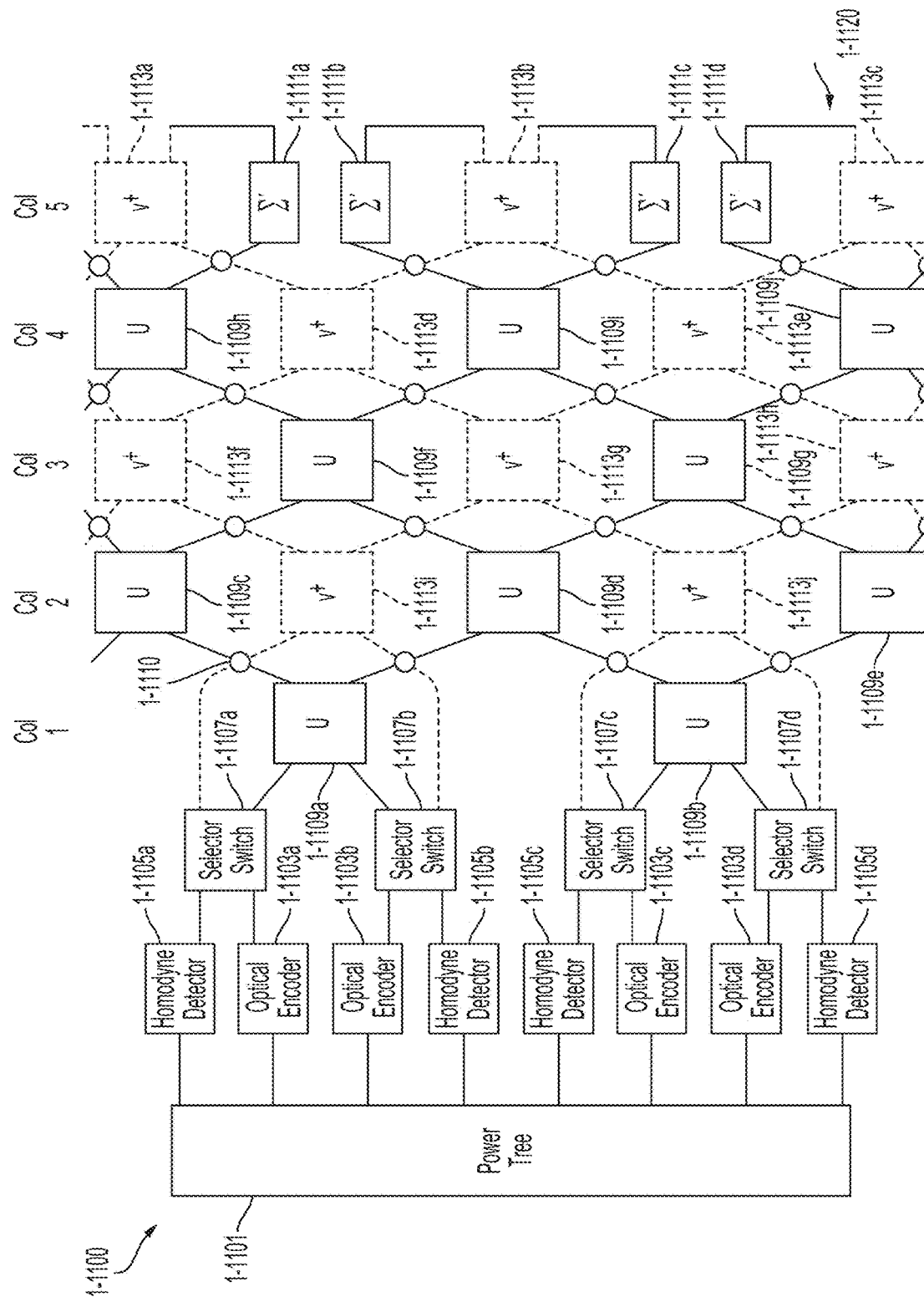
Figures 1, 2, 3, 4, 5, 6, 7, 8, 9, 10, 11, 12, 12A:
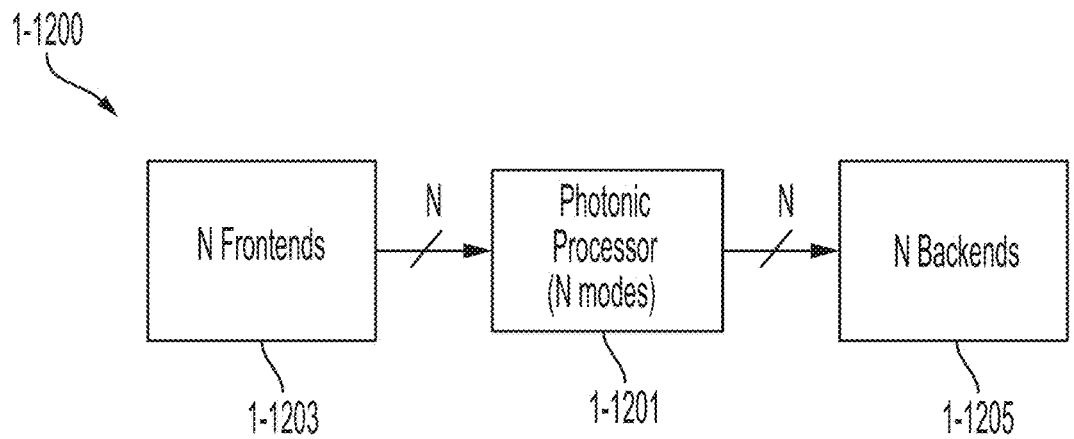
Figures 1, 2, 3, 4, 5, 6, 7, 8, 9, 10, 11, 12, 12B:
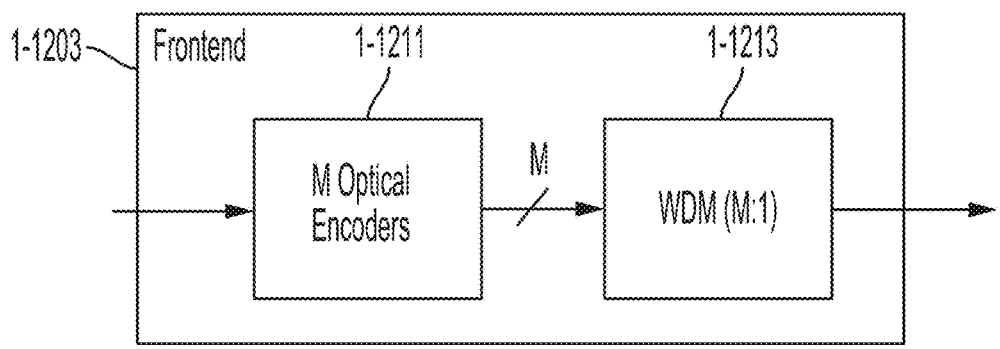
Figures 1, 2, 3, 4, 5, 6, 7, 8, 9, 10, 11, 12, 12C:
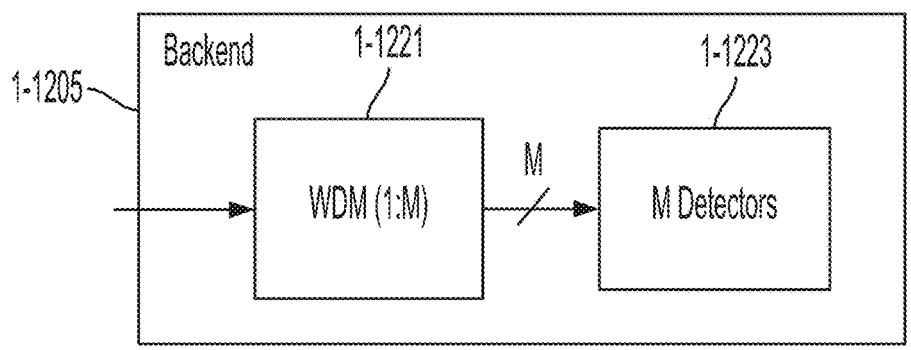
Figures 1, 2, 3, 4, 5, 6, 7, 8, 9, 10, 11, 12, 13:
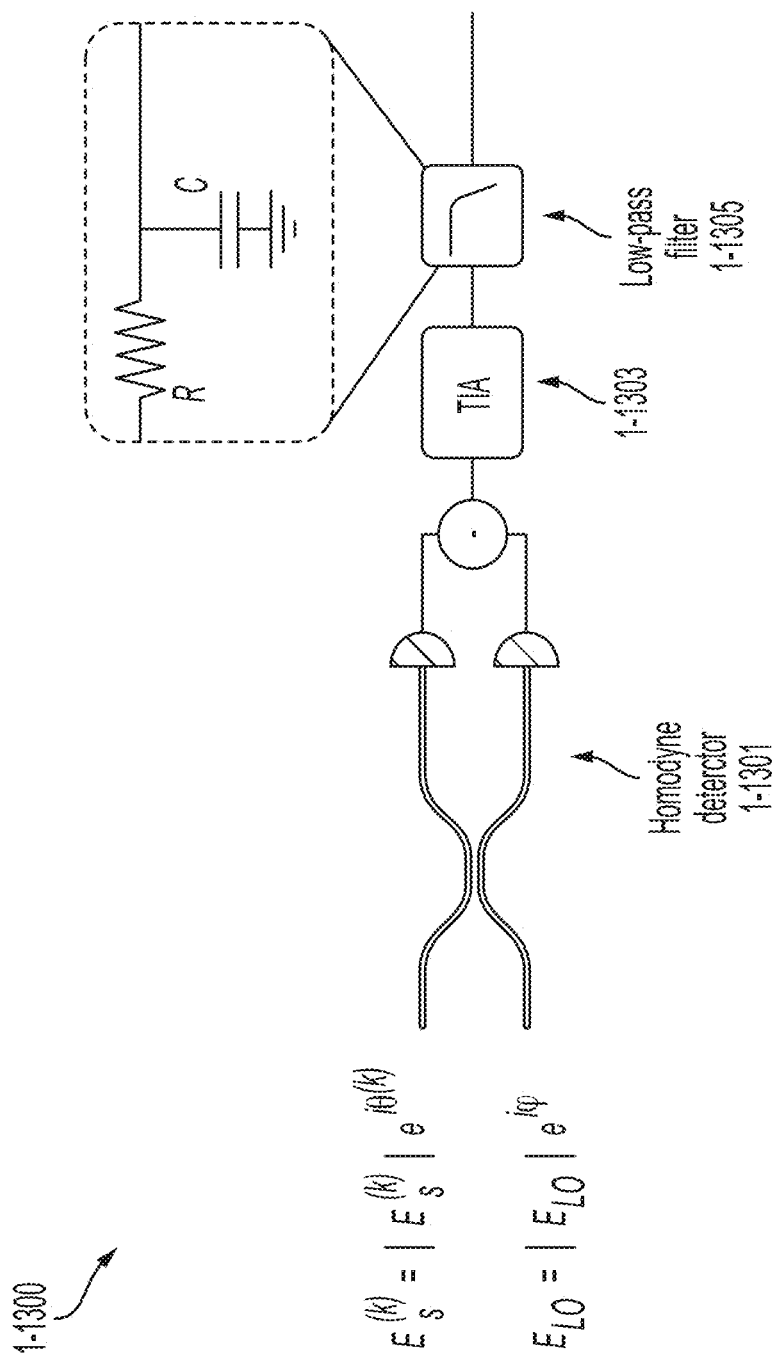
Figures 1, 2, 3, 4, 5, 6, 7, 8, 9, 10, 11, 12, 13, 14:
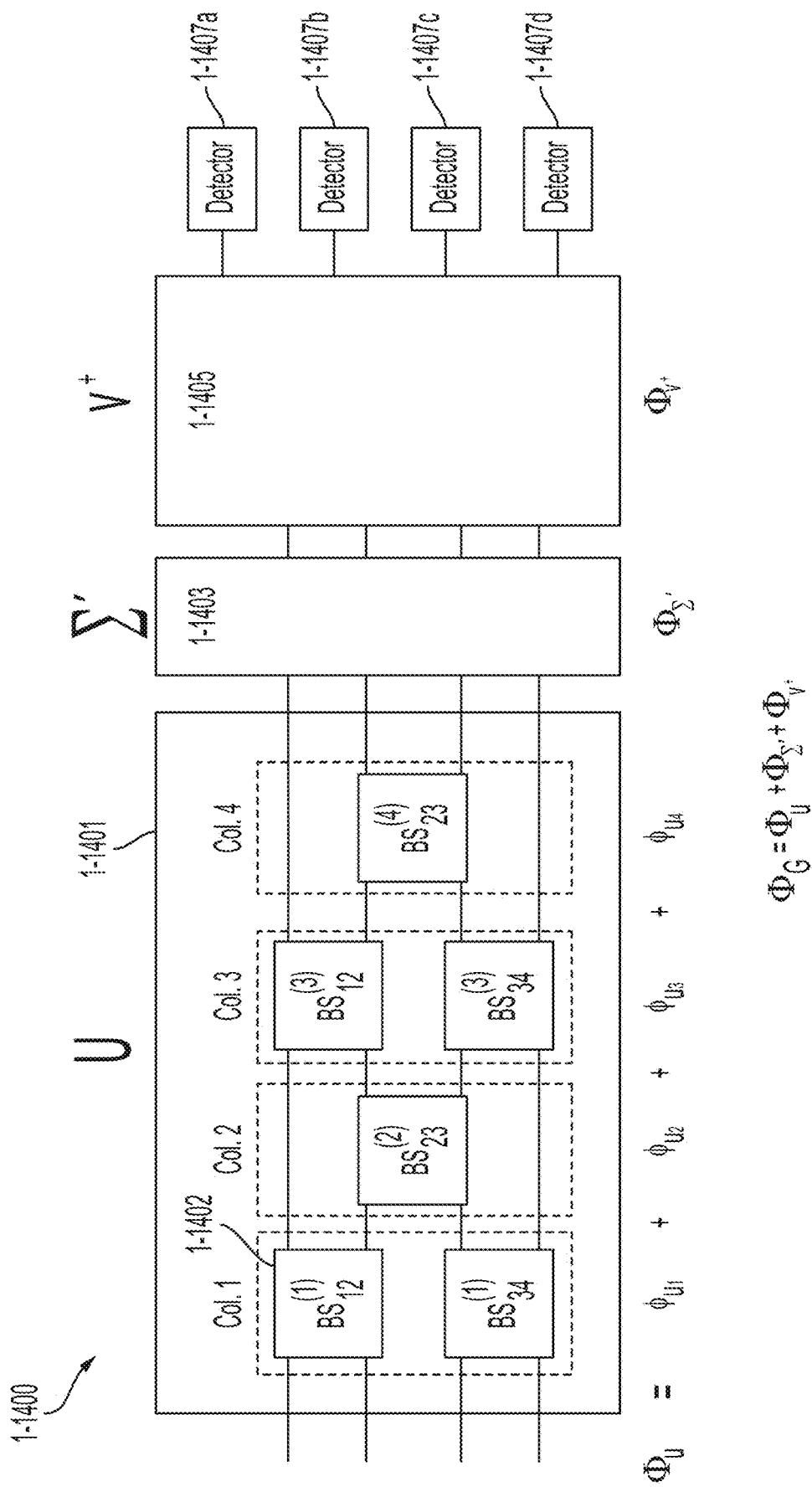
Figures 1, 2, 3, 4, 5, 6, 7, 8, 9, 10, 11, 12, 13, 14, 15:
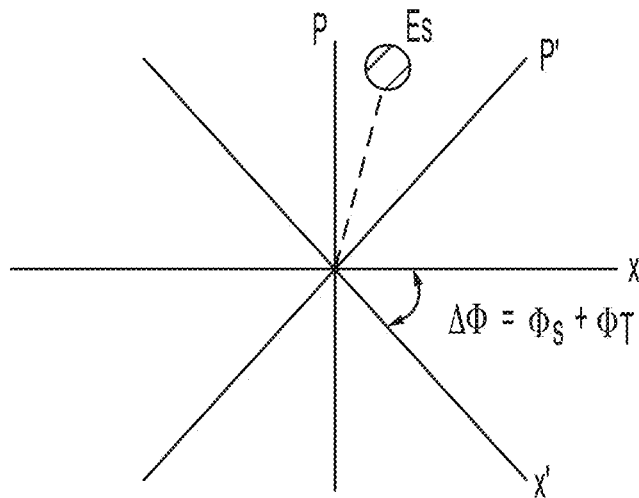
Figures 1, 2, 3, 4, 5, 6, 7, 8, 9, 10, 11, 12, 13, 14, 15, 16:
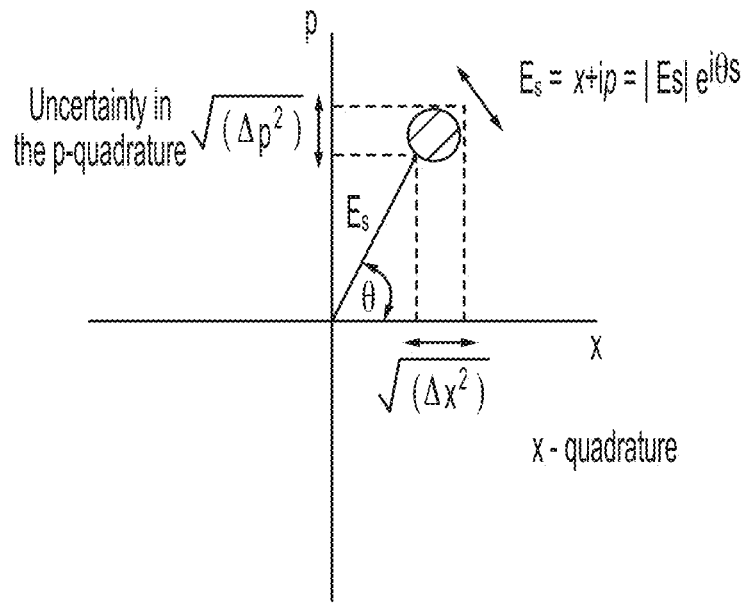
Figures 1, 2, 3, 4, 5, 6, 7, 8, 9, 10, 11, 12, 13, 14, 15, 16, 17, 18, 19:
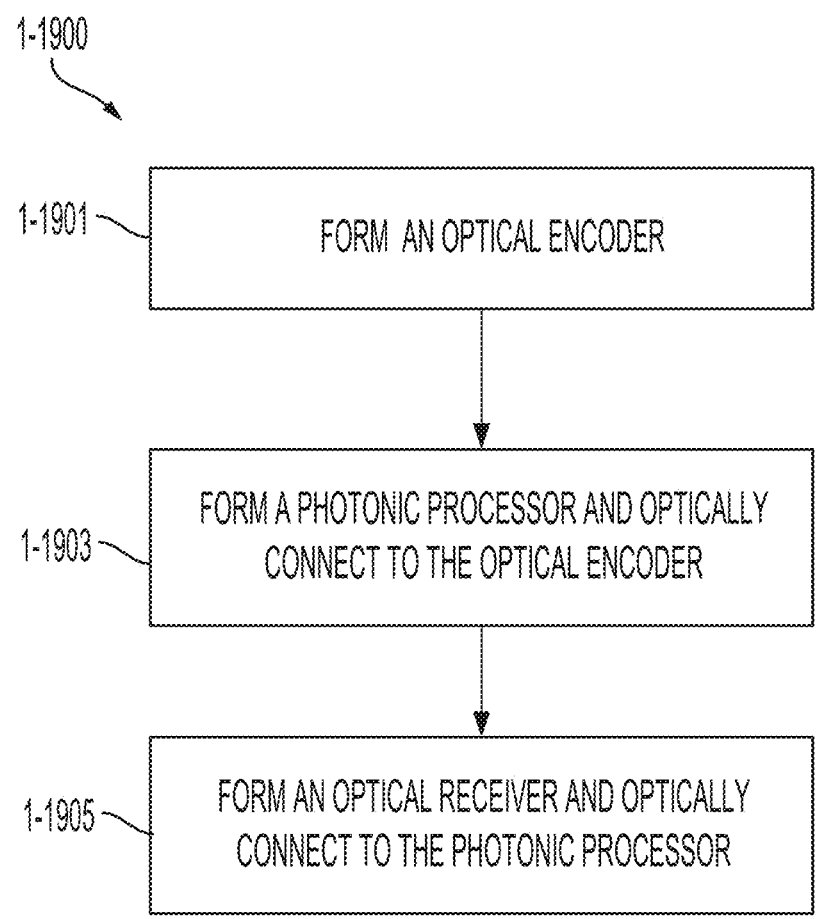
Figures 1, 2, 3, 4, 5, 6, 7, 8, 9, 10, 11, 12, 13, 14, 15, 16, 17, 18, 19, 20:
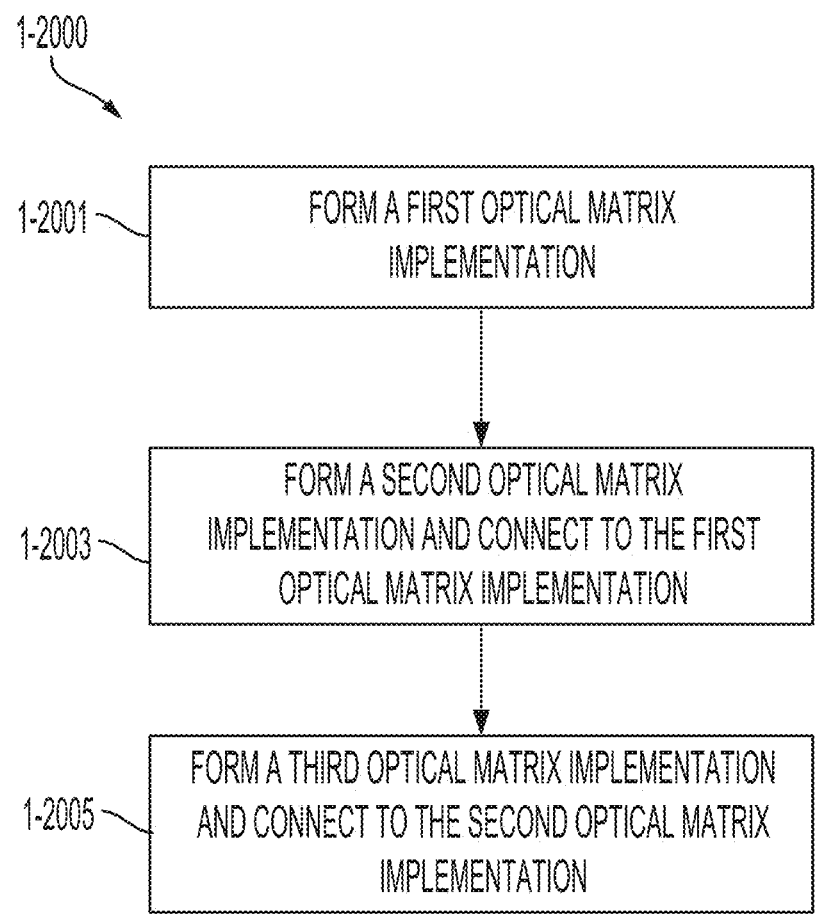
Figures 1, 2, 3, 4, 5, 6, 7, 8, 9, 10, 11, 12, 13, 14, 15, 16, 17, 18, 19, 20, 21:
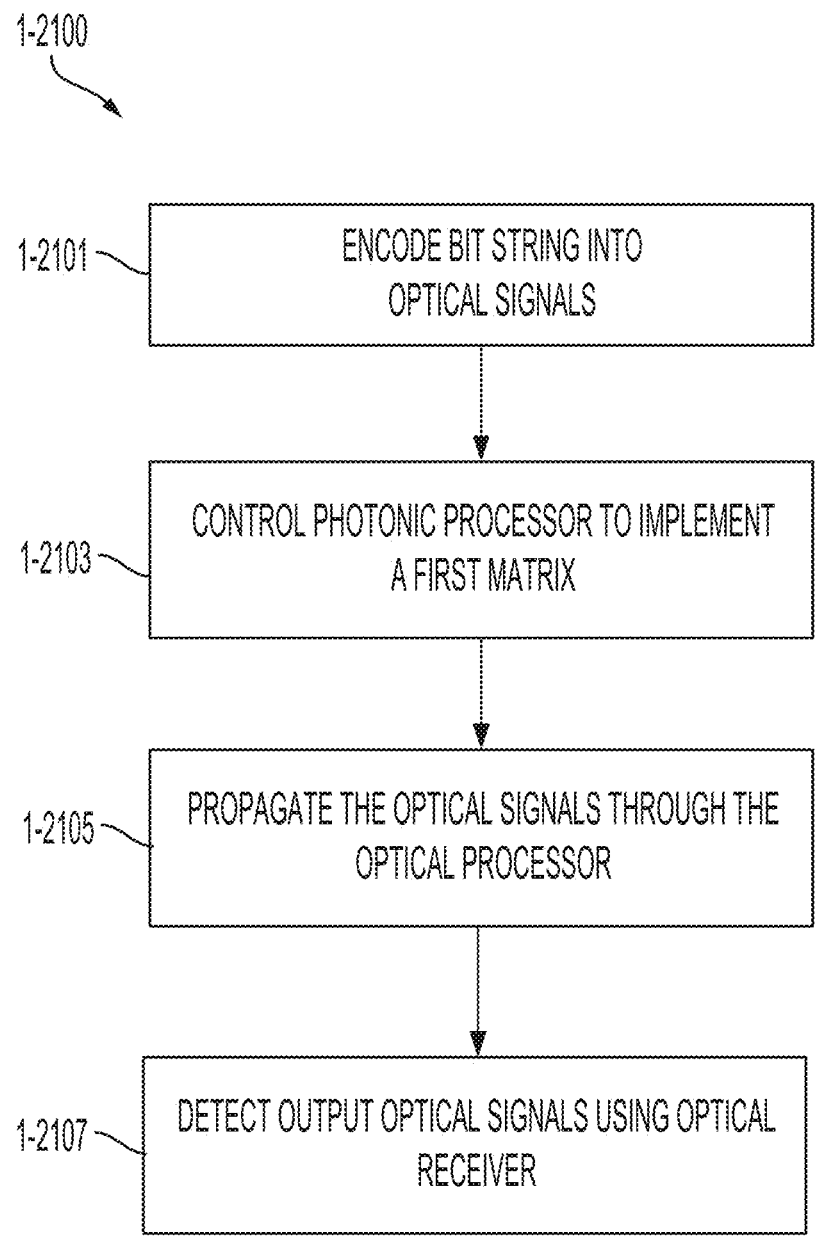
Figures 1, 2:
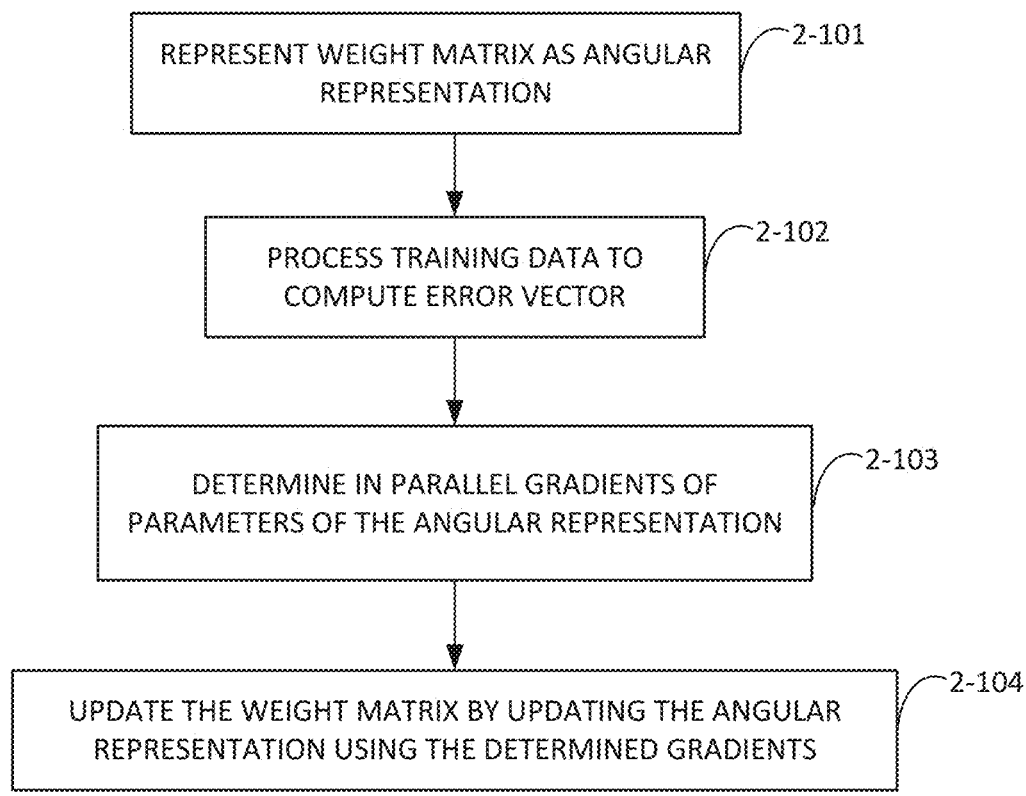
Figure 2:
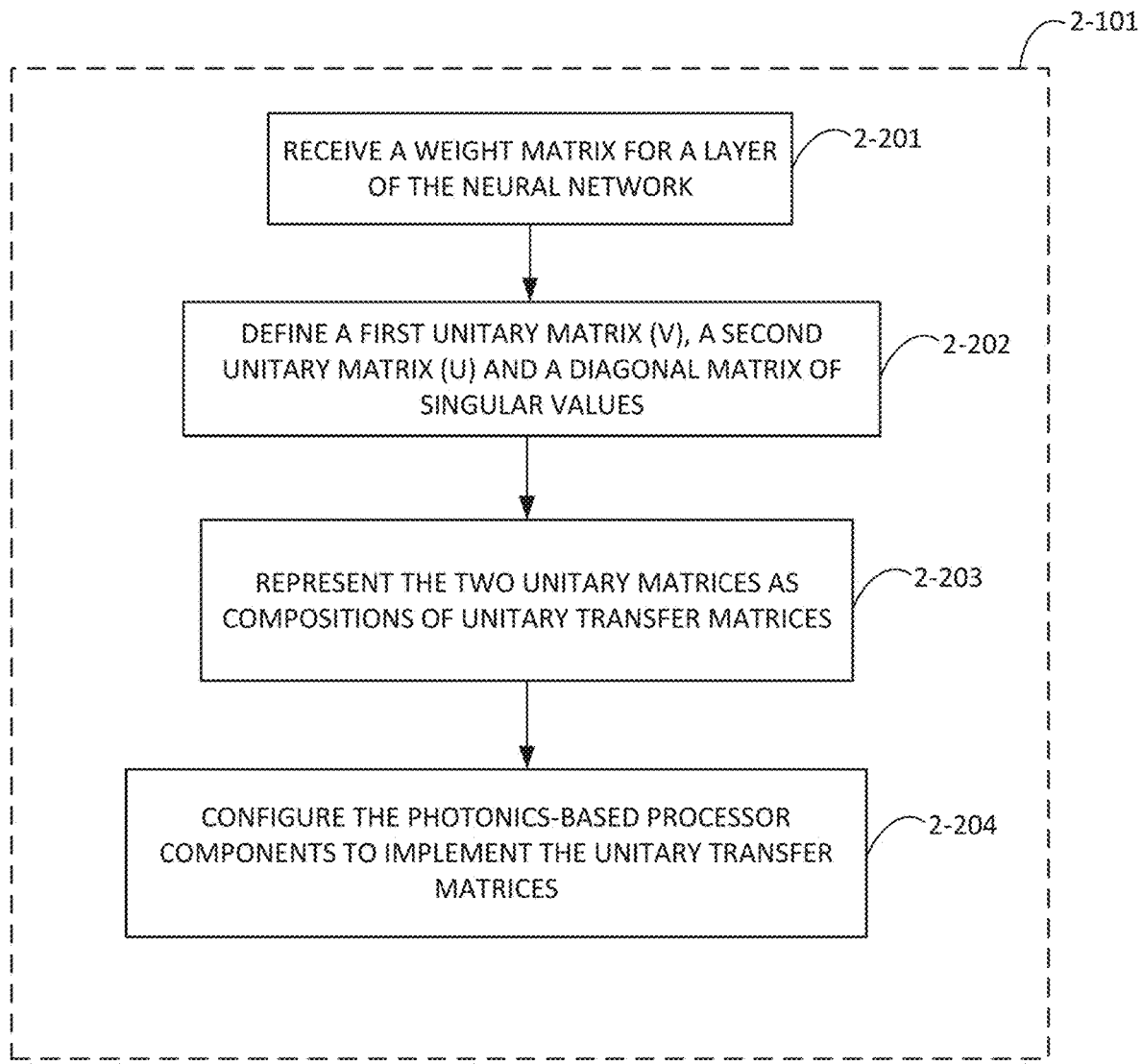
Figures 2, 3:
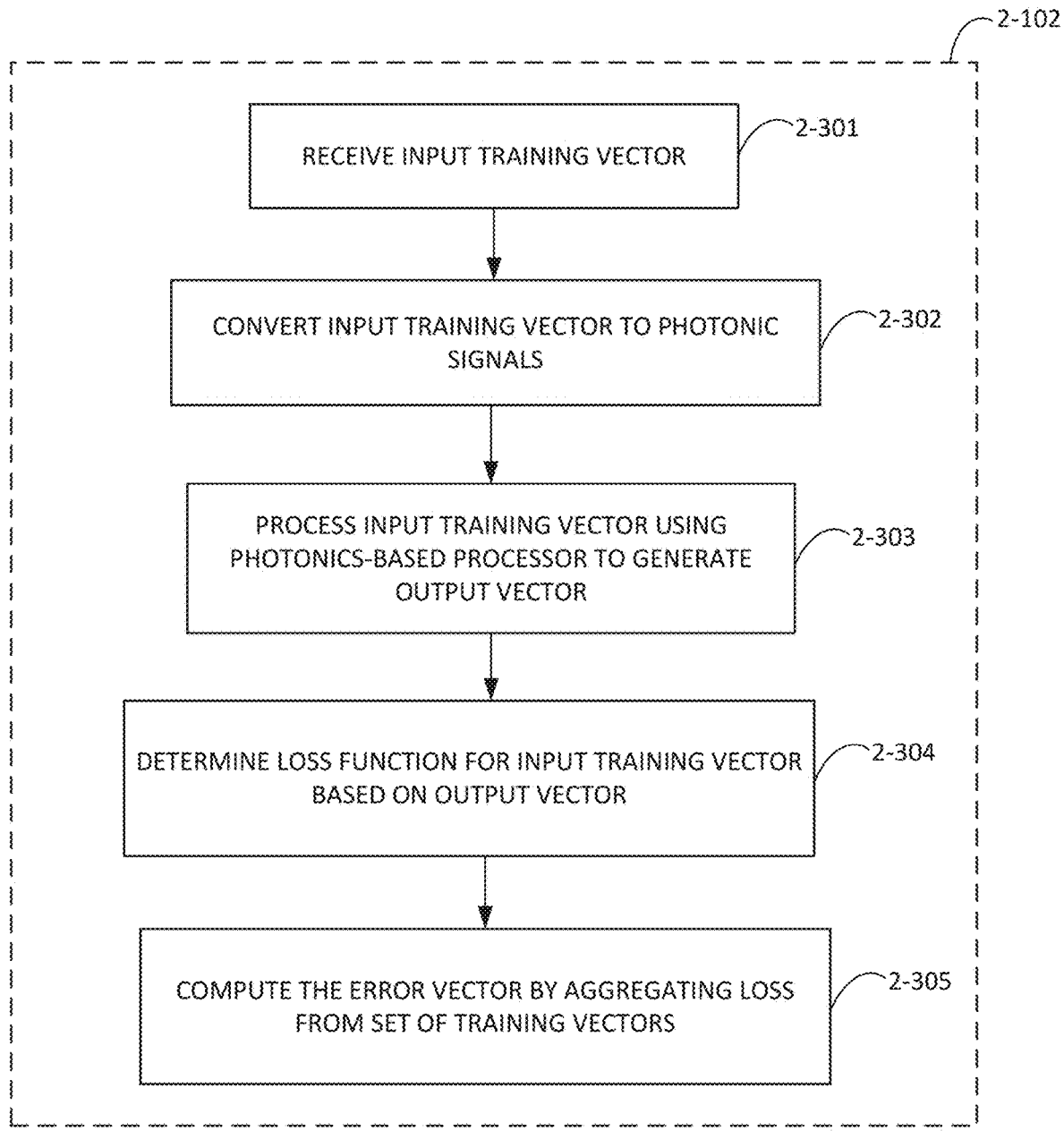
Figures 2, 3, 4:
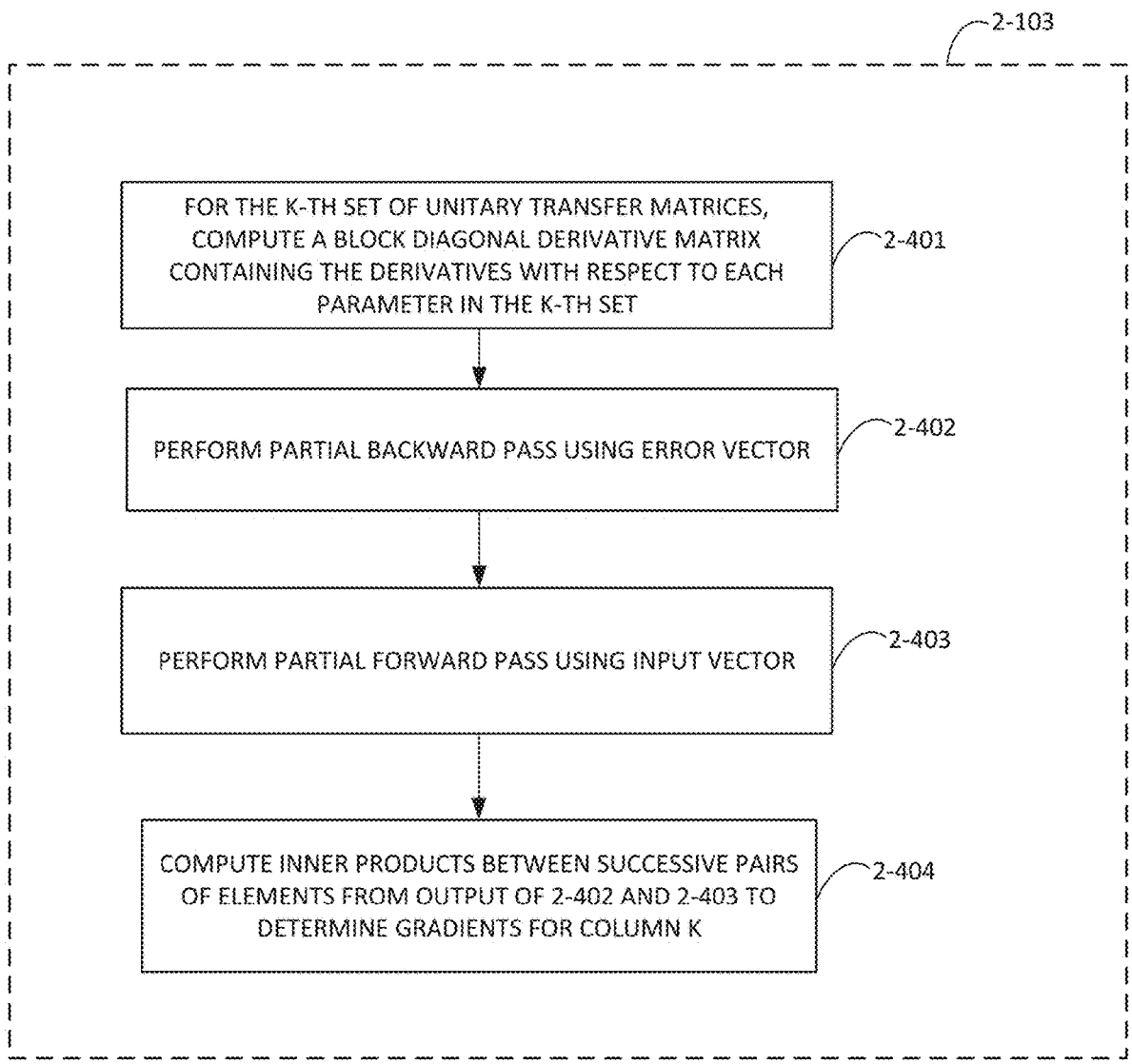
Figures 2, 3, 4, 5:
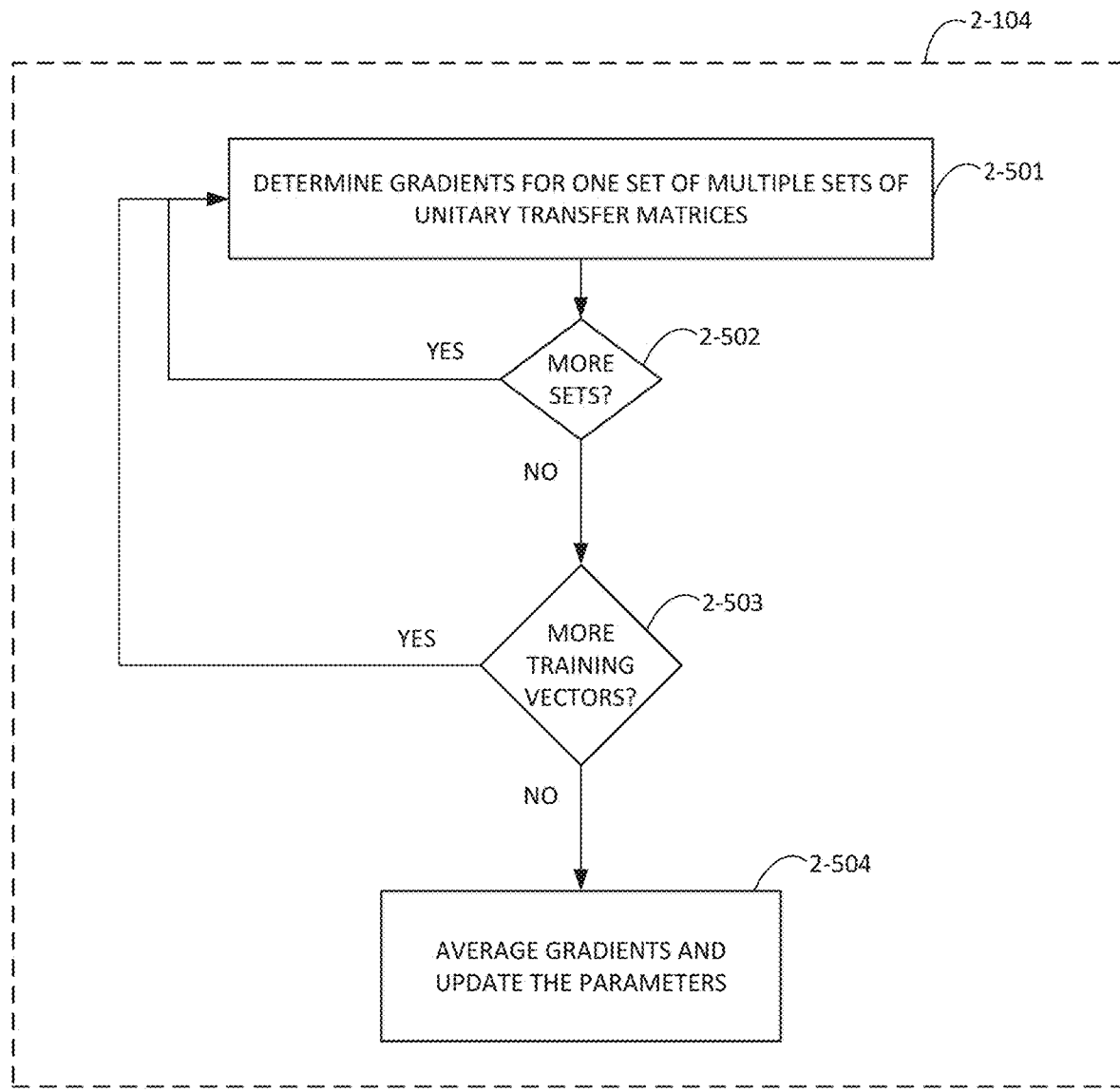

Returning to the process 2-100 in FIG. 2-1, act 2-103 is directed to computing in parallel gradients for the parameters of the angular representation (e.g., the values of the weights that have been implemented using the components of the photonics processor as Givens rotations). The gradients may be calculated based on the computed error vectors, input data vectors (e.g., from a batch of training data), and the weight matrix implemented using the photonics processor. FIG. 2-4 show a flowchart of a process for performing act 2-103 in accordance with some embodiments. At act 2-401, for the k-th set of Givens rotations, $G^{(k)}$ in the decomposition (e.g., a column of the decomposed matrix— referred to herein as "derivative column k"), a block diagonal derivative matrix containing the derivatives with respect to each angle in the k-th set is computed. At act 2-402, a product of the error vector determined in act 2-102 with all of the unitary transfer matrices between the derivative column k and the output is computed (hereby referred to as a "partial backward pass"). At act 2-403, a product of the input data vector with all unitary transfer matrices starting from the input up to and including the derivative column k is computed (hereby referred to as a "partial forward pass") At act 2-404, the inner products between successive pairs of elements output from acts 2-402 and 2-403 are computed to determine the gradients for the derivative column k. The inner products between successive pairs of elements may be computed as $$\frac{\partial W^{(l)}}{\partial \theta_{ij}^{(k)}} = x_i \delta_i + x_j \delta_j,$$

where superscript (k) represents the k-th column of photonic elements and i, j represent the i-th and j-th photonic mode that are being coupled by the unitary transfer matrix with parameter $\theta_{ij}^{(k)}$, x is the output of the partial forward pass and $\delta$ is the output of the partial backward pass. In some embodiments, an offset is applied before the successive pairing of the outputs (e.g., output pairs could be (1, 2), (3, 4), etc. rather than (0, 1), (2, 3)). The determined gradients may then be used as appropriate for a particular chosen optimization algorithm (e.g., SOD) that is being used for training.

Example pseudocode for implementing the backpropagation technique on a photonic processor having the left-to-right topology shown in FIGS. 1-4 in accordance with some embodiments is provided below:

Initialize two lists for intermediate propagation results, x', $\delta$'.
For each column of MZI, staring with the last column and going to the first column:
  Rotate the angles in the column to correspond to a derivative matrix
  Propagate the input data vector through the photonics processor
  Store the result in x'
  Make the current column transparent
Column-by-column, progressively build up the transpose matrix. For each new column:
  Propagate the error vector through the photonics processor
  Store the result in $\delta$'
For each x'[i], $\delta$'[i]
  Compute the inner products between successive pairs, with the result being the gradients for the angles in the ith column of MZI.

According to some embodiments, rather than adjusting the weights of a weight matrix via gradient descent as is done in some conventional backpropagation techniques, the parameters of angular representation (e.g., the singular values of the matrix $\Sigma$ and the Givens rotation angles of the decomposed orthogonal matrices U and V) are adjusted. To further demonstrate how backpropagation in the reparameterized space works according to some embodiments, what follows is a comparison of backpropagation within a single layer of a neural network using conventional techniques versus the method according to some embodiments of the present disclosure.

A loss function, E, measures the performance of the model on a particular task. In some conventional stochastic gradient descent algorithms, the weight matrix is adjusted iteratively such that the weight matrix at time t+1 is defined as a function of the weight matrix at time t and a derivative of the loss function with respect to the weights of the weight matrix is as follows:

$$w_{ab}(T+1) = w_{ab}(t) - \eta \frac{\partial E}{\partial w_{ab}(t)},$$

where $\eta$ is the learning rate and (a,b) represent the a-th row and b-th column entry of the weight matrix W, respectively. When this iterative process is recast using the decomposed weight matrix, the weights $w_{ab}$ are functions of the singular values $\sigma_i$ of the matrix $\Sigma$ and the rotation angles $\theta_{ij}$ of the orthogonal matrices U and V. Thus the iterative adjustments of the backpropagation algorithm become:

$$\theta_{ij}^{(k)}(t+1) = \theta_{ij}^{(k)}(t) - \eta \frac{\partial E}{\partial \theta_{ij}^{(k)}(t)}$$

and $$\sigma_i(t+1) = \sigma_i(t) - \eta \frac{\partial E}{\partial \sigma_i(t)}$$

To perform iterative adjustments to the singular values and rotation angles, the derivatives of the loss function must be obtained. Before describing how this can be achieved in a system such as the photonic processing system 100, a description is first provided for backpropagation based on iteratively adjusting the weights of the weight matrix. In this situation, the output result measured by the system for a single layer of the neural network is expressed as an output vector $y_i = f((Wx)_i + b_i)$, where W is the weight matrix, x is the data vector input into the layer, b is a vector of biases, and f is a nonlinear function. The chain rule of calculus is applied to compute the gradient of the loss function with respect to any of the parameters within the weight matrix (where for convenience of representation, the definition $z_i = (Wx)_i + b_i$ is used):

$$\frac{\partial E}{\partial w_{ab}} = \sum_{ij} \frac{\partial E}{\partial y_i} \frac{\partial y_i}{\partial z_j} \frac{\partial z_j}{\partial w_{ab}}$$

Computing the derivative of z with respect to $w_{ab}$ results in:

$$z_i = (Wx)_i + b_i = b_i + \sum_j W_{ij} x_j$$

$$\frac{\partial z_j}{\partial w_{ab}} = \delta_{ja} x_b$$

Using this fact, the sum representing the gradient of the loss function can then be written as:

$$\frac{\partial E}{\partial w_{ab}} = \sum_i \frac{\partial E}{\partial y_i} \frac{\partial y_i}{\partial z_a} x_b$$

The first sum is defined as the error vector e and x is the input vector, resulting in the following expression:

$$\frac{\partial E}{\partial w_{ab}} = e_a x_b$$

Using the above equations from conventional backpropagation techniques, the equations can be extended to the case of weight matrices decomposed into a singular value matrix and unitary transfer matrices. Using the fact that the weight matrix is a function of rotation angles, the chain rule can be used to write:

$$\frac{\partial E}{\partial \theta_{ij}^{(k)}} = \sum_{ab} \frac{\partial E}{\partial w_{ab}} \frac{\partial w_{ab}}{\partial \theta_{ij}^{(k)}}$$

$$= \sum_{ab} e_a x_b \frac{\partial w_{ab}}{\partial \theta_{ij}^{(k)}}$$

$$= \vec{e}^T \frac{\partial W}{\partial \theta_{ij}^{(k)}} \vec{x}$$

Thus, the backpropagation in phase space involves the same components as in conventional backpropagation (the error vector and the input data), with the addition of a term that is the derivative of the weight matrix with respect to the rotation angles of the unitary transfer matrices.

To determine the derivative of the weight matrix with respect to the rotation angles of the unitary transfer matrices, it is noted that the derivative of a single Givens rotation matrix has the following form:

$$\frac{\partial G_{ij}^{(k)}}{\partial \theta_{ij}^{(k)}} = \frac{\partial}{\partial \theta_{ij}^{(k)}} \begin{pmatrix} 1 & 0 & \cdots & & & \\ 0 & \ddots & & & & \\ \vdots & & \cos\theta_{ij}^{(k)} & -\sin\theta_{ij}^{(k)} & & \\ & & \sin\theta_{ij}^{(k)} & \cos\theta_{ij}^{(k)} & \vdots & \\ & & & & \ddots & 0 \\ & & & \cdots & 0 & 1 \end{pmatrix}$$

$$= \begin{pmatrix} 0 & 0 & \cdots & & & \\ 0 & \ddots & & & & \\ \vdots & & -\sin\theta_{ij}^{(k)} & -\cos\theta_{ij}^{(k)} & & \\ & & \cos\theta_{ij}^{(k)} & -\sin\theta_{ij}^{(k)} & \vdots & \\ & & & & \ddots & 0 \\ & & & \cdots & 0 & 0 \end{pmatrix}$$

As can be seen, the derivative for any entry of the Givens rotation matrix that is not in the i-th row and j-th column is zero. Thus, all derivatives for angles inside $G^{(k)}$ may be grouped into a single matrix. To compute the derivative with respect to all floor (n/2) angles inside a column of unitary transfer matrices may, in some embodiments, be accomplished using a two-step process, as described above. First, the error vector is propagated through the decomposed matrix from the right (output) up to the current set of rotations being differentiated (partial backward pass). Second, the input vector is propagated from the left (input) up to the current set of rotations (partial forward pass), and then the derivative matrix is applied.

In some embodiments, the derivation for the singular values is achieved using a similar process. The derivative with respect to a singular value $\sigma_i$ results in the element $\Sigma'_{ii}$ to 1 and all other $\Sigma_{jj}$ to 0. Therefore, all of the derivatives for the singular values may be calculated together. In some embodiments, this may be done by propagating the error vector from the left (partial forward pass) and propagating the input vector from the right (partial backward pass), then computing the Hadamard product from the outputs of the forward pass and the backward pass.

In the implementation of act 2-103 described in FIG. 2-4, all of the angles in a column k are rotated by $\pi/2$ in order to compute the gradient term for that column. In some embodiments, this rotation is not performed. Consider the matrix for a single MZI:

$$\begin{pmatrix} \cos\theta & -\sin\theta \\ \sin\theta & \cos\theta \end{pmatrix}$$

Taking the derivative with respect to $\theta$ yields $$\begin{pmatrix} -\sin\theta & -\cos\theta \\ \cos\theta & -\sin\theta \end{pmatrix}$$

While this matrix corresponds to adding $\pi/2$ to $\theta$, it also corresponds to swapping the columns of the original matrix and negating one of them. In mathematical notation, this means $$\begin{pmatrix} -\sin\theta & -\cos\theta \\ \cos\theta & -\sin\theta \end{pmatrix} = \begin{pmatrix} 0 & 1 \\ -1 & 0 \end{pmatrix} \begin{pmatrix} \cos\theta & -\sin\theta \\ \sin\theta & \cos\theta \end{pmatrix}$$

Rather than rotating the angle of each MZI in a column by $\pi/2$ and then computing the inner products between successive pairs of elements output from acts 2-402 and 2-403 as described above (e.g., $x_1\delta_1+x_2\delta_2$), to determine the gradients for a column of the decomposed unitary matrix, in some embodiments, the angles are not rotated by $\pi/2$ and instead the relation $x_1\delta_2-x_2\delta_1$ is calculated to obtain the same gradients. In some embodiments, where the size of the matrix W (n×m) matches the size of the photonics processor with matrix U of size n×n and matrix V of size m×m, acts 2-401-2-404 allow the controller to obtain floor(n/2) gradients for a unitary/orthogonal matrix of size n×n. Consequently, on hardware such the photonic processing system 100 described above, where each matrix multiplication can be computed in O(1) operations, the overall backpropagation procedure may be completed in O(n+m) operations when the photonic processor is of sufficient size to represent the full matrix. When the photonics processor is not of sufficient size to represent the full matrix, the matrix may be partitioned into tiles, as described above. Consider a photonic processor of size N. If the task is to multiply a matrix of size I×J by a vector of size J, a single matrix-vector product will have complexity O (IJ/N$^2$) (assuming that both I and J are divisible by N), because each dimension of the matrix must be partitioned into matrices of size N, loaded into the processor, and used to compute a partial result. For a batch of K vectors (e.g., a second matrix of size J×K), the complexity is O(IJK/N$^2$) for the matrix-vector product.

An embodiment of a photonic processor, as described above, with n optical modes naturally computes a matrix-vector product between a matrix of size [n×n] and an n-element vector. This is equivalently expressed as a matrix-matrix product between matrices of sizes [n×n] and [n×1]. Furthermore, a sequence of K matrix-vector product operations with K different input vectors and a single, repeated input matrix can be expressed as the computation of a matrix-matrix product between matrices of size [n×n] and [n×K]. But the applications and algorithms described herein often involve the computation of general matrix-matrix multiplication (GEMM) between matrices of arbitrary size: i.e., the computation $$c_{ik} = \sum_{j=1}^{J} a_{ij} \cdot b_{jk} \ \forall \ i \in [1, I], k \in [1, K]$$

Where $a_{ij}$ is the element in the i$^{th}$ row and j$^{th}$ column of an [I×J] matrix A, $b_{jk}$ is the j$^{th}$ row and k$^{th}$ column of a [J×K] matrix B and $c_{ik}$ is the element in the i$^{th}$ row and k$^{th}$ column of the [I×K] matrix C=AB. Due to the recursive nature of this computation, this can be equivalently expressed as:

$$C_i = \sum_{j=1}^{[J/n]} A_{ij}B_j \ \forall \ i \in [1, I], k \in [1, K]$$

Where A has been first padded to a $$\left[n \cdot \left\lceil \frac{I}{n} \right\rceil \times \left(n \cdot \left\lceil \frac{J}{n} \right\rceil\right)\right]$$

matrix and then partitioned into a [[I/n]×[J/n]] grid of submatrices (each of size [n×n]) and $A_{ij}$ is the [n×n] submatrix in the i$^{th}$ row and j$^{th}$ column of this grid, B has been first padded to a [(n~[J/n]×K)] matrix and then partitioned into a [[J/n]×1] grid of submatrices (each of size [n×K]) and $B_j$ is the [n×K] submatrix in the j$^{th}$ row of this grid, and C has been first padded to a [(n·[J/n])×K] matrix and then partitioned into a [[I/n]×1] grid of submatrices (each of size [n×K]) and $C_i$ is the [n×K] submatrix in the i$^{th}$ row of this grid.

Using this process, a photonic processor can compute any GEMM by loading ([I/n]·[J/n]) different matrices into the photonic array and, for each loaded matrix, propagating k different vectors through the photonic array. This yields [I/n]·[J/n]×k output vectors (each comprised of n elements), a subset of which may be added together to yield the desired [I×K] output matrix, as defined by the equation above.

In the implementation of act 2-103 described in FIG. 2-4, a left-to-right topology of the photonics processor for implementing the matrices was assumed, where the vector was input on the left of the array of optical components and the output vector was provided on the right of the array of optical components. This topology requires the transpose of the angular representation matrix to be calculated when propagating the error vector through the photonics processor. In some embodiments, the photonic processor is implemented using a folded-over topology that arranges both the inputs and outputs on one side of the array (e.g., the left side) of optical components. Such an architecture allows the use of a switch to decide which direction the light should propagate—either from input to output or output to input. With the choice of direction configurable on the fly, the propagation of the error vector can be accomplished by first switching the direction to use output as input and then propagating the error vector through the array, which eliminates the need to negate phases (e.g., by rotating the angle of each photonic element in a column k by $\pi/2$) and transpose the columns when the gradients for column k are being determined, as described above.

Returning to the process 2-100 in FIG. 2-1, act 2-104 is directed to updating the weight matrix by updating the parameters of the angular representation based on the determined gradients. The process shown in FIG. 2-4, just described, is for computing the gradients of the angular parameters for a single set (e.g., column k) of gradients in the decomposed unitary matrix based on a single input data exemplar. In order to update the weight matrix, the gradients for each of the sets (e.g., columns) need to be computed for each input data vector in a batch. FIG. 2-5 shows a flowchart of a process for computing all of the gradients needed to update the weight matrix in accordance with some embodiments. At act 2-501, the gradients for one set of multiple sets of unitary transfer matrices (e.g., Givens rotations) is determined (e.g., using the process shown in FIG. 2-4). At act 2-502, it is then determined whether there are additional sets of unitary transfer matrices (e.g., columns) for which gradients need to be calculated for the current input data vector. If it is determined that there are additional gradients to be calculated, the process returns to act 2-501, where a new set (e.g., column) is selected and gradients are calculated for the newly selected set. As noted below, in some computing architectures, all columns of the array may be read out simultaneously, such that the determination at act 2-502 is not needed. The process continues until it is determined at act 2-502 that gradients have been determined for all of the sets of unitary transfer matrices (e.g., columns) in the decomposed unitary matrix. The process then proceeds to act 2-503, where it is determined whether there are more input data vectors to process in the batch of training data being processed. If it is determined that there are additional input data vectors, the process returns to act 2-501, where a new input data vector from the batch is selected and gradients are calculated based on the newly selected input data vector. The process repeats until it is determined at act 2-503 that all input data vectors in the batch of training data have been processed. At act 2-504, the gradients determined in acts 2-501-2-503 are averaged and the parameters of the angular representation (e.g., the angles of the Givens rotation matrices of the decomposition of the weight matrix) are updated based on the an update rule that makes use of the averaged gradients. As a non-limiting example, an update rule may include scaling the averaged gradients by a learning rate or include "momentum" or other corrections for the history of parameter gradients.

As discussed briefly above, although the above example was applied to a real weight matrix in a single layer neural network, the results may be generalized to networks with multiple layers and complex weight matrices. In some embodiments, the neural network consists of multiple layers (e.g., ≥50 layers in a deep neural network). To compute the gradient for a matrix of layer L, the input vector to that layer would be the output of preceding layer L−1 and the error vector to that layer would be the error backpropagated from the following layer L+1. The value of the backpropagated error vector can be computed using the chain rule of multivariable calculus as before. Moreover, in some embodiments, complex U and V matrices (e.g., unitary matrices) may be used by adding an additional complex phase term to the Givens rotation matrix.

While the description above applies generally independent of the hardware architecture, certain hardware architectures provide more significant computation acceleration than others. In particular, implementation of the backpropagation techniques described herein on a graphical processing unit, a systolic matrix multiplier, a photonic processor (e.g., photonic processing system 100), or other hardware architectures capable of parallel computations of the gradients are preferred for the greatest gains compared to conventional approaches.

As described above, the photonic processing system 100 is configured to implement any unitary transformation. A sequence of Givens rotations is an example of such a unitary transformation, and thus the photonic processing system 100 can be programmed to compute the transformations in the decomposition above in O(1) time. As described above, the matrix may be implemented by controlling a regular array of variable beam-splitters (VBSs). The unitary matrices U and V T may be decomposed into a tiled array of VBS, each of which performs a 2-by-2 orthogonal matrix operation (e.g., a Givens rotation). The diagonal matrix Σ, along with the diagonal phase screen $D_U$ and $D_V$ (in the form of the diagonal matrix $D_U \Sigma D_V$), can be implemented in the photonic processing system 100 by controlling the intensity and phase of the light pulses, as described above.

Each entry in the diagonal matrix Σ corresponds to the amplification or attenuation of each photonic mode. An entry with magnitude ≥1 corresponds to amplification and an entry with magnitude ≤1 corresponds to attenuation, and a combination VBS and gain medium would allow for either attenuation or amplification. For an n-by-n square matrix M, the number of optical modes needed to apply the diagonal matrix Σ is n. However, if the matrix M is not square, the number of optical modes needed is equal to the smaller dimension.

As noted above, in some embodiments, the size of the photonic processor is the same as the size of the matrix M and input vector being multiplied. However, in practice, the size of the matrix M and the size of the photonic processor often differs. Consider a photonic processor of size N. If the task is to multiply a matrix of size I×J by a vector of size J, a single matrix-vector product will have complexity O (IJ/$N^2$) (assuming that both I and J are divisible by N), because each dimension of the matrix must be partitioned into matrices of size N, loaded into the processor, and used to compute a partial result. For a batch of K vectors (e.g., a second matrix of size J×K), the complexity is O (IJK/$N^2$) for the matrix-vector product.

The ability to work on small N-by-N matrix partitions can be advantageous if the matrix is non-square, especially if either I>>J or J>>I. Assuming a non-square matrix A, direct SVD of the matrix produces one I×I unitary matrix, one J×J unitary matrix, and one I×J diagonal matrix. If either I>>J or J>>I, the number of parameters needed to represent this decomposed matrices are much larger than the original matrix A.

However, if the matrix A is partitioned into multiple N×N square matrices having smaller dimensions, SVD on these N×N matrices produces two N×N unitary matrices and one N×N diagonal matrix. In this case, the number of parameters needed to represent the decomposed matrices is still $N^2$-equal to the size of the original matrix A, and the total non-square matrix can be decomposed with ≈IJ total parameters. The approximation becomes equality when IJ is divisible by $N^2$.

For a photonic processor having 2N+1 columns, the partial results of backpropagating the error vector for each column may be computed. Therefore, for a batch of K vectors, the complexity of backpropagation using a photonic processor of size N is O (IJK/N). By comparison, the computation of backpropagated errors using a matrix multiplication algorithm on a non-parallel processor (e.g., a CPU) would be O (IJK).

The description so far has focused on the use of a matrix within a neural network layer with an input vector data and a backpropagated error vector. The inventors have recognized and appreciated that the data in deep neural network computations are not necessarily vectors, but they are in general multidimensional tensors. Similarly, the weight values that describe the connection between the neurons are in general also multidimensional tensors. In some embodiments, the method described above can be directly applied if the weight tensor is sliced into matrix slices with each matrix slice being independent of one another. Therefore, singular value decomposition and the Givens-like rotation decomposition can be performed to obtain a valid representation in terms of phases for a particular matrix slice. The same method of computing the gradient of the phases can then be applied with the proper arrangement of the input tensor data and the backpropagated error data as well. The gradients for a specific matrix slice should be computed with parts of the input and error data that would have contributed to that particular matrix slice.

For concreteness, consider a general n-dimensional weight tensor $W_{a_1 a_2 a_3 \ldots a_i \ldots a_n}$. Choose two indices out of $\{a_i\}_{i=1,\ldots,n}$ that would constitute the matrix slice-say that choice is labeled by indices $a_b$ and $a_c$—and perform the decomposition to obtain the phases $f_{ij}^{(k)}$ by computing $\partial/\partial \theta_{ij}^{(k)}$. Importantly, b and c can be any value between 1 and n. Consider now a general k-dimensional input tensor $x_{a_1 \ldots a_i \ldots a_k}$. For a valid tensor operation, it must be the case that the output of the operation of the weight tensor on this input tensor produces an (n−k)-dimensional output tensor. It can therefore be concluded that the backpropagated error tensor the weight tensor of this layer is an (n−k)-dimensional tensor: $e_{a_{k+1} \ldots a_i \ldots a_n}$. Therefore, the gradient to be computed is $$\partial E / \partial \theta_{ij}^{(k)} = \sum_{a_1 \ldots a_n} e_{a_1 \ldots a_b \ldots a_n} w_{a_1 \ldots a_b \ldots a_c \ldots a_n} x_{a_1 \ldots a_c \ldots a_k},$$

where, for simplicity (but not a necessary condition), the indices of the weight tensors have been ordered such that the first k indices operate on x, and the last (n−k) indices operate on the error e.

In other embodiments, it may be more convenient to perform higher-order generalization of singular value decomposition such as the Tucker decomposition, where an arbitrary n-dimensional tensor can be decomposed as such: $W_{a_1 \ldots a_n} = \Sigma_{b_1 \ldots b_n} g_{b_1 \ldots b_n} U_{a_1 b_1}^{(1)} U_{a_2 b_2}^{(2)} \ldots U_{a_n b_n}^{(n)}$, where each $U_{a_ib_j}^{(i)}$ is an orthogonal matrix that can be decomposed into its Givens rotation phases and $g_{b_1 \ldots b_n}$ is an n-dimensional core tensor. In some cases, the core tensor can be chosen to be superdiagonal using a special case of the Tucker decomposition called CANDECOMP/PARAFAC (CP) decomposition. The Tucker decomposition can be made similar to the 2-dimensional VD form by multiplying the inverses (transposes or conjugate transposes) of some of the unitary matrices. For example, the decomposition can be rewritten as $w_{a_1 \ldots a_{(m+1)}} = \Sigma_{b_j} (U^T)_{b_1 a_1}^{(1)} \ldots (U^T)_{b_m a_m}^{(m)} g_{b_1 \ldots b_n} U_{a_{m+1} b_{m+1}} \ldots U_{a_n b_n}$, where the first m unitary matrices are pushed to the left of the core tensor. The collection of unitary matrices on either side of the core tensor can be decomposed into their rotation angles and the gradient of each rotation angle is obtained by the chain rule of calculus and the contraction of the gradients with the input tensor and the error tensor.

The inventors have recognized and appreciated that the gradients of the phases (e.g., for decomposed matrices U and V) and the gradients of the signed singular values (e.g., for matrix Σ) may have different upper bounds. Consider a task to compute the gradients of the scalar loss function L with respect to neural network parameters. In Euclidean space, the value of the gradients is given by $$\frac{\partial L}{\partial W},$$

where W is a matrix. In phase space, for a particular scalar phase $\theta_k$, the chain rule provides:

$$\frac{\partial L}{\partial W} = \sum_{ij} \frac{\partial L}{\partial W_{ij}} \frac{\partial W_{ij}}{\partial \theta_k}$$

From the definition of the trace, this is equal to:

$$\frac{\partial L}{\partial \theta_k} = Tr\left(\frac{\partial L}{\partial W}\left(\frac{\partial W}{\partial \theta_k}\right)^T\right)$$

where $$\frac{\partial L}{\partial \theta_k} \text{ and } \frac{\partial W}{\partial \theta}$$

and are both matrices. It is own that e trace is bounded by the Frobenius norm product $Tr(AB) \leq \|A\|_F \|AB\|_F$ and that $\|A\|_F = \|A^T\|_F$. Therefore, $$\frac{\partial L}{\partial \theta_k} \leq \left\|\frac{\partial W}{\partial \theta_k}\right\|_F \left\|\frac{\partial L}{\partial W}\right\|_F$$

Because differentiating with respect to θ does not change the singular values of W and thus does not change the Frobenius norm, the following is true:

$$\frac{\partial L}{\partial \theta_k} \leq \|W\|_F \left\|\frac{\partial L}{\partial W}\right\|_F$$

Differentiating with respect to a particular singular value $\sigma_k$, all of the singular values go to zero except for the one being differentiated, which goes to 1, which means that $$\left\|\frac{\partial L}{\partial W}\right\|_F = 1$$

Therefore, $$\frac{\partial L}{\partial \theta_k} \leq \left\|\frac{\partial L}{\partial W}\right\|_F$$

In some embodiments, the gradients of the phases and the singular values are scaled separately during updating the parameters of the angular representation to, for example, account for the differences in upper bounds. By scaling the gradients separately, either the gradients of the phases or the gradients of the singular values may be rescaled to have the same upper bound. In some embodiments, the gradients of the phases are scaled by the Frobenius norm of the matrix. According to some update rules, scaling the gradients of the phases and the singular values independently equates to having different learning rates for the gradients of the phases and the gradients of the singular values. Accordingly, in some embodiments, a first learning rate for updating the sets of components for the U and V matrices is different than a second learning rate for updating the set of components for the Σ matrix.

The inventors have recognized and appreciated that once a weight matrix is decomposed into phase space, both the phases and the singular values may not need to be updated in every iteration to obtain a good solution. Accordingly if only the singular values (but not the phases) are updated some fraction of the overall training time, during those epochs only O (n) parameters would need to be updated rather than O ($n^2$), leading to improvements in overall runtime. Updating only the singular values or the phases during some iterations may be referred to as "parameter clamping." In some embodiments, parameter clamping may be performed according to one or more of the following clamping techniques:

Fixed clamping: train all parameters for a certain number of iterations, then only update the singular values subsequently Cyclic clamping: Train all parameters for a number of epochs M, then freeze the phases (i.e., only update the singular values) for a number of epochs N. Resume training all parameters for another M epochs, then freeze the phases for N epochs again. Repeat until the total number of desired epochs has been reached.

Warmup clamping: Train all parameters for some number of epochs K, then begin cyclic clamping for the remaining number of epochs.

Threshold clamping: Continue updating phases or singular values until their updates are smaller than a threshold value:

The inventors have recognized and appreciated that the architecture of the photonics processor may influence the complexity of the calculations. For example, in the architecture shown in FIG. 1, the detectors are only at one end of the photonic processor array, resulting in the column-by-column approach (e.g., using partial forward and backward passes) for calculating the gradients, as described above. In an alternate architecture, a detector may be arranged at every photonic element (e.g., at each MZI) in the photonics array. For such an architecture, the column-by-column approach may be replaced with a single forward pass and a single backward pass, where the output at every column is read out simultaneously, therefore providing additional computational acceleration. Intermediate solutions, where columns of detectors are placed intermittently throughout the array are also contemplated. Any addition of detector columns commensurately reduces the number of partial forward and backward passes required for the gradient computation.

The techniques described above illustrate techniques for performing an update of weight matrix parameters while keeping all of the computation in phase space (e.g., using the angular representation of the matrix). In some embodiments, at least some of the calculations may be performed in a Euclidean vector space, whereas other calculations are performed in phase space. For example, the quantities needed to perform the update may be computed in phase space, as described above, but the actual updating of the parameters may occur in a Euclidean vector space. The updated matrix calculated in the Euclidean vector space may then be re-decomposed into weight space for a next iteration. In Euclidean vector space, for a given layer, the update rule may be:

$$\frac{\partial L}{\partial W_{ij}} = x_i \delta_j$$

The $\delta$ in this computation can be calculated with a backward pass through the entire photonics processor in phase space. Then, the outer product above between x and $\delta$ can be computed separately (e.g., off-chip). Once the updates are applied, the updated matrix can be re-decomposed and the decomposed values can be used to set the phases for the photonic processor as described above.

Aspects of the present application may provide one or more benefits, some of which have been previously described. Now described are some non-limiting examples of such benefits. It should be appreciated that not all aspects and embodiments necessarily provide all of the benefits now described. Further, it should be appreciated that aspects of the present application may provide additional benefits to those now described.

Aspects of the present application provide a photonic processor capable of performing matrix multiplication at speeds far greater than conventional techniques. The new optical-based processor architecture described herein increases both the speed and energy efficiency of matrix-multiplying processors.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined. i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A method for training a matrix-based differentiable program using a photonics-based processor, the matrix-based differentiable program including at least one matrix-valued variable associated with a matrix of values in a Euclidean vector space, the method comprising:
    configuring components of the photonics-based processor to represent the matrix of values as an angular representation;
    processing, using the components of the photonics-based processor, training data to compute an error vector;
    determining in parallel, at least some gradients of parameters of the angular representation, wherein the determining is based on the error vector and a current input training vector; and
    updating the matrix of values by updating the angular representation based on the determined gradients;
    wherein configuring components of the photonics-based processor to represent the matrix of values as an angular representation comprises:
    using singular value decomposition to transform the matrix of values into a first unitary matrix, a second unitary matrix and a diagonal matrix of signed or normalized singular values;
    decomposing the first unitary matrix into a first set of unitary transfer matrices;
    decomposing the second unitary matrix into a second set of unitary transfer matrices; configuring a first set of components of the photonics-based processor based on the first set of unitary transfer matrices;
    configuring a second set of components of the photonics-based processor based on the diagonal matrix of singular values; and
    configuring a third set of components of the photonics-based processor based on the second set of unitary transfer matrices.

2. The method of claim 1, wherein the first set of unitary transfer matrices includes a plurality of columns, and wherein determining in parallel, at least some of the gradients of parameters of the angular representation comprises determining in parallel, gradients for multiple columns of the plurality of columns.

3. The method of claim 1, wherein processing the training data to compute an error vector comprises:
   encoding the input training vector using photonic signals;
   providing the photonic signals as input to the photonics-based processor to generate an output vector;
   decoding the output vector;
   determining, based on the decoded output vector, a value of a loss function for the input training vector; and
   computing the error vector based on aggregating the values of the loss function determined for a set of input training vectors in the training data.

4. The method of claim 1, wherein determining in parallel, at least some gradients of parameters of the angular representation comprises determining in parallel, gradients of the parameters for each column of the decomposed first unitary matrix, gradients of the parameters for each column of the decomposed second unitary matrix, and gradients of the parameters for the singular values.

5. The method of claim 4, wherein determining in parallel, gradients of the parameters for each column of the decomposed first unitary matrix comprises:
   (a) computing a block diagonal derivative matrix containing derivatives with respect to each parameter in a selected column k of the first set of unitary transfer matrices;
   (b) computing a product of the error vector with all unitary transfer matrices in the decomposed first unitary matrix between the selected column k and an output column of the first set unitary transfer matrices;
   (c) computing a product of an input training data vector with all unitary transfer matrices in the decomposed first unitary matrix from an input column of the first set of unitary transfer matrices up to and including the selected column k of the first set of unitary transfer matrices;
   (d) multiplying the result of act (c) by the block diagonal derivative matrix computed in act (a); and
   computing inner products between successive pairs of elements from the output of act (b) and the output of act (d).

6. The method of claim 1, wherein determining in parallel, at least some gradients of parameters of the angular representation comprises backpropagating the error vector through the angular representation of the matrix of values.

7. The method of claim 1, wherein configuring components of the photonics-based processor to represent the matrix of values as an angular representation comprises:
   partitioning the matrix of values into two or more matrices having smaller dimensions;
   and configuring components of the photonics-based processor to represent the values in one of the two or more matrices having smaller dimensions.

8. The method of claim 1, wherein updating the angular representation comprises updating the parameters for the first set of components, the second set of components and the third set of components using a plurality of iterations, and
   wherein for some iterations of the plurality of iterations only the parameters for the second set of components is updated.

9. The method of claim 1, wherein updating the angular representation comprises updating the parameters for the first set of components, the second set of components and the third set of components, and
   wherein a first learning rate for updating the first and third sets of components is different than a second learning rate for updating the second set of components.

10. A non-transitory computer readable medium encoded with a plurality of instructions that, when executed by at least one photonics-based processor perform a method for training a latent variable graphical model, the latent variable graphical model including at least one matrix-valued latent variable associated with a matrix of values in a Euclidean vector space, the method comprising:
    configuring components of the photonics-based processor to represent the matrix of values as an angular representation;
    processing, using the components of the photonics-based processor, training data to compute an error vector;
    determining in parallel, at least some gradients of parameters of the angular representation, wherein the determining is based on the error vector and a current input training vector; and
    updating the matrix of values by updating the angular representation based on the determined gradients;
    wherein configuring components of the photonics-based processor to represent the matrix of values as an angular representation comprises:
    using singular value decomposition to transform the matrix of values into a first unitary matrix, a second unitary matrix and a diagonal matrix of signed or normalized singular values;
    decomposing the first unitary matrix into a first set of unitary transfer matrices;
    decomposing the second unitary matrix into a second set of unitary transfer matrices; configuring a first set of components of the photonics-based processor based on the first set of unitary transfer matrices;
    configuring a second set of components of the photonics-based processor based on the diagonal matrix of singular values; and
    configuring a third set of components of the photonics-based processor based on the second set of unitary transfer matrices.

11. The non-transitory computer-readable medium of claim 10, wherein the first set of unitary transfer matrices includes a plurality of columns, and wherein determining in parallel, at least some of the gradients of parameters of the angular representation comprises determining in parallel, gradients for multiple columns of the plurality of columns.

12. The non-transitory computer-readable medium of claim 10, wherein processing the training data to compute an error vector comprises:
    encoding the input training vector using photonic signals;
    providing the photonic signals as input to the photonics-based processor to generate an output vector;
    decoding the output vector;
    determining, based on the decoded output vector, a value of a loss function for the input training vector; and
    computing the error vector based on aggregating the values of the loss function determined for a set of input training vectors in the training data.

13. The non-transitory computer-readable medium of claim 10, wherein determining in parallel, at least some gradients of parameters of the angular representation comprises determining in parallel, gradients of the parameters for each column of the decomposed first unitary matrix, gradients of the parameters for each column of the decomposed second unitary matrix, and gradients of the parameters for the singular values.

14. The non-transitory computer-readable medium of claim 13, wherein determining in parallel, gradients of the parameters for each column of the decomposed first unitary matrix and the decomposed second unitary matrix comprises:
    (a) computing a block diagonal derivative matrix containing derivatives with respect to each parameter in a selected column k of the first set of unitary transfer matrices;
    (b) computing a product of the error vector with all unitary transfer matrices in the decomposed first unitary matrix between selected column k of the first set of unitary transfer matrices and an output column of the first set unitary transfer matrices;

(c) computing a product of an input training data vector with all unitary transfer matrices in the decomposed first unitary matrix from an input column of the first set of unitary transfer matrices up to and including the selected column k of the first set of unitary transfer matrices;

(d) multiplying the result of act (c) by the block diagonal derivative matrix computed in act (a); and computing inner products between successive pairs of elements from the output of act (b) and the output of act (d).

15. The non-transitory computer-readable medium of claim 10, wherein determining in parallel, at least some gradients of parameters of the angular representation comprises backpropagating the error vector through the angular representation of the matrix of values.

16. The non-transitory computer-readable medium of claim 10, wherein configuring components of the photonics-based processor to represent the matrix of values as an angular representation comprises:
   partitioning the matrix of values into two or more matrices having smaller dimensions;
   and configuring components of the photonics-based processor to represent the values in one of the two or more matrices having smaller dimensions.

17. The non-transitory computer-readable medium of claim 10, wherein updating the angular representation comprises updating the parameters for the first set of components, the second set of components and the third set of components using a plurality of iterations, and
   wherein for some iterations of the plurality of iterations only the parameters for the second set of components is updated.

18. The non-transitory computer-readable medium of claim 10, wherein updating the angular representation comprises updating the parameters for the first set of components, the second set of components and the third set of components, and
   wherein a first learning rate for updating the first and third sets of components is different than a second learning rate for updating the second set of components.

19. A photonics-based processing system, comprising: a photonics processor; and
   a non-transitory computer readable medium encoded with a plurality of instructions that, when executed by the photonics processor perform a method for training a latent variable graphical model, the latent variable graphical model including at least one matrix-valued latent variable associated with a matrix of values in a Euclidean vector space, the method comprising:
   configuring components of the photonics processor to represent the matrix of values as an angular representation;
   processing, using the components of the photonics processor, training data to compute an error vector;
   determining in parallel, at least some gradients of parameters of the angular representation, wherein the determining is based on the error vector and a current input training vector; and
   updating the matrix of values by updating the angular representation based on the determined gradients;
   wherein configuring components of the photonics-based processor to represent the matrix of values as an angular representation comprises:
   using singular value decomposition to transform the matrix of values into a first unitary matrix, a second unitary matrix and a diagonal matrix of signed or normalized singular values;
   decomposing the first unitary matrix into a first set of unitary transfer matrices;
   decomposing the second unitary matrix into a second set of unitary transfer matrices; configuring a first set of components of the photonics-based processor based on the first set of unitary transfer matrices;
   configuring a second set of components of the photonics-based processor based on the diagonal matrix of singular values; and
   configuring a third set of components of the photonics-based processor based on the second set of unitary transfer matrices.

20. The photonics-based processing system of claim 19, wherein the first set of unitary transfer matrices includes a plurality of columns, and wherein determining in parallel, at least some of the gradients of parameters of the angular representation comprises determining in parallel, gradients for multiple columns of the plurality of columns.

21. The photonics-based processing system of claim 19, wherein processing the training data to compute an error vector comprises:
   encoding the input training vector using photonic signals;
   providing the photonic signals as input to the photonics-based processor to generate an output vector;
   decoding the output vector;
   determining, based on the decoded output vector, a value of a loss function for the input training vector; and
   computing the error vector based on aggregating the values of the loss function determined for a set of input training vectors in the training data.

22. The photonics-based processing system of claim 20, wherein determining in parallel, at least some gradients of parameters of the angular representation comprises determining in parallel, gradients of the parameters for each column of the decomposed first unitary matrix, gradients of the parameters for each column of the decomposed second unitary matrix, and gradients of the parameters for the singular values.

23. The photonics-based processing system of claim 22, wherein determining in parallel, gradients of the parameters for each column of the decomposed first unitary matrix and the decomposed second unitary matrix comprises:
   (a) computing a block diagonal derivative matrix containing derivatives with respect to each parameter in a selected column k of the first set of unitary transfer matrices;
   (b) computing a product of the error vector with all unitary transfer matrices in the decomposed first unitary matrix between selected column k of the first set of unitary transfer matrices and an output column of the first set unitary transfer matrices;
   (c) computing a product of an input training data vector with all unitary transfer matrices in the decomposed first unitary matrix from an input column of the first set of unitary transfer matrices up to and including the selected column k of the first set of unitary transfer matrices;
   (d) multiplying the result of act (c) by the block diagonal derivative matrix computed in act (a); and
   computing inner products between successive pairs of elements from the output of act (b) and the output of act (d).

24. The photonics-based processing system of claim 19, wherein determining in parallel, at least some gradients of parameters of the angular representation comprises backpropagating the error vector through the angular representation of the matrix of values.

25. The photonics-based processing system of claim 19, wherein configuring components of the photonics-based processor to represent the matrix of values as an angular representation comprises:
   partitioning the matrix of values into two or more matrices having smaller dimensions; and configuring components of the photonics-based processor to represent the values in one of the two or more matrices having smaller dimensions.

26. The photonics-based processing system of claim 19, wherein updating the angular representation comprises updating the parameters for the first set of components, the second set of components and the third set of components using a plurality of iterations, and
   wherein for some iterations of the plurality of iterations only the parameters for the second set of components is updated.

27. The photonics-based processing system of claim 19, wherein updating the angular representation comprises updating the parameters for the first set of components, the second set of components and the third set of components, and
   wherein a first learning rate for updating the first and third sets of components is different than a second learning rate for updating the second set of components.

* * * * *